(12) United States Patent
Powidajko et al.

(10) Patent No.: US 11,697,437 B2
(45) Date of Patent: Jul. 11, 2023

(54) RAILROAD HOPPER CAR STRUCTURE AND GATE THEREFOR

(71) Applicant: National Steel Car Limited, Hamilton (CA)

(72) Inventors: Elliot Powidajko, Hamilton (CA); Oliver M. Veit, Hamilton (CA); Tomasz Bis, Ancaster (CA); Harinder Singh Natt, Mississauga (CA); Zijian Yan, Oakville (CA)

(73) Assignee: National Steel Car Limited, Hamilton (CA)

( * ) Notice: Subject to any disclaimer, the term of this patent is extended or adjusted under 35 U.S.C. 154(b) by 524 days.

(21) Appl. No.: 16/862,260

(22) Filed: Apr. 29, 2020

(65) Prior Publication Data

US 2020/0339163 A1    Oct. 29, 2020

Related U.S. Application Data

(60) Provisional application No. 62/840,166, filed on Apr. 29, 2019.

(51) Int. Cl.
*B61D 7/20* (2006.01)
*B61D 7/02* (2006.01)

(52) U.S. Cl.
CPC ............. *B61D 7/20* (2013.01); *B61D 7/02* (2013.01)

(58) Field of Classification Search
CPC .............. B61D 7/00; B61D 7/02; B61D 7/20
See application file for complete search history.

(56) References Cited

U.S. PATENT DOCUMENTS

| | | | |
|---|---|---|---|
| 3,584,564 A * | 6/1971 | Rollins | B61D 27/0027 219/202 |
| 4,368,673 A | 1/1983 | Dvorscak | |
| 4,498,400 A | 2/1985 | Vorwerk | |
| 6,237,505 B1 | 5/2001 | Sande et al. | |

(Continued)

FOREIGN PATENT DOCUMENTS

WO    WO2013059856 A1    5/2013

OTHER PUBLICATIONS

International Search Report and Written Opinion PCT/CA2020/050569 dated Aug. 10, 2020.

(Continued)

*Primary Examiner* — Robert J McGarry, Jr.
(74) *Attorney, Agent, or Firm* — Hahn Loeser & Parks LLP; Nathan B. Webb

(57) ABSTRACT

A railroad hopper car has a hopper carried between two trucks. The hopper has convergent end and side slope sheets that feed a flat bottom discharge. It has a rectangular frame at least half as wide as the car, and at least half as great as the truck center distance. The car capacity is over 5000 cu. ft. The bottom discharge is lower than the center sill. There are ring frames having a bottom reinforcement that passes clear under the center sill. The car has flat bottom discharge gates having multiple arrays of louvers. The side sheets extend downwardly beyond the side sills, so that the side slope sheets terminate at a transition below the side sills. The louvers have curved edges. The louvers move together. The gate may include two opposed sliding doors separated by a beam that runs under the center sill.

30 Claims, 43 Drawing Sheets

(56) References Cited

U.S. PATENT DOCUMENTS

| | | |
|---|---|---|
| 7,752,979 B2 | 7/2010 | Early |
| 7,814,842 B2 | 10/2010 | Early |
| 7,819,067 B2 | 10/2010 | Early |
| 10,035,521 B2 | 7/2018 | Wiliams |
| 10,604,165 B2 | 3/2020 | Williams |
| 2009/0120323 A1 | 5/2009 | Forbes |
| 2015/0197257 A1 | 7/2015 | Williams |
| 2018/0186387 A1 | 7/2018 | Richmond |
| 2018/0201278 A1 | 7/2018 | Forbes et al. |
| 2019/0001997 A1 | 1/2019 | Richmond et al. |
| 2020/0062280 A1 | 2/2020 | Jones et al. |

OTHER PUBLICATIONS

International Search Report and Written Opinion PCT/CA2020/050568 dated Jul. 6, 2020.

* cited by examiner

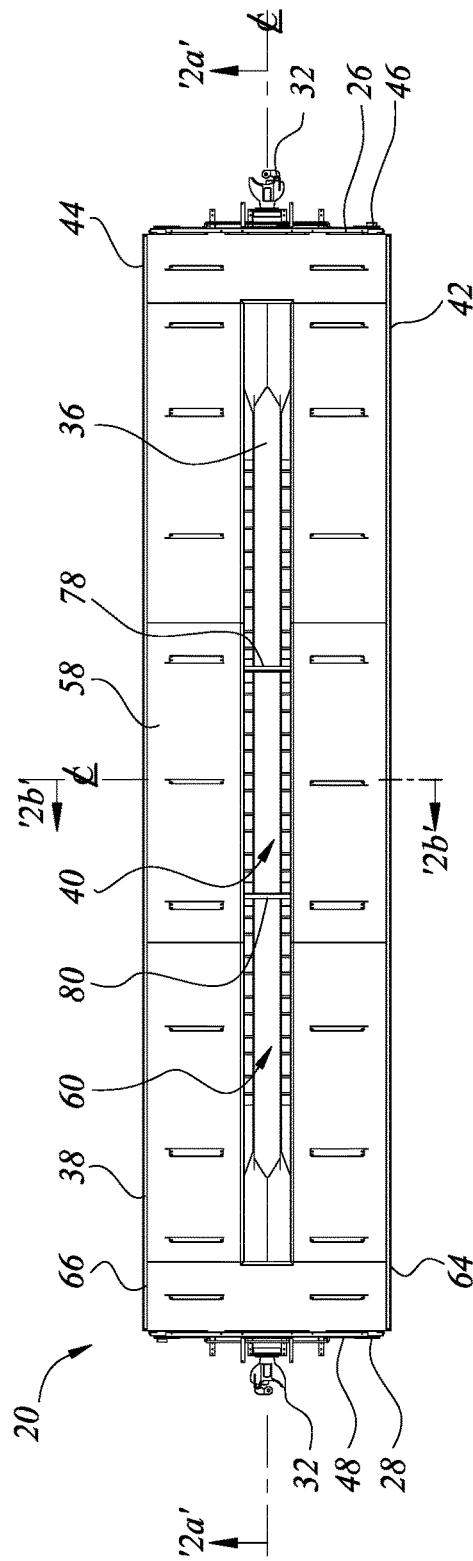

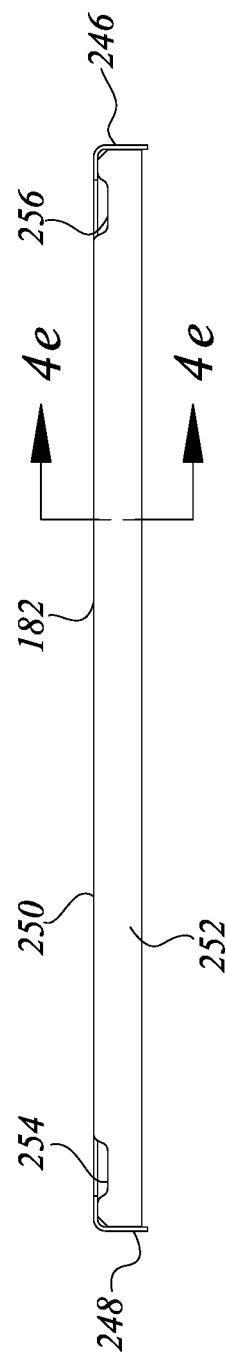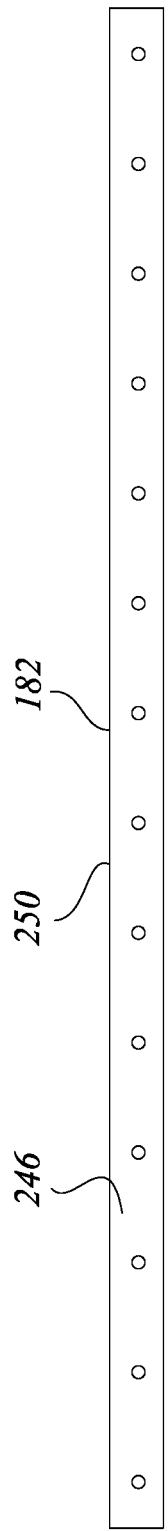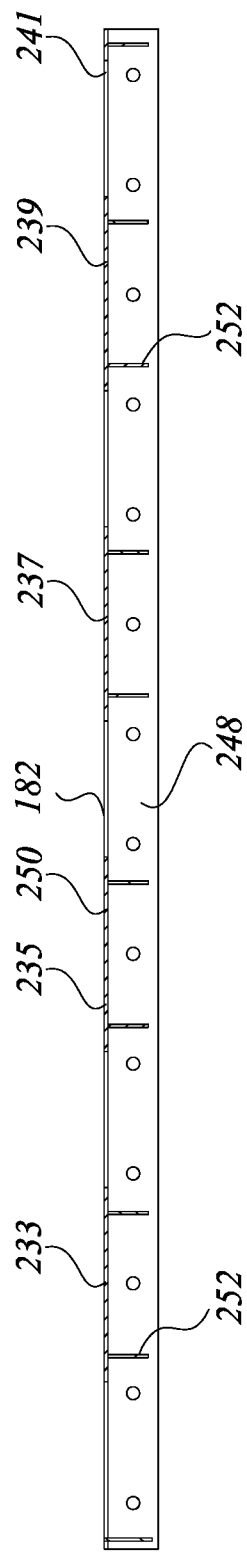

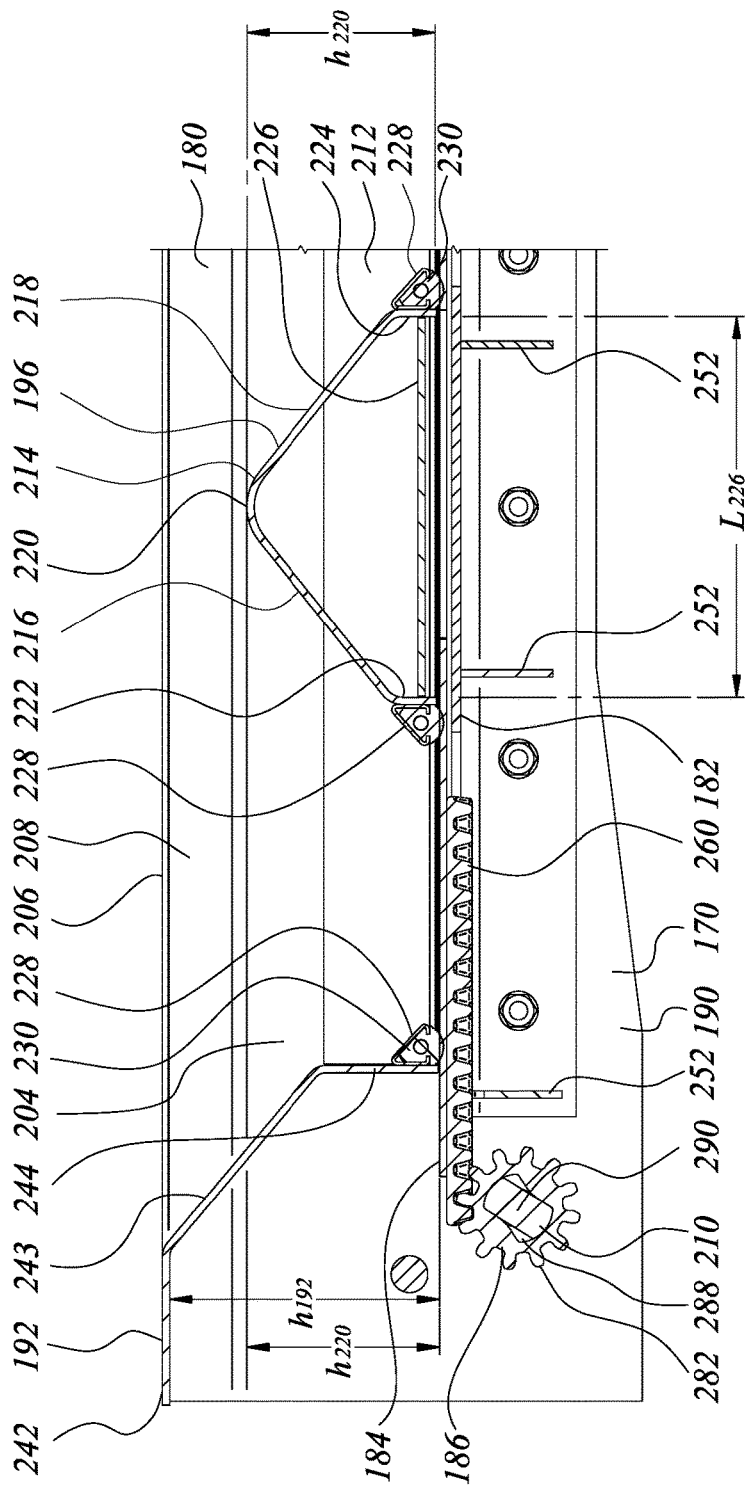
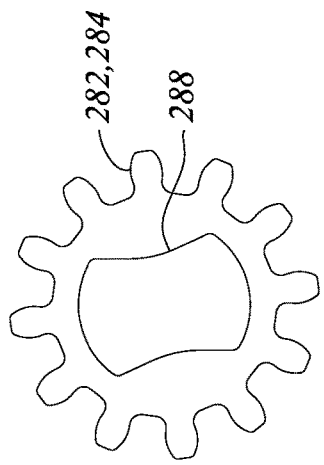
FIG. 6a
FIG. 6b

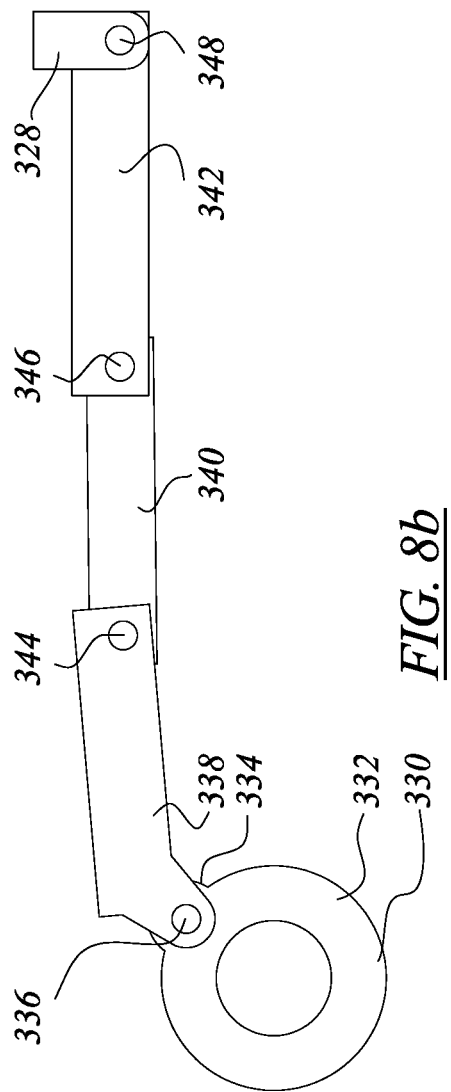
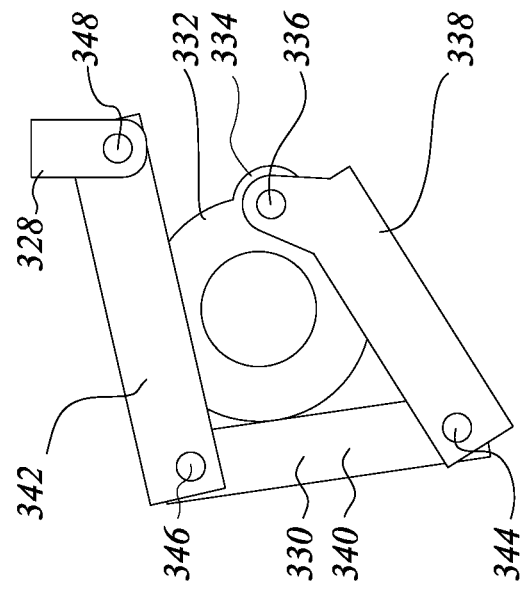
FIG. 8b
FIG. 8c

RAILROAD HOPPER CAR STRUCTURE AND GATE THEREFOR

This application claims the benefit of priority of U.S. Provisional Patent Application Ser. No. 62/840,166 filed Apr. 29, 2019, the specification and drawings thereof being incorporated in their entirety herein by reference.

FIELD OF THE INVENTION

This invention relates to the field of railroad freight cars, and, in particular to railroad hopper cars such as may employ bottom unloading gates or doors.

BACKGROUND

There are many kinds of railroad cars for carrying particulate material, be it sand or gravel aggregate, plastic pellets, grains, ores, potash, coal or other granular material. The cars often have an upper inlet, or entry, or upper opening, or accessway, by which to introduce lading, and a lower opening, or lower outlet, or discharge, or accessway, or gate, or gate assembly, or door by which lading exits the car under the influence of gravity. Given gravity, while the inlet need not necessarily have a movable gate, the outlet opening has a governor that is movable between a closed position for retaining the lading while the lading is being transported, and an open position for releasing the lading at the destination, and that is operable to move between these positions to govern the egress of lading. The terminology "flow through" or "flow through railroad car" or "center flow" car, or the like, may sometimes be used for cars of this nature where lading, typically particulate lading, is introduced at the top, and flows out at the bottom.

Discharge doors for hopper cars or other bottom dumping cars may tend to have certain properties. First, to the extent possible it is usually helpful for the door opening to be large to hasten unloading; and for the sides of any unloading chute to be relatively steep so that the particulate will tend not to hang up on the slope. Further, to the extent that the door can be large and the slope sheets steep, the interior of the car may tend to have a greater lading volume for a given car length. Further still, any increase in lading achieved will tend to be at a relatively low height relative to Top of Rail (TOR) and so may tend to aid in maintaining a low center of gravity. A low center of gravity tends to yield a better riding car.

For a given length of car, hopper volume, and hence overall car volume, can be maximized by reducing the proportion of the length of the car occupied by the trucks, and occupied by the door opening drive mechanism. Furthermore, where the lading to be carried by the car is of greater than usual density, it may often be helpful for the truck center length to be relatively short such that the length of the span between the trucks is smaller, and the weight of the car body structure may be correspondingly decreased relative to the maximum permissible gross weight on rail (GWR) for the car. In some instances, as with iron ore or other high density lading, that truck center distance may be very short.

Most cars in interchange service are currently limited to the "110 Ton" standard of 286,000 lbs., gross weight on rail (GWR). There are also "125 Ton" cars that have a permissible 315,000 lbs., GWR, typically used in captive service. Cars are also limited in cross-sectional width and height, according to the applicable plate diagram, be it AAR Plate C, AAR Plate F, or some other AAR Plate size; and in length according to swing-out for cars having truck centers spaced more than 46'-3" apart. Whether for Plate C or Plate F, or any other plate, no car in interchange service can be more than 10'-8" wide. When fully laded, the car must not have a center of gravity more than 98" above TOR when operating on standard gauge track, and there must be a clearance of 2¾" above TOR. The main structure of the car is exposed to loads in draft (longitudinal tension) and in buff (longitudinal compression). Those loads may be idealized as being applied at the coupler centerline height. For railroad cars with new wheels and empty of lading, that height is 34½", 32½" at full load. Another datum dimension is that of the top cover of the center sill, which may sometimes be in the range of 41" to 43" depending on the size of draft gear. For many kinds of lading, a hopper car will "weigh out" before it "cubes out". That is, for extremely low density lading, such as wood chips, car volume may be the limiting factor (it "cubes out"). For lading of more customary densities, the GWR limit will be exceeded (it "weighs out") before the volumetric limitations are reached.

For railroad freight cars, it may be helpful to have a lower center of gravity. It may also be helpful to move more cars per unit length, so that a train has more cars, overall, within a given siding length. This may yield a train that is heavier per unit length. The characteristic dimension for this purpose is the length over the pulling faces of the car, namely as measured over the distance between striker plates at the respective first and second ends of the car. Given the fixed maximum width (of 128"), and center of gravity limitation (of 98" above TOR), obtaining the same useful volume (or more) with a shorter car length, (for which the length over the pulling faces is a proxy), can present a challenge to the designer.

Others have sought to address these issues. Some attempts are seen in US Publication US 2014/0 366 770 of Klinkenberg et al.; US Publication US 2018/0 186 387 of Richmond; and US Publication 2020/0 062 280 of Jones et al.

Bottom dumping hopper cars, of which ore cars and coal cars may be examples, may tend to have either longitudinal doors or transverse doors. Longitudinal doors are oriented such that the doors operate on hinges or axes of rotation that are parallel to the direction of travel of the railroad car generally. U.S. Pat. No. 4,250,814 of Stark et al., issued Feb. 17, 1981 and U.S. Pat. No. 3,800,711 of Tuttle, issued Apr. 2, 1974 show cars with longitudinal doors. By contrast, transverse doors are ones in which the axes of rotation of the hinges or other pivots tend to be predominantly cross-wise to the direction of travel, most often perpendicular to it. An example of a transverse door car shown in U.S. Pat. No. 4,843,974 of Ritter et al, issued Jul. 4, 1989.

Hopper cars may have hinged doors, such that the door pivots open, as in the references noted above. Alternatively, some hopper cars have sliding gate doors. There are many examples of sliding gate arrangements. Some examples are shown in U.S. Pat. No. 3,138,116 of Dorey; U.S. Pat. No. 3,348,501 of Stevens; and U.S. Pat. No. 7,814,842 of Early.

SUMMARY OF THE INVENTION

The invention relates to a flat-bottomed hopper car, or alternatively expressed, a bottom discharging gondola car. That is, in one aspect there is a railroad freight car, the railroad freight car being one of: (a) a railroad hopper car having a flat bottom and at least a first discharge gate mounted thereto; and (b) a railroad gondola car having a flat bottom and at least a first discharge gate mounted thereto. In one feature of that aspect it is a hopper car having a flat bottom, and at least a first discharge gate mounted thereto. In another feature, it is a railroad freight car is a gondola car having a flat bottom and at least a first discharge gate mounted thereto.

In another aspect there is a railroad hopper car. It has a lading containment body carried on trucks. It has first and second side walls and at least a first hopper. The body has first and second side sills running along opposite sides thereof. The body includes a discharge section, and at least one multi-opening discharge gate mounted thereto. The multi-opening discharge gate is operable to govern egress of lading from the body. The discharge section has first and second end slope sheets and first and second side slope sheets. The first and second side slope sheets meet the first and second side walls at respective transitions. There is a slope discontinuity at the respective transitions. The respective transitions are located lower than the first and second side sills.

In a feature of that aspect, the first and second transitions are located at least half the depth of the side sills below the side sills. In another feature, the hopper car is a flat-bottomed hopper car. In another feature, the hopper car has at least first and second multi-opening discharge gates mounted to the discharge section adjacent to each other. In a further feature, the discharge section has a peripheral frame defining an outlet datum height, and all of the multi-opening discharge gates are mounted to the peripheral frame. in another feature, the side slope sheets are unitary side slope sheets that run from end to end of the discharge section along the multi-opening discharge gates, the side slope sheet has a continuous lower margin.

In another feature, the hopper car has a center sill. It has a lowermost portion and an uppermost portion. The center sill is one of (a) a straight-through center sill; and (b) a stub sill. The hopper car has lateral reinforcements mounted to the discharge. The lateral reinforcements have an uppermost portion. The uppermost portion of the lateral reinforcement is located lower than the lowermost portion of the center sill. In another feature, the hopper car has a roof section and an inlet coaming formed therein. The hopper car has a lateral roof reinforcement extending across the car, and connected to the roof section on either side of the coaming. In another feature, the hopper car has at least one internal ring frame. In a further feature, the railroad hopper car has a straight-through center sill. The ring frame has first and second portions mounted to first and second side walls of the car. An overhead roof support portion joins upper ends of the first and second side wall portions. A lowermost transverse portion is mounted to the discharge section and joins lower ends of the first and second side wall portions. The lowermost transverse portion passes underneath, and clear of, the straight-through center sill.

In another aspect there is a railroad hopper car it has a lading containment body carried on railroad car trucks for rolling motion in a longitudinal direction along railroad tracks. The lading containment body has at least one hopper. The hopper has a discharge section and a multi-opening discharge gate mounted to the discharge section. The multi-opening discharge gate is movable between open and closed positions to govern egress of lading from the hopper car. The hopper car has a center sill, the center sill is one of (a) a straight-through center sill; and (b) a stub center sill. The discharge section has a first reinforcement extending laterally thereacross. The first reinforcement has an uppermost portion. The center sill has a lowermost portion. The uppermost portion of the first reinforcement is located lower than the lowermost portion of the center sill.

In a feature thereof, the center sill is a straight-through center sill. The first reinforcement passes beneath the center sill. In another feature, the hopper car is a flat bottom hopper car. In another feature, the car has side sheets that extend downwardly below the side sills. The hopper car has side slope sheets. The side slope sheets meet the side sheets at a respective transition. The transition is located downwardly of the respective side sills. In another feature, the hopper car has a plurality of multi-opening discharge gates. The hopper car has side slope sheet that extend the full length of the discharge section. The side slope sheets have a continuous lower margin. In another feature, the discharge section has a rectangular frame defining an engagement interface thereof, and a plurality of the multi-opening discharge gate is mounted to the engagement interface. In a feature, the lading containment body has a unitary an internal chamber served by a plurality of the multi-opening discharge gates. In still another feature, the lading containment body has at least one ring frame, and the first reinforcement defines a portion of the ring frame. In an additional feature, the lading containment body has a first side wall, a second side wall, and a roof section. The lading containment body includes at least a first ring frame. The first ring frame has a first side portion to which the first side wall conforms and a second side portion to which the second side wall conforms. There is an over-spanning portion to which the roof section conforms. The first reinforcement defines a cross-member of the first ring frame joining the first and second side portions thereof.

In another feature, the hopper car has a plurality of the multi-opening gates mounted to the discharge section thereof. The discharge section has a rectangular frame defining an engagement interface. The center sill has an overall depth. The multi-opening discharge gates have an overall through thickness. The through-thickness of the multi-opening discharge gates is less than the depth of the center sill. In still another feature, the railroad hopper car has side sheets. The side sheets meet the discharge section at a slope discontinuity defining a transition between the side sheets and the discharge section. The transition is located below the height of the center sill top cover plate. In another feature, the railroad hopper car is free of any intermediate slope sheet extending upwardly of the center sill. In still another feature, the hopper car is free of any intermediate slope sheet extending upwardly of the bottom cover plate of the center sill. In a further feature, the discharge section includes a peripheral frame. The peripheral frame has at least a first lateral cross-member. The railroad hopper car is free of any intermediate slope sheet extending upwardly of the first lateral cross-member of the peripheral frame. In another feature, the discharge section has a through-thickness depth that is less than the through thickness depth of the center sill. In a still further feature, the first discharge gate has a through thickness that is less than half the depth of the center sill. In another feature, the freight car has at least a first sliding hopper gate and a second sliding hopper gate. The first sliding hopper gate has a first length. The first sliding hopper gate is spaced from the second sliding hopper gate by a second length. The second length is less than half the first length. In another feature, the hopper car has a drop center and at least one sliding discharge gate mounted to the drop center. The hopper car has a center sill having a vertical depth. The sliding discharge gate has a length, a width, and a through-thickness. The through-thickness is less than the depth of the center sill. In another feature, the hopper car has a drop center and at least a first discharge gate and a second discharge gate mounted to the drop center. The first and second discharge gates are sliding discharge gates. The discharge gates have an array of sliding shutters. The shutters have a width greater than their length in the direction of motion of opening and closing.

In another aspect, there is a railroad freight car. It is a railroad hopper car has at least a first hopper. The first hopper has a first discharge, and the railroad hopper car has at least a first sliding hopper gate and a second sliding hopper gate mounted to the first discharge of the first hopper. In another aspect there is a railroad freight car. It is a railroad hopper car having a sliding gate. The sliding gate has multiple shutters.

In a feature of those aspects, the first sliding hopper gate and the second sliding hopper gate are independently operable between open and closed positions. In another feature, at least one of the first and second sliding hopper gates has a set of multiple shutters. In another feature, all of the sliding hopper gates have respective sets of multiple shutters. In a further feature, the shutters are linked to open and close together. In another feature, the railroad freight car has a depressed center. In still another feature, the freight car has a single lading containment hopper, and the hopper has a single discharge section. In another feature, the freight car has a center sill, and the center sill has a bottom flange. The discharge section has a peripheral frame defining an outlet interface thereof. The peripheral frame is located lower than the bottom flange of the center sill. In another feature, the discharge section has a peripheral frame defining an outlet interface thereof. The peripheral frame is more than $2/5$ as wide as the lowermost underframe width of AAR Plate C. In a further feature, the peripheral frame is more than one half as wide as the lowermost underframe width of AAR Plate C. In still another feature, the peripheral frame is more than three quarters as wide as the lowermost underframe width of AAR Plate C.

In another feature, the discharge section has a peripheral frame defining an outlet interface thereof. The peripheral frame is more than $1/3$ as wide as the maximum car width of AAR Plate C. In yet another feature, the peripheral frame is more than $2/5$ as wide as the maximum car width of AAR Plate C. In another feature, the peripheral frame is more than one half as wide as the maximum car width of AAR Plate C. In another feature, the railroad freight car has a pair of trucks separated by a truck center distance. The discharge section has a peripheral frame. The peripheral frame has a length that is greater than $1/3$ of the truck center distance. In a further feature, the railroad freight car has a pair of trucks separated by a truck center distance. The discharge section has a peripheral frame. The peripheral frame has a length that is greater than $1/2$ of the truck center distance. In another feature, the railroad freight car has side sheets. The side sheets meet the discharge section at a slope discontinuity defining a transition between the side sheets and the discharge section. The transition is located below the height of the center sill top cover plate. In a further feature, the railroad freight car has side sheets. The railroad freight car has side sills. The side sheets meet the discharge section at a slope discontinuity defining a transition between the side sheets and the discharge section. The transition is located below the height of the bottom flange of the side sills. In a further feature, the railroad freight car is free of any intermediate slope sheet extending upwardly of the center sill. In still another feature, the railroad freight car is free of any intermediate slope sheet extending upwardly of the bottom cover plate of the center sill. In another feature, the railroad freight car is free of any intermediate slope sheet extending upwardly of the bottom cover plate of the center sill. In another feature, the discharge section includes a peripheral frame. The peripheral frame has at least a first lateral cross-member. The railroad freight car is free of any intermediate slope sheet extending upwardly of the first lateral cross-member of the peripheral frame. In still another feature, the discharge section includes a peripheral frame. The peripheral frame has at least a first lateral cross-member. The first lateral cross-member passes below the center sill. In another feature, the discharge section has a through-thickness depth that is less than the through thickness depth of the center sill. In yet another feature, the first discharge gate has a through thickness that is less than half the depth of the center sill. In another feature, the through thickness depth of the discharge section measured to the top of the first cross-member is less than $1/8$ of the length of the peripheral frame of the discharge section. In still another feature the through thickness depth of the discharge section measured to the top of the first cross-member is less than $1/3$ of the width of the peripheral frame of the discharge section.

In another feature, the car has at least a first sliding hopper gate and a second sliding hopper gate. The first sliding hopper gate has a first length and is spaced from the second sliding hopper gate by a second length that is less than half the first length. In another feature, a plurality of discharge gates is mounted to the car body, and the sum of their lengths in the longitudinal direction is at least $1/3$ of the truck center distance. In another feature, it is carried on trucks for rolling motion along railroad tracks in a length-wise direction, and has discharge gates mounted to the drop center; discharge gates have an opening width cross-wise to the lengthwise direction; and the opening width is greater than $2/5$ of the AAR Plate C lowermost underframe clearance width. In another feature, there is a nominal area, $A_n$, defined by the product of the truck center distance, or truck center length, and the AAR Plate C lowermost underframe clearance width. The discharge gates have a combined area, $A_{total}$, that is greater than $1/4$ of $A_n$. In another feature, the hopper car has at least one sliding discharge gate mounted to the drop center, the sliding discharge gate has a length, a width, and a through thickness, and the through thickness is less than $1/3$ of the width and less than $1/5$ of the length. In a further feature, the hopper car has at least one sliding discharge gate mounted to the drop center, the hopper car has a center sill, the center sill has a vertical depth; the sliding discharge gate has a length, a width, and a through-thickness, and the through-thickness is less than the depth of the center sill. In still another feature, the hopper car has at least a first discharge gate and a second discharge gate mounted to the drop center. The first and second discharge gates are sliding discharge gates. Each of the first and second discharge gates has an array of sliding shutters. The shutters have a width that is greater than its length in the direction of motion of opening and closing. In another feature, the first discharge gate has an entry area, $A_i$, and an outlet area, $A_o$, and the ratio $A_o/A_i$ is less than $3/4$. The first and second discharge gates have respective opening lengths and opening widths, and the first and second discharge gates are spaced apart along the hopper car by a distance that is less than the opening length of the first discharge gate.

In another feature, there is any combination of the foregoing aspects and features and any one or more of (a) the discharge gates have a combined opening length of at least half the truck center distance; (b) the discharge gates have an opening width that is at least $2/3$ of the AAR Plate C lowermost underframe clearance width; (c) the discharge gates have a combined area, $A_{Total}$, greater than $3/8$ of $A_n$; (d) the through thickness of the first discharge gate is less than ⅕ of the width thereof and less than ⅛ of the length thereof; (e) the through thickness of the first discharge gate is less than half the depth of the center sill; (f) the first discharge gate has between three and eight openings and corresponding slidable slats movable to open and close the openings; (g) the shutters has a width that is greater than four times its length in the direction of motion of opening and closing; (h) the ratio $A_o/A_i$ is less than one half; (i) the first and second discharge gates are spaced apart along the hopper car by a distance that is less than one half the opening length of the first discharge gate; (j) the bottom discharge includes a total number of discharge openings at least as great as nine; (k) the bottom discharge includes a sets of discharge openings separated into at least three arrays, with one such array per discharge gate; and (1) the hopper car has a truck center length of less than 40 ft., and lading volume of at least 5400 cu. ft.

In an aspect of the invention there is a sliding gate assembly mountable to a railroad hopper car having a flat bottom. The sliding gate assembly has an array of shutter members controlling discharge of lading from said hopper car. Said shutter members having a non-linear leading edge and said shutter members are progressively opening. In another aspect of feature, there is a railroad hopper car having a flat bottom and that multi-aperture sliding array. That is, there is a railroad hopper car. It has a flat bottom. The flat bottom has an array of louvers, or shutters, controlling discharge of lading from the hopper car.

In a feature, the sliding gate assembly is a three-piece sliding gate assembly having a movable shutter plate that has a plurality of openings alternating with a plurality of louvers, mounted between upper and lower stationary arrays. In another feature, the sliding gate assembly has a length, a width and a through-thickness. The through-thickness is less than one third of the length; and the through thickness is less than one third of the width. In a further feature, the plurality of openings includes a first opening having a cross-wise width and a length in a direction of opening of said louvers. That width is at least three times as great as the length. In another feature, the gate assembly has an inlet area, $A_i$, and an outlet area, $A_o$, and the ratio $A_o/A_i$ is less than ¾. In still another feature, the gate assembly includes a rectangular frame defining a land to mate to a hopper car discharge section. There is a number of intermediate cross-members that is one less than the number of louvers of said plurality of louvers. The intermediate cross-members have respective crowns having sloped sides. The crown is shy of the land. In another feature, the non-linear leading edge is arcuate, and is progressively exposed as the respective shutter member opens. In another feature, the gate assembly has a frame. The frame defines a periphery of the sliding gate assembly. The frame has two cross-wise running sides and two length-wise running sides that co-operate to form a rectangle. The first divider extends across the inside of the rectangle. In another feature, a stationary pan is carried beneath and spaced apart from each the divider, and the first and second shutter members slide between the divider and the pan. In an alternate feature, the sliding gate assembly is a two-piece gate assembly having a stationary member defining alternating openings and obstructed panels, and a movable member defining alternating openings and louvers. The movable member are slidable to align the respective openings in an open position of the sliding gate assembly, and to position the louvers to block the openings in a closed position.

In a feature of that aspect, the hopper car has a first end section, a second end section, and a middle portion between the first and second end sections. The middle section includes the flat bottom. The flat bottom is at least ⅓ as long as the railroad hopper car in total. In another feature, the hopper car has an overall width, and the flat bottom is at least half as wide as the overall width. In still another feature, the hopper car has an overall width and a truck center length. The flat bottom has a discharge section outlet frame that is at least half as wide as the overall width, and at least half as long as the truck center length. At least a first array of louvers is mounted to the discharge section outlet frame of the flat bottom. In still another feature, the hopper car has a capacity in excess of 5000 cu. ft., and truck centers on less than 46'-3".

In another feature, the hopper car has upstanding wall structure defining a single hopper. All of that single hopper discharges through the shutter array. In another feature, the first shutter array has a width and a clearance above Top of Rail, and the width is more than 10 times as great as the clearance. In another feature, there are at least two the shutter arrays mounted side-by-side, and each of the shutter arrays includes at least openings and three corresponding louvers. In another feature, one of the louvers of the first shutter array has an arcuate closure edge. In another feature, the hopper car is a covered hopper car. In still another feature, the hopper car has a nominal area, $A_n$, that is the product of the car width multiplied by the truck center distance. The frame has a vertically projected area $A_f$; and the ratio $A_f/A_n$ is greater than ⅜.

In another aspect, there is a railroad hopper car, movable in a longitudinal direction along railroad tracks. The hopper car has a width cross-wise to that longitudinal direction. It has a car body defining a lading receptacle. The body has first and second truck centers, spaced apart by a truck center length. The car body has first and second ends, having respective first and second striker plates; and a car length measured over the striker plates. The lading receptacle has a discharge section that terminates downwardly at a rectangular frame. It has a frame length in the longitudinal direction and a frame width in the cross-wise direction. The frame length is greater than the width. The frame length is greater than at least one of (a) half the truck center length; and (b) one third of the car length measured over the striker plates.

In a feature of that aspect, the frame length is more than at least one of (i) ⅔ the truck center length; and (ii) ⅖ of the car length measured over the strikers. In another feature, the frame length is more than at least one of (i) ¾ of the truck center length; and (ii) ½ of the car length measured over the strikers. In a further feature, the frame width is greater than half the width of the railroad hopper car. In still another feature, the frame width is greater than ⅗ of the width of the railroad hopper car. In another feature, the frame is horizontal lengthwise and cross-wise. In still another feature, the frame terminates in a downwardly facing land; the downwardly facing land has a clearance height above TOR; and the width of the frame is greater than three times the clearance height. In another feature, the hopper car has a center sill and the frame is located downwardly of the center sill. In a further feature, the hopper car has side sills and the frame is located lower than the side sills. In still another feature, the car has a volumetric capacity of at least 4800 cu. ft and a truck center distance of less than 46'-3". In another feature, the railroad hopper car has a capacity of over 5400 cu. ft.

In still another feature, the hopper car has a sliding gate mounted to the frame of the discharge section, the sliding gate is a shutter gate has a plurality of louvers. In another feature, a plurality of shutter gates is mounted to the frame of the discharge section. In another feature, the hopper car is a flat-bottom hopper car. In still another feature, the hopper car has a nominal area, $A_n$, that is the product of the car width multiplied by the truck center distance.

In another aspect of the invention, there is a sliding gate assembly for a railroad hopper car. The gate assembly is a shutter gate. It has a plurality of alternating openings and slats, and a plurality of louvers slidable in the same direction to open and close the openings.

In a feature of that aspect, the gate assembly has a stationary member defining the plurality of openings and a movable member defining the plurality of louvers. In another feature, the sliding gate assembly is a two-piece gate assembly. It has a stationary member defining alternating openings and obstructed panels, and a movable member defining alternating openings and louvers. The movable member is slidable to align the respective openings in an open position of the sliding gate assembly, and to position the louvers of the movable member to block the openings of the stationary member in a closed position of the sliding gate assembly. In another feature, the sliding gate assembly is a three-piece sliding gate assembly in which a movable shutter plate has a plurality of openings alternating with a plurality of louvers. It is mounted between an upper stationary array and a lower stationary array. In another feature, the sliding gate assembly has a length, a width and a through-thickness; the through-thickness is less than one third of the length; and the through thickness is less than one third of the width. In still another feature, the sliding gate assembly has a length, a width, and a through thickness; the length is at least 50 inches; the width is between 30 inches and 88 inches; and the through-thickness is less than 20 inches. In another feature, the plurality of openings includes a first opening has a width cross-wise to the gate assembly and a length in a direction of opening of the louvers; and the width is at least three times as great as the length. In still another feature, the gate assembly has an inlet area, $A_i$, and an outlet area, $A_o$, and the ratio $A_o/A_i$ is less than ¾. In still another feature, the gate assembly includes a rectangular frame defining a land to mate to a hopper car discharge section. There is a number of intermediate cross-members that is one less than the number of louvers of the plurality of louvers. Each of the intermediate cross-members has a crown has sloped sides. Each respective crown is shy of the land.

In another feature, the sliding gate assembly has any combination of the features of those aspects and features and any one or more of (a) the sliding gate assembly has a length, a width and a through-thickness; the through-thickness is less than ⅛ of the length; and the through thickness is less than ⅕ of the width; (b) the sliding gate assembly has a length, a width, and a through thickness; the length being at least 80 inches; the width is between 50 inches and 88 inches; and the through-thickness is less than 12 inches; (c) the plurality of openings includes a first opening has a width cross-wise to the gate assembly and a length in a direction of opening of the louvers; and the width is at least five times as great as the length; and (d) the gate assembly has an inlet area, $A_i$, and an outlet area, $A_o$, and the ratio $A_o/A_i$ is less than one half.

In another aspect of the invention there is a sliding gate assembly for a railroad hopper car. It includes a stationary structure and a moving structure. The stationary structure has at least a first opening and a second opening through which to discharge lading. The stationary structure includes at least a first divider between the first and second openings. The moving structure includes at least a first shutter member and a second shutter member. The first and second shutter members linked to move together in sliding motion relative to the first and second openings. The first and second shutter members are movable between a first position and a second position positions relative to the first and second openings respectively. In the second position the openings is less obstructed by the shutter members than in the first position. In the second position, the second shutter is at least partially concealed by the divider.

In a feature of that aspect, the first and second positions are closed and open positions. In the first position the openings are closed to prevent the egress of lading from the hopper. In the second position the openings are open to permit egress of lading. In another feature, the shutters have a non-linear leading edge, and the shutters are progressively opening. In another feature, the stationary structure has a non-linear leading edge, the leading edge is arcuate, and is progressively exposed as the respective shutter opens.

In a further feature, there is a path-length distance of travel of the shutters between the closed position and the open position. The openings have a width across the gate, and a length in the direction of shutter movement. The width is greater than the length. There is a ratio of aperture width to aperture length. The ratio is in the range of 5:1 to 12:1. In an additional feature, the ratio is greater than 8:1. In another feature, the gate has a frame. The frame defines a periphery of the gate. The frame has two long cross-wise running sides and two length-wise running sides that co-operate to form a rectangle. The first divider extends across the inside of the rectangle. In another feature, a stationary pan is carried beneath and spaced apart from each divider, and the first and second shutters slide between the divider and the pan.

In another aspect of the invention there is a sliding gate for a railroad hopper car. It has a frame; a stationary member; and a movable member. The frame has a length in the rolling direction of the hopper car, and a width transverse to the rolling direction of the hopper car. The length is greater than the width. The frame is mountable to a hopper discharge section of the hopper car, and, when so mounted, the frame extending peripherally about the hopper discharge section. The stationary member extends across the frame transverse to the rolling direction of the hopper car. The movable member is co-operably mounted in sliding relationship to the stationary member. The movable member is movable between a first position and a second position relative to the stationary member. The first position defines a closed position of the gate in which the movable member and the stationary member co-operate to obstruct egress of lading through the frame. The second position defines a fully open position in which the movable member and the stationary member co-operate to expose at least a first opening through which lading may leave the hopper car. The first opening has a width cross-wise to the rolling direction of the hopper car and a length along the rolling direction of the hopper car, the width of the first opening is greater than the length of the first opening.

In a feature, the width is at least twice as great as the length. In another feature. the gate, or gate assembly, has at least first and second the openings. In another feature, the gate has a direction of opening that is cross-wise to the width of the opening. In still another feature, the gate includes at least a first beam running across the gate and a second opening, the beam is located between the first opening and the second opening. In yet another feature, the gate has a plurality of openings in the moving member, and slats located between the openings. The moving member has continuous side strips. The stationary member has slides defined therealong in which the side strips are movably engaged. In a further feature, the sliding gate assembly has a length, a width and a through-thickness. The through-thickness is less than one third of the length. The through thickness is less than one third of said width. In another further feature the length is at least 50 inches; the width is between 30 inches and 88 inches; the through-thickness is less than 20 inches; the plurality of openings includes a first opening that has a width cross-wise to said gate assembly and a length in a direction of opening of said louvers; and the width of the louvers or slats is at least three times as great as the length. In another feature the gate assembly has an inlet area, $A_i$, and an outlet area, $A_o$, and the ratio $A_o/A_t$ is less than ¾.

In another aspect, there is a railroad hopper car that has at least six sliding gate discharge openings spaced therealong in a single array.

In a feature of that aspect, the sliding gate discharge openings are grouped into at least a first array and a second array. The first array is mounted in a first hopper discharge gate assembly and the second array is mounted together in a second hopper discharge gate assembly. In another feature, the hopper car is a drop-bottom hopper car. In another feature, the hopper car has between 6 and 18 sliding gate discharge openings. In still another feature, the discharge openings are co-planar. In a further feature, the discharge openings alternate with non-opening members. In still another feature, the hopper car has a number of movable panels corresponding to the discharge openings. The movable panels are operable to open and close the discharge openings. In another feature, the movable panels are slidable between a closed position obstructing a respective discharge opening and an open position at least partially in overlap relationship relative to a respective one of the non-opening members. In still another feature, at least a group of the discharge openings co-operatively function to approximate a single opening. In a further feature, the discharge openings have an opening direction and a transverse direction, and the openings are more than twice as large in the transverse direction as in the opening direction. In another feature, the discharge openings are substantially co-planar. In a further feature, the discharge openings are located that is less than ⅓ of the height of the coupler centerline above TOR. In still another feature, the hopper car has a center sill, the center sill has a bottom flange, and the discharge openings are located less than ½ of the height of the bottom flange above TOR. In a yet further feature, the hopper car has a unitary hopper discharge section, the unitary hopper discharge section including a frame, the frame is rectangular; and all of the at least six hopper discharge openings are mounted to the frame.

In another feature, the hopper car has left hand and right hand side walls. The side walls have a respective side sheet and a side sill. The side sheet has a lower margin that mates with a side slope sheet of a hopper discharge at a slope discontinuity defining a transition between the side sheet and the side slope sheet. The transition is located downwardly of the side sill. In still another feature the railroad hopper car has a center sill. The center sill has a top cover plate. The transition is located lower than the top cover plate of the center sill. In yet another feature, the hopper car has a unitary hopper. The unitary hopper has a discharge. The discharge has a frame. The frame is a bottom frame of the discharge. The discharge openings are mounted to the frame of the unitary hopper. In yet another feature, the hopper car has a center sill. The hopper car has a rectangular frame bounding a unitary discharge section. The discharge openings are mounted to the rectangular frame. There is a least a first intermediate cross-member mounted within the frame. The first intermediate cross-member passes below the center sill. In another feature, the rectangular frame extends in a plane that is lower than the center sill. In another feature, all of the discharge openings are mounted to the rectangular frame, and, when so mounted, the hopper car has a flat bottom dropped-center section. The railroad hopper car has a nominal projected area $A_n$ equal to car width multiplied by truck center distance. The rectangular frame has an inside clearance area, $A_f$. A ratio $A_f/A_n$ is greater than 35%.

In another aspect of the invention there is a railroad hopper car has a flat-bottomed drop center, the railroad hopper car is bottom-discharging.

In a feature, the flat-bottomed drop center forms a unitary discharge section of the hopper car. In another feature, the hopper car has a center sill, and the flat-bottomed drop center passes below the center sill. In still another feature the hopper car has a discharge section and side walls has side sheets and side sills. The side sheets meet with respective convergent side sheets of the discharge section at a transition at which there is a slope discontinuity. The transition is located downwardly of the side sills. In another feature, a plurality of sliding discharge gates is mounted to the flat-bottomed drop center of the hopper car. In another feature, the flat-bottomed drop center includes a discharge opening frame, and a plurality of sliding discharge gates are mounted thereto. In yet another feature, the railroad hopper car is carried on trucks for rolling motion along railroad tracks in a lengthwise direction. The car has a truck center distance between the trucks; the hopper car has sliding discharges gates mounted to the drop center. The discharge gates have a combined opening length in the lengthwise direction that is at least ⅓ of the truck center distance.

In another feature, the railroad hopper car is carried on trucks for rolling motion along railroad tracks in a lengthwise direction. It has discharge gates mounted to the drop center. The discharge gates have an opening width cross-wise to the lengthwise direction. The opening width is greater than ⅖ of the AAR Plate C lowermost underframe clearance width. In another feature, it has a truck center distance and there is a nominal area, $A_n$, defined by the product of the truck center distance and the AAR Plate C lowermost underframe clearance width. The discharge gates have a combined area, $A_{total}$, that is greater than ¼ of $A_n$. In another feature, the hopper car has at least one sliding discharge gate mounted to the drop center. The sliding discharge gate has a length, a width, and a through thickness. The through thickness is less than ⅓ of the width and less than ⅕ of the length. In a further feature, the hopper car has at least one sliding discharge gate mounted to the drop center. The hopper car has a center sill. The center sill has a vertical depth. The sliding discharge gate has a length, a width, and a through-thickness, and the through-thickness is less than the depth of the center sill. In another feature, the hopper car has at least a first discharge gate mounted to the drop center. The first discharge gate is a sliding discharge gate. The sliding discharge gate including at least two openings and slidable slats movable to open and close the openings. In yet another feature, the hopper car has at least a first discharge gate and a second discharge gate mounted to the drop center. The first and second discharge gates are sliding discharge gates.

In another feature, each of the first and second discharge gates has an array of sliding shutters, the shutters has a width that is greater than its length in the direction of motion of opening and closing. In a further feature, the first discharge gate has an entry area, $A_i$, and an outlet area, $A_o$, and the ratio $A_o/A_i$ is less than ¾. In another feature, the first and second discharge gates have respective opening lengths and opening widths. The first and second discharge gates are spaced apart along the hopper car by a distance that is less than the opening length of the first discharge gate. In a still further feature, the bottom discharge includes a total number of discharge openings that is at least as great as seven. In a yet further feature, the bottom discharge includes a sets of discharge openings separated into at least two arrays, in which the two arrays corresponds to sets of openings of a first discharge gate and a second discharge gate. In another feature, the hopper car has a truck center length of less than 46'-3", and a lading volume capacity of at least 5000 cu. ft.

In another feature taken in addition to the combinations of aspects and features recited above, there is at least one of: (a) the discharge gates have a combined opening length of at least half the truck center distance; (b) the discharge gates have an opening width that is at least ⅔ of the AAR Plate C lowermost underframe clearance width; (c) the discharge gates have a combined area, $A_{Total}$, that is greater than ⅜ of $A_n$; (d) the through thickness of the first discharge gate is less than ⅕ of the width thereof and less than ⅛ of the length thereof; (e) the through thickness of the first discharge gate is less than half the depth of the center sill; (f) the first discharge gate has between three and eight openings and corresponding slidable slats movable to open and close the openings; (g) the shutters has a width that is greater than four times its length in the direction of motion of opening and closing; (h) the ratio $A_o/A_i$ is less than one half; (i) the first and second discharge gates are spaced apart along the hopper car by a distance that is less than one half the opening length of the first discharge gate; (j) the bottom discharge includes a total number of discharge openings that is at least as great as nine; (k) the bottom discharge includes a sets of discharge openings separated into at least three arrays, with one such array per discharge gate; and (1) the hopper car has a truck center length of less than 40 ft., and a lading volume capacity of at least 5400 cu. ft.

In another aspect there is a drive transmission assembly for a sliding gate of a railroad hopper car, the drive transmission assembly has a shaft and a set of articulated linkages. The shaft has a radially extending lug. The set of articulated linkages includes a first end linkage and a second end linkage. The set of articulated linkages forms a continuous drive between the first end linkage and the second end linkage. The first end linkage has a first end connection mounted to the lug. The second end linkage has a second end connection mounted to the sliding gate. In operation, the set of linkages coiling around the shaft when the shaft is turned in a first direction, and un-coiling from the shaft when the shaft is turned in an opposite direction.

In a feature of that aspect, when the set of linkages is wound around the shaft, the set of linkages is self-locking. In another feature, the shaft has a radially outwardly extending wheel. The wheel defines the lug to which the first linkage is attached. In another feature, the set of linkages winds about the wheel. In still another feature, the first end linkage of the set of articulated linkages has a channel section. When the set of articulated linkages is wound around the shaft, the channel section of the first end linkage nests on the wheel. In another feature, the lug extends radially outwardly of the wheel. In another feature, the second end linkage of the set of linkages has a channel section. The channel section of the second end linkage nests on the wheel when the set of linkages is wound about the shaft. In a further feature, the linkages are struts, and, as the linkages are unwound from the shaft the linkages are paid out to lie against the sliding gate; and the linkages are struts operable in compression and tension. In a still further feature, the linkages of the set of articulated linkages are positioned to operate in compression in closing the sliding gate, and are positioned to operate in tension in opening the sliding gate. In still another feature, the shaft has a set of lobes mounted thereto. The first end linkage of the set of articulated linkages is pivotally mounted to a first lobe of the set of lobes. The set of articulated linkages has articulations that seat between lobes of the set of lobes as the set of articulated linkages is wound around the shaft. In another feature, the linkages form a track when paid out against the sliding gate. The linkages have mating backs that form a compression transmitting spine. In a still further feature, in operating in compression, forces transmitted from one linkage to the next are transmitted along a line of action. Adjacent linkages meet at respective articulations. The line of action in compression is eccentric to the respective articulations. Compressive force transmitted along the line of action biases the adjacent linkages to remain aligned. In another feature, the shaft is mounted lower than the sliding gate. In still another feature, the shaft is limited by the set of articulated linkages to a range of motion of less than one full revolution.

These and other aspects and features of the invention may be understood with reference to the description that follows, and with the aid of the illustrations.

BRIEF DESCRIPTION OF THE FIGURES

In the Figures:

FIG. 1d is a top view of the railroad freight car of FIG. 1a;

FIG. 1e is a bottom view of the railroad freight car of FIG. 1a;

FIG. 1g is an end view of the railroad freight car of FIG. 1a;

FIG. 2e shows an enlarged detail of the cross-sectional view of FIG. 2a;

FIG. 3a is a perspective view from above and to one side of a gate assembly for the hopper car of FIG. 1a;

FIG. 3c is a top view of half of the gate assembly of FIG. 3a;

FIG. 3d is an end view of the gate assembly of FIG. 3a;

FIG. 3e is a side view of the layout of three gate assemblies of FIG. 3a as mounted to the body of the railroad freight car of FIG. 1a;

FIG. 3f is a perspective view of the cross-member of the gate assembly of FIG. 3a;

FIG. 3g is a perspective view of an external frame of the gate assembly of FIG. 3a;

FIG. 4a is a top perspective view of the stationary member of the shutter assembly of FIG. 3a;

FIG. 4b is a bottom perspective view of the stationary member of the shutter assembly of FIG. 4a;

FIG. 4c is an end view of the stationary member of the shutter assembly of FIG. 4a;

FIG. 4d is a side view of the stationary member of the shutter assembly of FIG. 4a;

FIG. 4e is a cross-sectional view of the stationary member of the shutter assembly of FIG. 4a taken on section '4e-4e' of FIG. 4c;

FIG. 4f is a top view of the stationary member of FIG. 4a;

FIG. 4g is a bottom view of the stationary member of FIG. 4a;

FIG. 5a is a perspective view of the movable shutter of the assembly of FIG. 4a;

FIG. 5b is a top view of the movable shutter of FIG. 5a;

FIG. 6a shows a cross-sectional view of an enlarged detail of the gate assembly of FIG. 3a as installed on the railroad freight car of FIG. 1a, taken on section '6a-6a' of FIG. 3d;

FIG. 6b is an enlarged detail of a drive pinion of the gate assembly of FIG. 3a;

FIG. 7a is an alternate version of the enlarged detail of FIG. 6a;

FIG. 7b is a perspective view of a door operating mechanism of the detail of FIG. 7a;

FIG. 8a is an alternate enlarged detail to that of FIG. 6a;

FIG. 8b is a side view of a door operating mechanism of the enlarged detail of FIG. 8a as extended; and FIG. 8c is a side view of the mechanism of FIG. 8a as retracted;

FIG. 9c is an enlarged detail of the drive mechanism of the gate assembly of FIG. 9a;

FIG. 9e shows a detail of an input shaft of the drive mechanism of FIG. 9a;

FIG. 10a shows a general arrangement perspective view from above of an alternate embodiment of gate assembly to that of FIG. 3a;

FIG. 10c is a side view of the gate assembly of FIG. 10a;

FIG. 10d is an end view of the gate assembly of FIG. 10a;

FIG. 10e is a view similar to FIG. 6a for the embodiment of FIG. 10a;

FIG. 11a is a perspective view from above of a moving member of the gate assembly of FIG. 10a;

FIG. 11b is a perspective view from below of the moving member of FIG. 11a;

FIG. 11c is a top view of the moving member of FIG. 11a; and

FIG. 11d is an end view of the moving member of FIG. 11a;

DETAILED DESCRIPTION

Figure 1A:
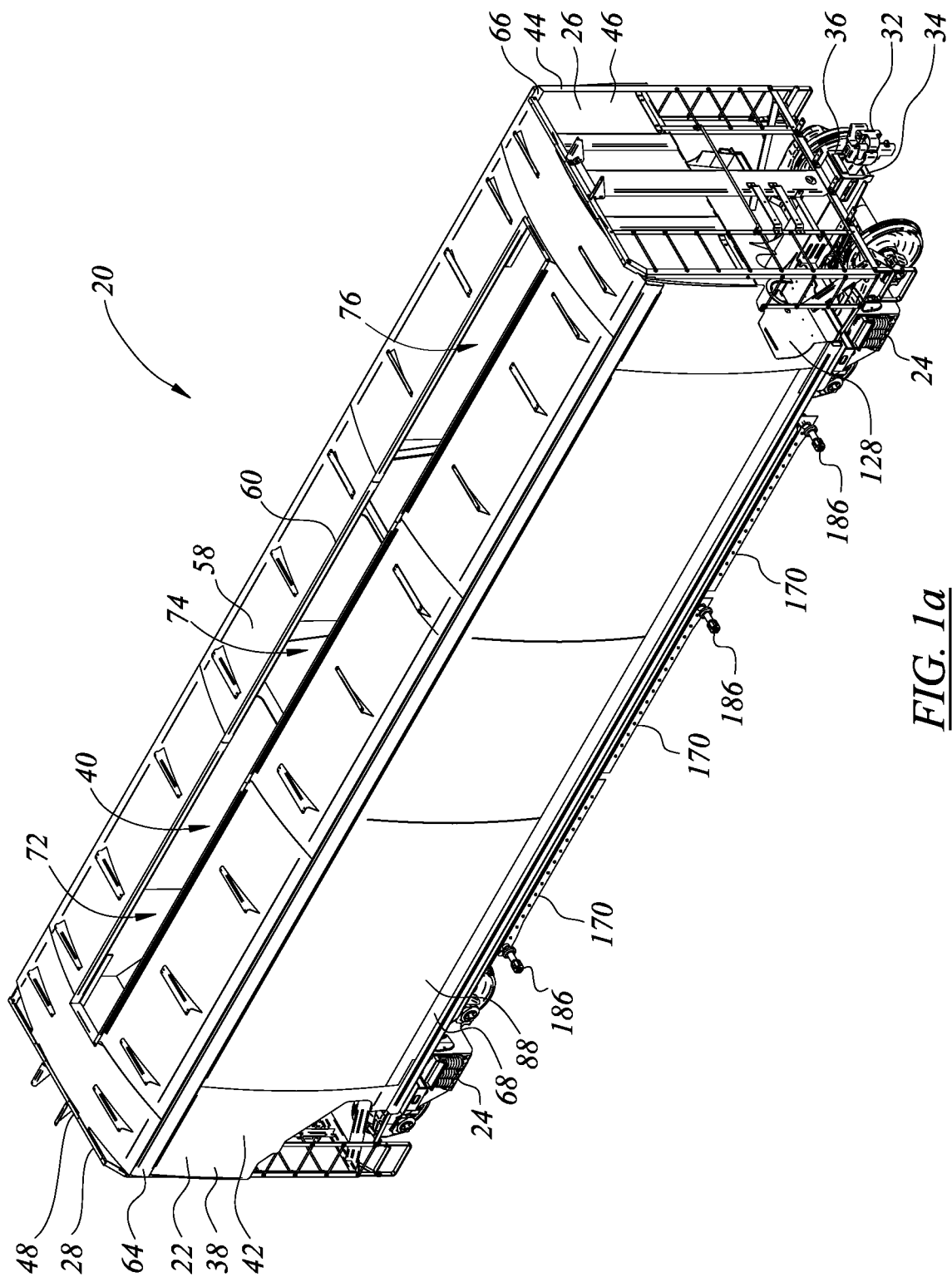
FIG. 1a is an isometric general arrangement view of a railroad freight car, from above, to the right, and to one end.

The description that follows, and the embodiments described therein, are provided by way of illustration of an example, or examples, of particular embodiments of the principles, aspects or features of the present invention. These examples are provided for the purposes of explanation, and not of limitation, of those principles and of the invention. In the description, like parts are marked throughout the specification and the drawings with the same respective reference numerals. The drawings may be taken as being to scale unless noted otherwise.

The terminology used in this specification is thought to be consistent with the customary and ordinary meanings as understood by a person of ordinary skill in the railroad industry in North America. The Applicant incorporates by reference the Rules and Standards of the Association of American Railroads, a private body that establishes rules for interchange operation of railroad rolling stock in North America. To the extent that this specification or the accompanying illustrations may refer to standards of the Association of American Railroads (AAR), such as to AAR plate sizes, those references are to be understood as at the earliest date of priority to which this application is entitled. In particular, the Applicant incorporates AAR Plates C and F, and the Double-Stack Container Plate. The Applicant notes the datum truck center distance of 46'-3" and the datum car width of 10'-8" established by the AAR. The datum truck center distance is the maximum truck center length permitted without requiring allowance for swing-out. 10'-8" is the maximum car width allowed for cars having truck center distances up to the datum length of 46'-3". Longer cars must be narrowed to account for swing-out.

Furthermore, this specification frequently recites multiple synonyms for a single object. The recitation of multiple synonyms is intended to convey that any synonym may be used for a given part, whether or not that synonym is used in the disclosure as filed, provided that it conforms to the meaning of the concept, function, or object conveyed on a fair reading of the disclosure, or that is fairly shown in the illustrative figures, or both.

In general orientation and direction, for railroad cars herein the longitudinal direction is defined as being coincident with the rolling direction of the railroad car, or railroad car unit, when located on tangent (that is, straight) track. In a Cartesian frame of reference, this may be the x-axis, or x-direction. In a railroad car having a center sill, be it a stub sill or a straight-through center sill, the longitudinal direction is parallel to the center sill, and to the top chords and side sills. Unless otherwise noted, vertical, or upward and downward, are terms that use top of rail, TOR, as a datum. In a Cartesian frame of reference, this may be defined as the z-axis, or z-direction. In the context of the car as a whole, the term lateral, or laterally outboard, or transverse, or transversely outboard refer to a distance or orientation relative to the longitudinal centerline of the railroad car, or car unit, or of the centerline of a centerplate at a truck center. In a Cartesian frame of reference this may be referred to as the y-axis or y-direction. Given that the railroad car may tend to have both longitudinal and transverse axes of symmetry, a description of one half of the car may generally also be intended to describe the other half as well, allowing for differences between right hand and left hand parts. Accordingly, the term "longitudinally inboard", or "longitudinally outboard" is a distance taken relative to a mid-span lateral section of the car, or car unit. Pitching motion is angular motion of a railcar unit about a horizontal axis perpendicular to the longitudinal direction (i.e., rotation about an axis extending in the y-direction). Yawing is angular motion about a vertical or z-axis. Roll is angular motion about the longitudinal, or x-axis. In this description, the abbreviation kpsi, if used, stands for thousand of pounds per square inch. Unless otherwise noted, it may be understood that the railroad cars described herein are of welded steel construction.

FIG. 1a shows an isometric view of an example of a railroad freight car 20 intended to be representative of a range of railroad cars in which one or more of the various aspects or features of the present invention may be incorporated. Railroad freight car 20 may be, and in the example embodiment illustrated is, a hopper car. It may be an open topped hopper car or, as illustrated, a covered hopper car. In either case, railroad freight car 20 is a gravity discharge car. Such a car may also be termed a "flow through" car in which lading is loaded through the top of the car, and discharged through the bottom. That is, generally speaking, the lading is introduced from above, while the hopper gates are closed, and is discharged under the influence of gravity by opening gates in the bottom of the car. The terms "bottom opening", "bottom dumping", or "bottom discharging", and the like, amount to the same thing, however termed.

Hopper car 20 has a body 22 that is carried on trucks 24 for rolling motion along railroad tracks in the longitudinal or x-direction. Body 22 is a lading containment body. Each of trucks 24 has a Truck Center (CL—Truck). Car 20 has first and second ends 26, 28, at which there are couplers 32 for connection to adjacent railroad cars. Couplers 32 are mounted to draft gear, which is mounted in draft sills at the ends of the center sill 36 of car 20, longitudinally outboard of the respective Truck Centers. The outboard end of the draft sill is the "striker plate" or "striker" 34. The inboard end of the draft sill terminates at main bolster 30. The centerlines of main bolster 30 and the draft sill (i.e., center sill 36) intersect, typically at the respective Truck Center. Center sill 36 may have the form of stub sills mounted at the respective end sections of car 20, or it may be a straight-through center sill, as illustrated.

As a matter of definition, the end sections of car 20 may tend to be thought of as those portions, or sections, of car 20 that extend above respective trucks 24. The end section typically includes the main bolster, the shear plate or stub wall mounted over the bolster, and the structure of the car lying longitudinally outboard of the main bolster to the corners, or "points" of car 20. It also typically includes the structure of the car extending longitudinally inboard of the truck centers over the inboard wheelsets of trucks 24, and such fenders, or shields, or slope sheets or portions of slope sheets as may extend over the trucks to prevent lading from falling on the trucks, to the transitional structure at which the car body deepens downwardly of the bottom flange or bottom cover plate of the draft sill at the truck center. There may also be a center portion or center section located between the end portions or end sections, the center portion generally running from one end slope sheet to the other end slope sheet, and including the discharge section of car 20. In terms of car 20, the center section or center portion of car 20 includes a drop-center region in which the lading containment shell extends downwardly below the center sill, and is deeper than the lading containment shell over the end sections.

Figure 1B:
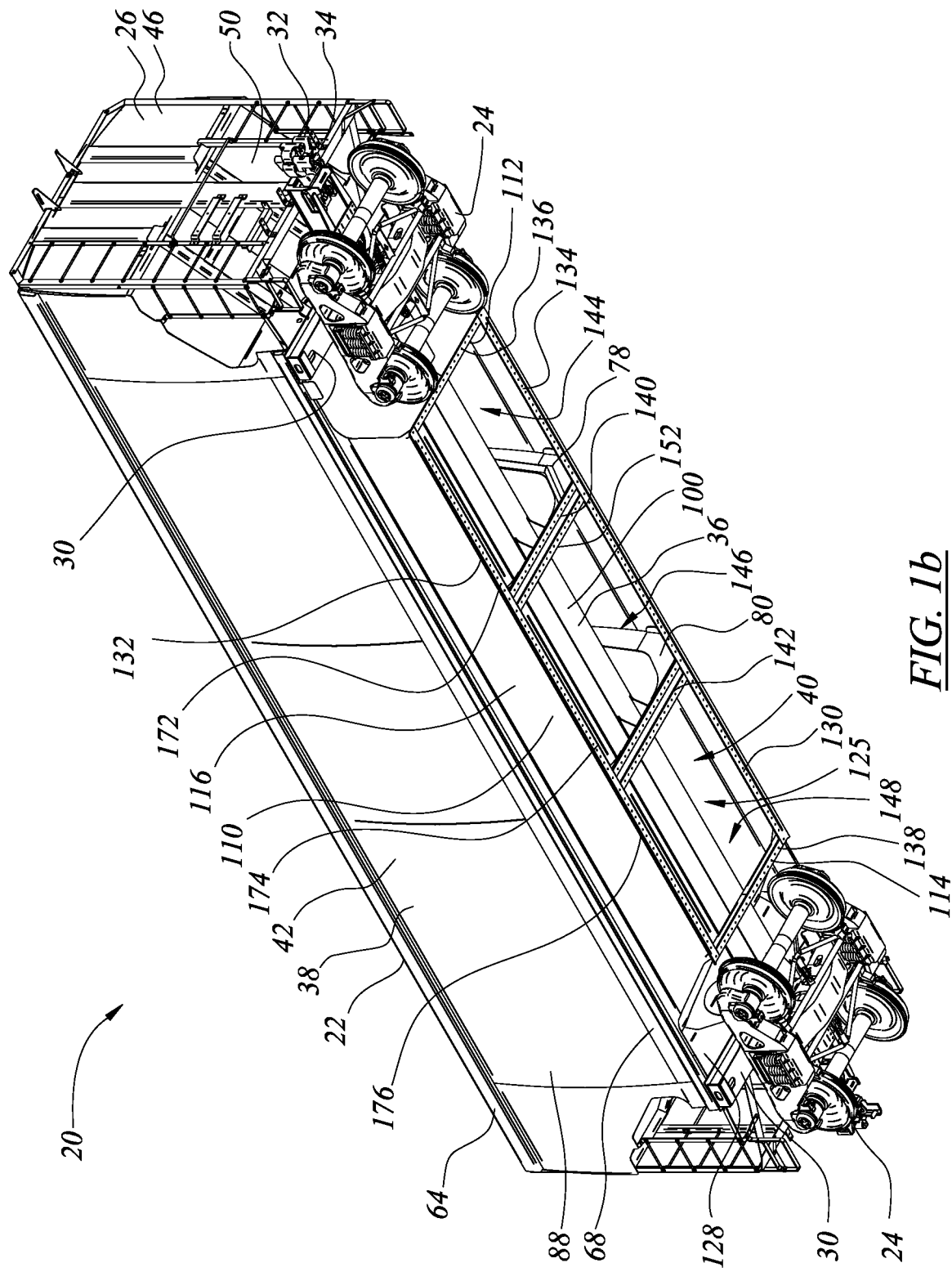
FIG. 1b is a an isometric general arrangement view of the railroad freight car of FIG. 1a from below to the right and to one end.
Figure 1C:
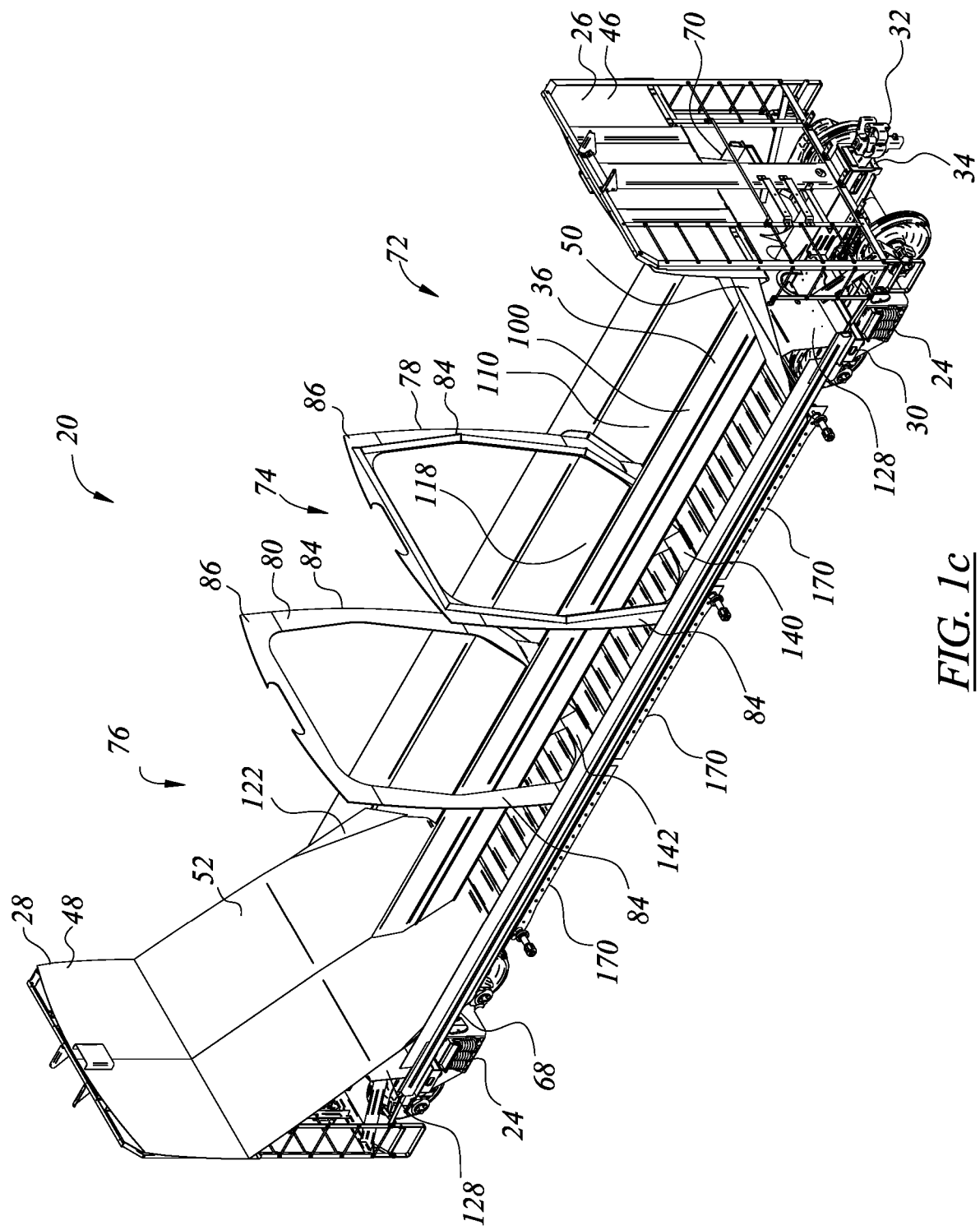
FIG. 1c is a view of the railroad freight car of FIG. 1a with the roof and side walls removed to reveal interior frames and other details.

As a further matter of definition, as noted, this specification concerns hopper cars. More particularly, it is the nature of hopper cars that they are bottom dumping, or bottom discharging, and have hopper discharge sections constructed toward that end. In this context, hopper cars have been historically distinguished as being distinct from gondola cars. Gondola cars have a lading containment body, but may be emptied by removing lading from the top or by tipping the car body, e.g., as by rotary dumping. A gondola car may be a plain gondola with a flat deck, as in a mill gondola, with a straight through center sill. The center sill may be a fishbelly center sill (i.e., the central portion of the center sill has greater depth between the trucks than at the truck centers over the trucks. Alternatively, gondola cars may have depressed centers, as in a tub gondola car, or bath tub gondola car, such as seen for transporting coal. As indicated on Wikipedia at https://en.wikipedia.org/wiki/Hopper_car, "A rotary car dumper permits the use of simpler and more compact (because sloping ends are not required) gondola cars instead of hoppers." Further, drop center, or depressed center, gondola cars are seen in U.S. Pat. No. 4,331,083 of Landregan et al., and, in a taller version, in U.S. Pat. No. 9,346,472 of Black et al. As seen, Landregan FIG. 1 shows a gondola car with shallow end portions or end sections over the trucks, and a deep central portion or central region between the trucks. The "flat bottom" of Landregan is seen in sheets 106 of FIG. 1 in side view, and in cross-wise section in FIG. 4. Landregan has a straight-through center sill. Black shows the flat bottom floor of central portion 72 in FIGS. 1f and 2b. Black has stub center sills, and U-shaped cross-bearers 102 that extend between the vertical load-bearing side walls 40, 42. While Landregan and Black have the increased volume of dropped-center gondola cars, they are not hopper cars, and so are not bottom opening, bottom dumping, or bottom discharging, however it may be termed. They must either be emptied from above, e.g., by a shovel system, or the car itself must be tipped as in a rotary dumper.

Figure 1F:
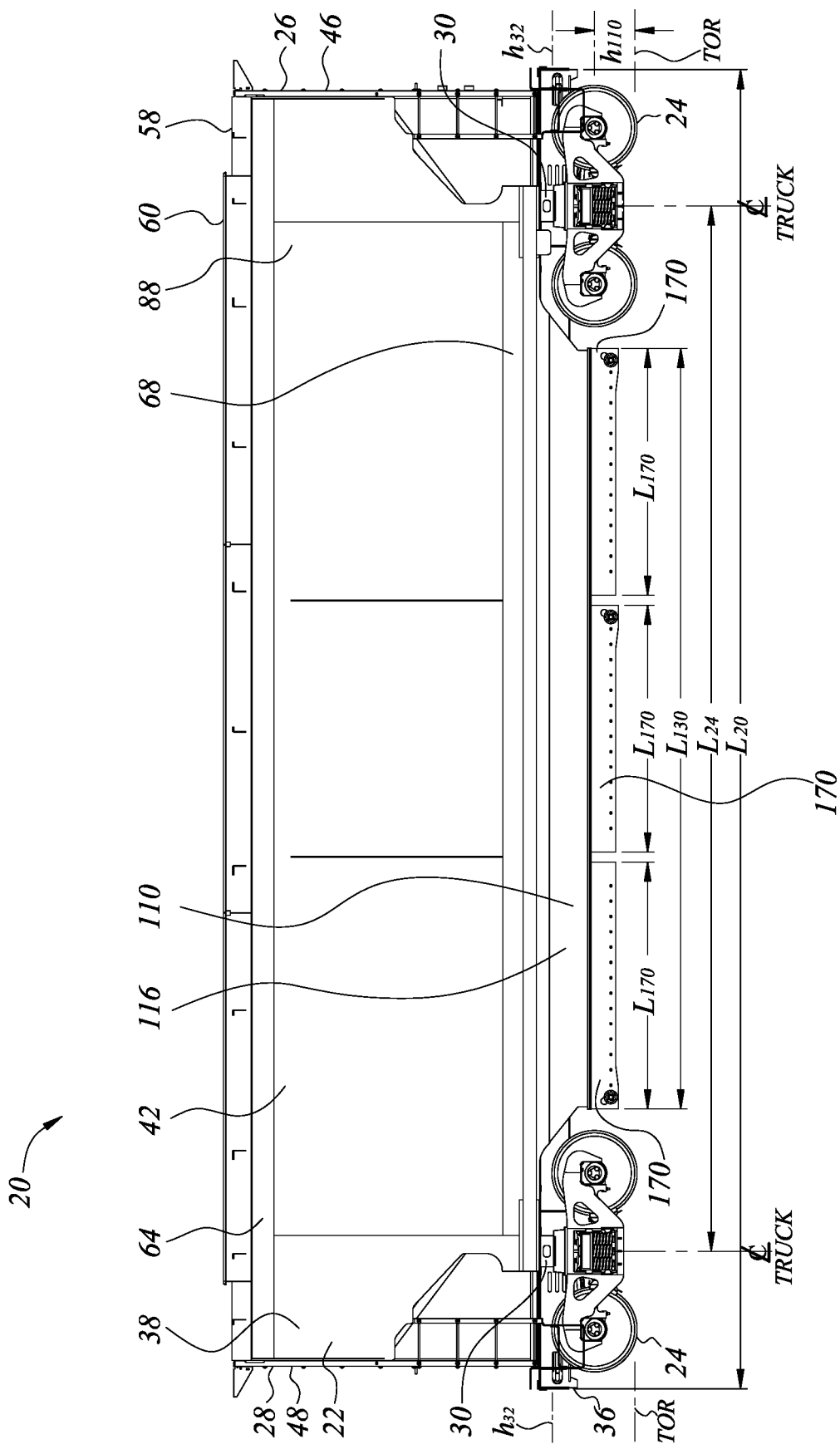
FIG. 1f is a side view of the railroad freight car of FIG. 1a, the opposite side view being substantially the same, but of opposite hand.
Figure 1G:
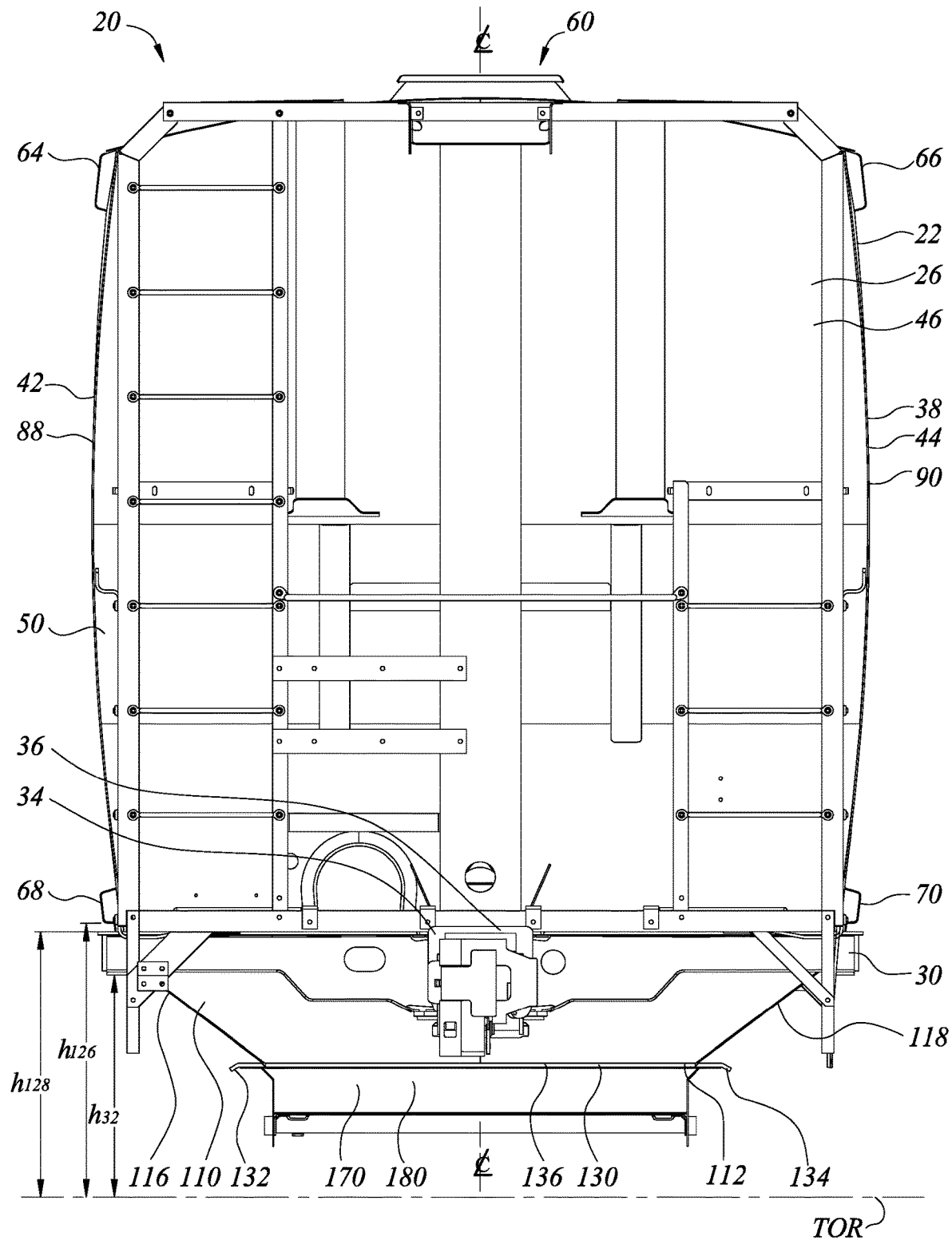
Figure 2A:
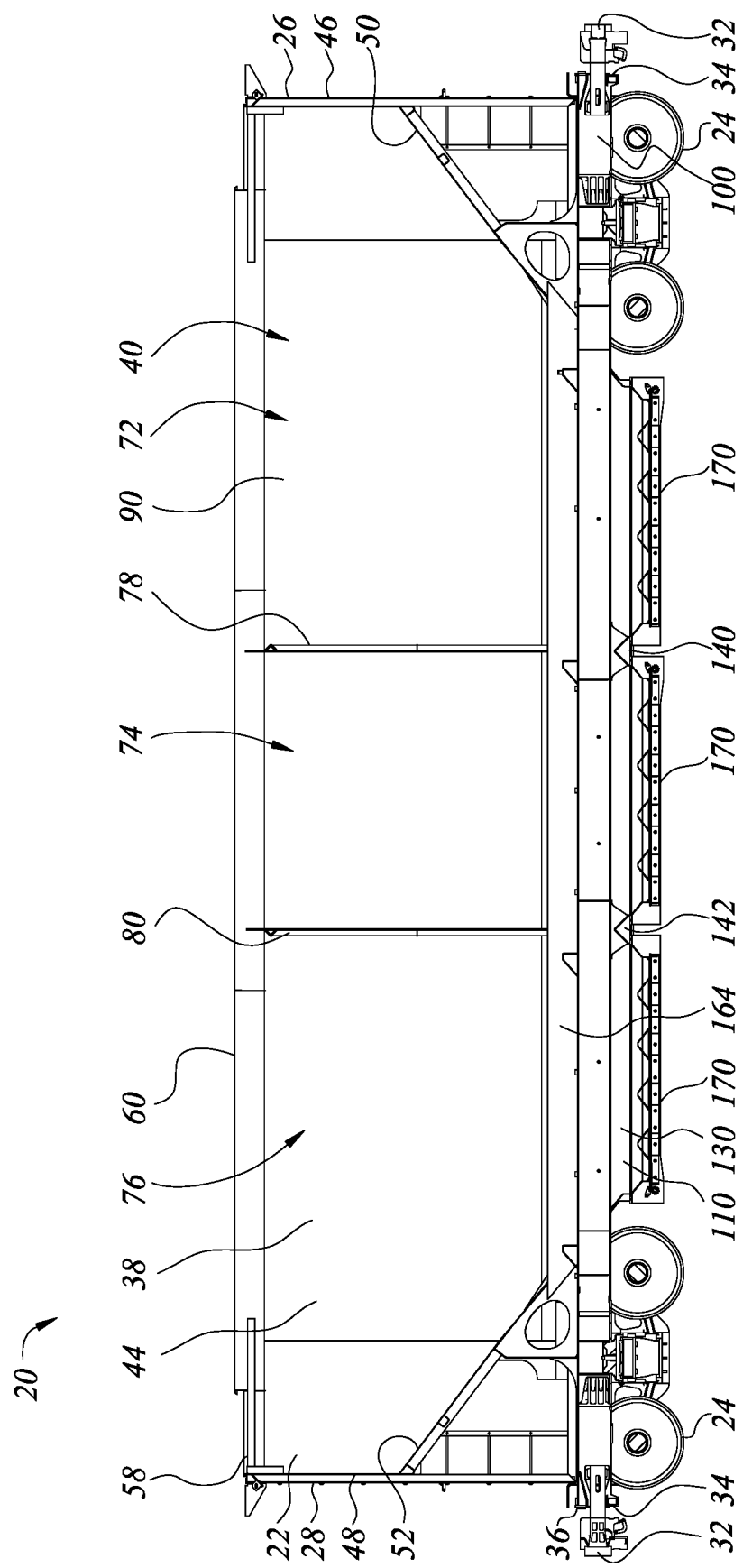
FIG. 2a is a sectional view of the railroad freight car of FIG. 1a taken on a vertical plane on the longitudinal car centerline at section '2a-2a' of FIG. 1d.
Figure 2B:
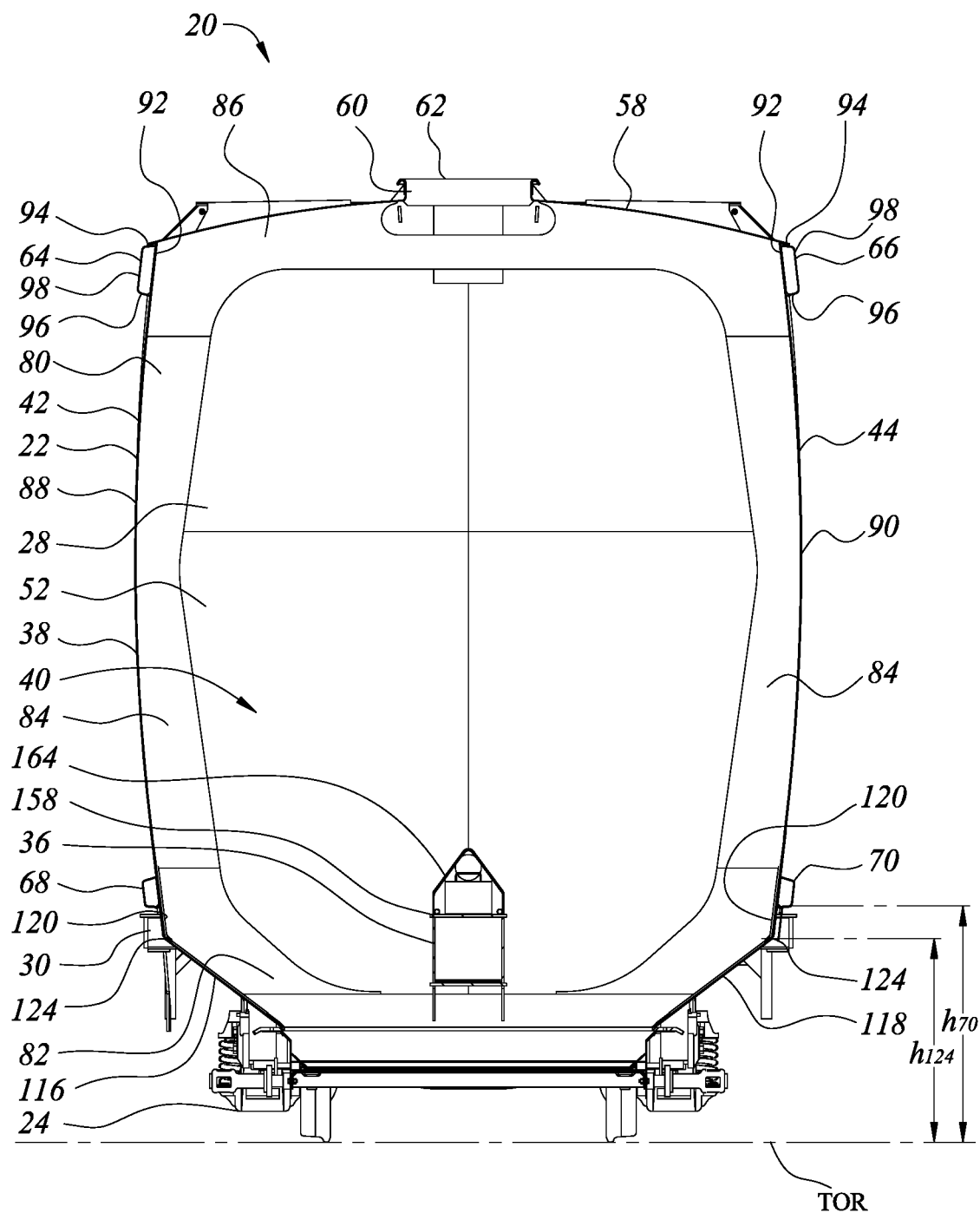
FIG. 2b is a cross-sectional view of the railroad freight car of FIG. 1f on a plane transverse to the longitudinal centerline taken on section '2b-2b'.

In car 20 as illustrated, in side view as seen in FIG. 1f, the center portion of the hopper car between trucks 24 approximates the appearance and form of a drop-center portion of a drop-center gondola car. However, unlike a drop center gondola car, car 20 is bottom discharging. In that sense, car 20 could be termed, or thought of as, a bottom discharge gondola car, or, alternatively, a flat bottom hopper car.

As illustrated, in car 20 center sill 36 is a through-center, or straight-through, center sill that runs the length of the car from truck center to truck center, and includes draft sill portions that extend longitudinally outboard of the truck centers. In some embodiment herein, the truck center distance is less than or equal to 46 ft.-3 in. In some embodiments, the truck center distance is less than 40 ft., and in the embodiment illustrated the truck center distance is 39 ft.

Body 22 also includes a lading container, or wall structure, or lading containment shell, 38. The space within lading containment shell 38 defines the chamber, or accommodation, or enclosed space, or internal volume 40 that can be filled with lading. In that sense, enclosed space 40 defines the useful volume that can be filled with lading. In some embodiments, the car has a volumetric capacity of greater than 5000 cu. ft. In these embodiments, the truck center distance is less than or equal to 46'-3". In the particular embodiment shown and described herein the car has a capacity of over 5400 cu. ft., and a truck center distance of less than 40'-0", the truck length shown being about, or up to, 39 ft.

Containment shell 38 includes upstanding side walls 42, 44; upstanding end walls 46, 48; and slope sheets such as end slope sheets 50, 52. In the past, a car having two or more hoppers also may be expected to have intermediate slope sheets. If it is a covered hopper car, containment shell 38 also includes a roof structure 58 having roof sheets 59 and an input opening such as a hatch, or trough, 60. As shown, the opening of trough 60 has a peripheral coaming 61. The trough opening is, in essence, a long slot formed in the center of the roof structure through which to admit lading. The trough may have a lid or cover, 62, that seats over the coaming to exclude rain, snow, and other contaminants. Car 20 has top chords 64, 66 that run along car 20 from end to end, and that are located at, and may define, the junction at which roof structure 58 meets, and mates with, the upper margins of upstanding side walls 42, 44. Car 20 may also have side sills 68, 70 that run from end to end of the side walls between main bolsters 30.

By definition, a hopper car must have at least one hopper. It can also have more than one hopper. Cars with two, three, four or more hoppers are known. As shown, railroad freight car 20 has zones that could correspond to three such hoppers, namely a first hopper or first region 72 of internal volume 40 (being a first end hopper), a second hopper or second region 74 of internal volume 40 (being in internal, mid, or central hopper), and third hopper or third region 76 of internal volume 40 (being a second end hopper). In a two-hopper car there would only be two end hoppers, 72 and 76, joined together. In a more-than-three hopper car there would be more than one internal or mid hopper 74 mounted between end hoppers 72 and 76.

In the structure illustrated there are two, (i.e., first and second), intermediate frames 78, 80. Frame 78 is intermediate hopper or region 72 and hopper or region 74; and frame 80 is intermediate hopper or region 74 and hopper or region 76. Were there more than three regions of internal volume 40, there could be correspondingly more frames, there being a frame between each two regions. Frames 78, 80 may not necessarily block communication between adjacent hoppers or regions of internal volume 40. That is, frames 78, 80 may be (and in the embodiment illustrated are), partially open to form an open internal rib, as shown. Frames 78, 80 may have a lower transverse portion or region 82, which extends cross-wise (i.e., across the car, transverse to the center sill in the y-direction) and act as a cross-bearer or cross-tie between the center sill and the two sides of the car body. Frames 78, 80 may also have side portions 84 that extend upwardly and that form internal reinforcements of the first and second side wall sheets 88, 90. Portions 82 and 84 may be joined at, or by, moment connections, or may merge to form a continuous moment-transferring web or stem relative to each other and to the side wall sheets that form flanges relative to those stems. As such, a U-shaped rib is formed. Additionally, there may be, and in the embodiment shown there is, an upper transverse region or portion 86 of ribs or frames 78, 80 that completes, or closes, the space between the mutually opposed upward ends or toes of portions or regions 84 to form a continuous or closed periphery so that the rib forms a continuous ring or O-shape within the car body. Frames 78, 80 may be referred to as ring frames. Frames 78, 80 may be connected to, and may having internal web continuity across body 22 of car 20 through, or below, center sill 36, and may form (and in the embodiment shown, do form) part of the internal skeleton of car 20. Frames 78, 80 are internal frames. Alternatively, or additionally, in other embodiments, external reinforcements may be added to side walls 42, 44 on the outside of first and second side wall sheets 88, 90.

The hoppers, or hopper regions 72, 74, 76 (and so on), may be generally open as between each other, as in the embodiment shown in FIG. 1c. Alternatively they may have continuous, laterally extending bulkheads or partitions or webs that segregate the content of one hopper portion or region from the next-adjacent one. Such partitions may also function as lateral reinforcements, or shear plates, or frames, such as may tend to encourage containment shell 38 to maintain its shape. The presence of such partitions would divide internal volume 40 of car 20 into distinct and separate hoppers. However, where there is no such bulkhead or partition, car 20 as shown has, in effect, a single continuous hopper or lading containment space or volume.

As noted, top chords 64, 66 run along the respective upper margins of side walls 42, 44. That is, each side wall 42, 44 may be considered to be a deep section beam that includes the respective side sill 68, 70, the side sheet 88, 90, and the top chord 64, 66. In such a structure the side sill functions as, or defines, the bottom flange of the deep beam, the top chord functions as, or defines, the top chord of the deep beam; and the side sheet functions as, or defines, the upstanding shear web that provides a shear connection between the top and bottom chords of the beam. End walls 46, 48, slope sheets 50, 52 and intermediate frames 78, 80 impose a curved profile on side sheets 88, 90, and discourage buckling in the arcuate surface profile of the shear web. Top chord 64, 66 may itself be a hollow structural section having a leg 92 that mates with the upper margin of side wall sheet 88 or 90, as may be, and a lateral flange 94 the forms the upper margin, or upper flange of the section. It may also include a lower flange 96 and a second leg 98. The legs and flanges 92, 94, 96 and 98 co-operate to form a closed periphery hollow section. Lower flange 96 may be formed on a diagonal, or oblique angle, the better to merge less abruptly with the side wall sheet 88, 90, at a chamfer or radius, rather than at a square edge. Where hopper car 20 includes a roof structure 58, as when hopper car 20 is a covered hopper car, sheets 59 of the roof section may meet the upper margin of the respective side wall 46, 48 at top chord 64, 66, such that roof sheet 59, being mounted to the top chord, and therefore in structural co-operation with sheet 88 or 90, may function as an extended, predominantly lateral, out-of-plane section that also functions as a flange relative to side wall sheet 88, 90 as may be.

Figure 2C:
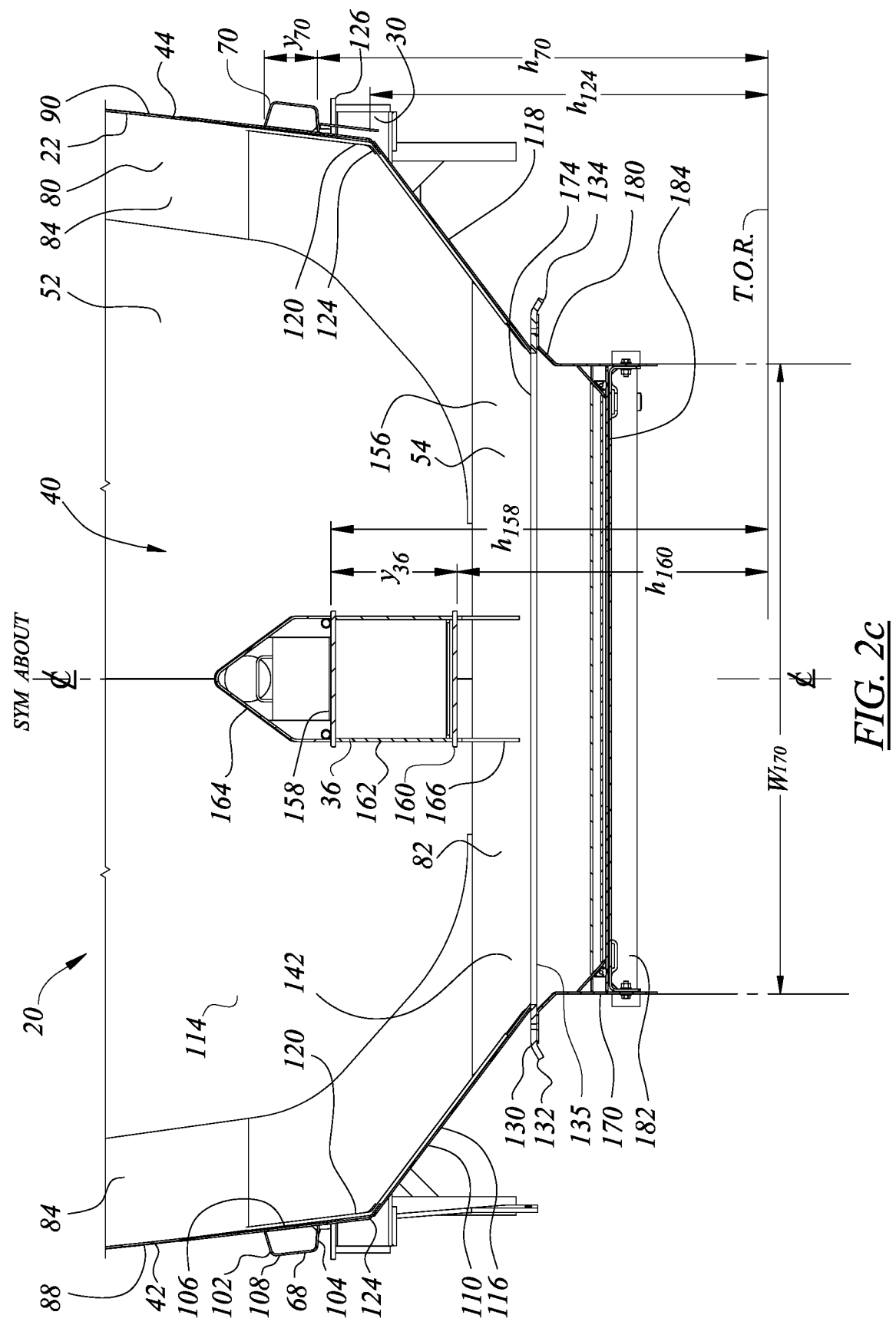
FIG. 2c shows an enlarged detail of the cross-section of FIG. 2b.
Figure 2D:
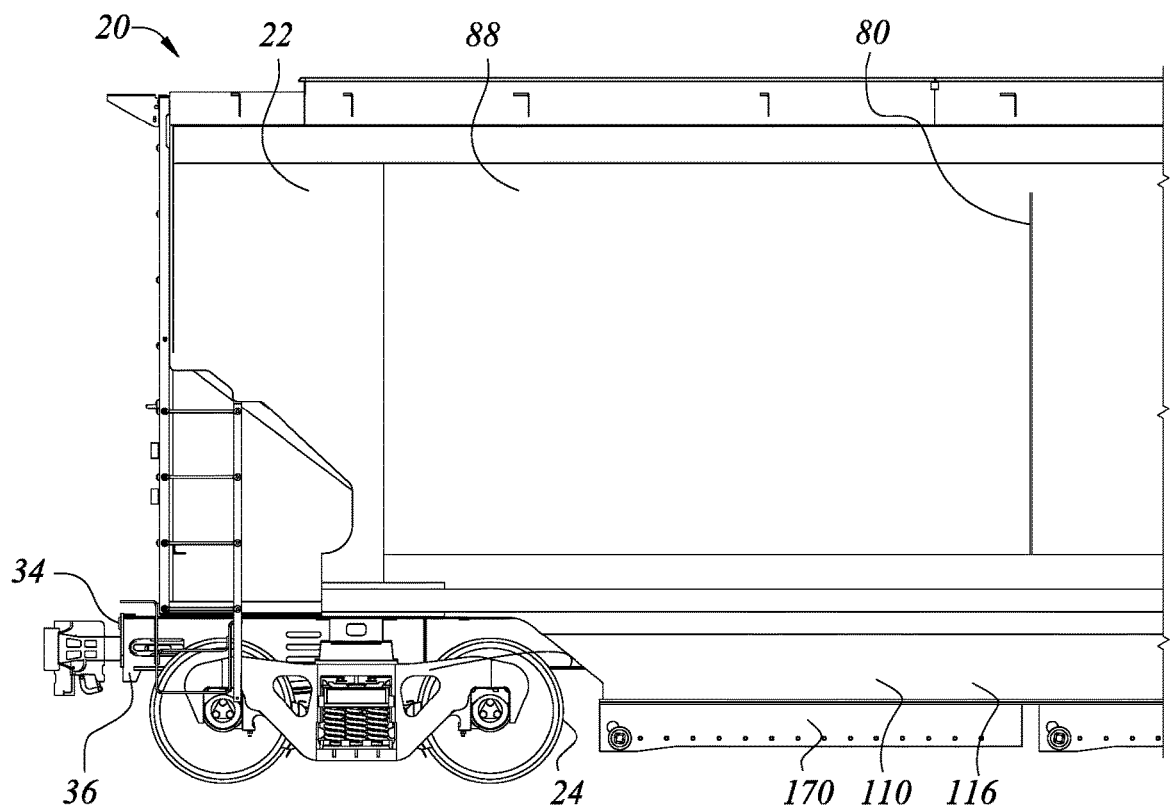
FIG. 2d shows an enlarged detail of the side view of FIG. 1f.

In the lower portions of car 20, there may be, and in the embodiment illustrated there is, primary structure termed the underframe 100 of car 20. Underframe 100 may include center sill 36, which includes draft sills longitudinally outboard of the truck centers. It may also include, and in the embodiment illustrated does include, side sills 68, 70 running lengthwise along either side of the car; and main bolsters 30. Main bolsters 30 are mounted transversely to center sill 36 at the truck centers. The laterally outboard ends of main bolsters 30 are structurally inter-connected with the end regions of side sills 68, 70. The end sections of car 20 include a stub wall 128 that extends in a vertical plane upwardly from main bolster 30. The upper margin of stub wall 128 is bent, or flanged, to intersect perpendicularly with the respective end slope sheet 50, 52. Top cover plate 158 of center sill 36 is coincident with, and may in this region of the car be either defined by, or may be flush with, the top flange 126 of bolster 30, there being web continuity with the upper flange (i.e., top cover plate 158) of center sill 36, and of main bolster 30. Side sills 68, 70 are mounted to the outboard ends of main bolster 30. Each side sill 68, 70 may have a top flange 102, a bottom flange 104, an inside web 106 and an outside web 108 that co-operate to form a closed periphery hollow section. In this case, bottom flange 104 of side sill 68, 70 mounts above top flange 126 of bolster 30. The height of bottom flange 104 is identified in FIG. 2c as $h_{70}$. The overall depth of side sill 68, 70 is identified as $y_{70}$.

Thus far, the description has merely described the layout of hopper car 20 to establish context. The lower portion of body 22 of car 20 includes at least one hopper discharge section 110. Hopper discharge section 110 may have, and as illustrated does have, a downwardly convergent set of walls, which may have a truncated upside-down pyramid shape. That shape is achieved with the respective lower margins of 112, 114 of first and second front and rear slope sheets 50, 52, which are extensions thereof; and the lower margins of side slope sheets 116, 118, which extend downwardly and transversely inwardly from side wall sheets 88, 90. Rounded, or radiused, conical section corner inserts or plates 122, may be installed to maintain a constant slope in the corners of discharge section 110. As may be seen in FIG. 2b, the lower skirt or lower margin 120 of side wall sheets 88, 90 extends below the level of the bottom flange of side sill 68, 70, such that the angular transition 124 (i.e., effectively, the bottom edge of the side sheet extension defined by skirt 120, and therefore also the bottom edge or bottom margin of sheets 88, 90) from the profile of the upstanding side wall sheet 88, 90 (seen as a continuous arc in the cross-sectional views of FIGS. 2b and 2c) to the slope of side slope sheets 116, 118 occurs lower than the level of the side sills, and, as illustrated, and below the level of upper flange, i.e., top cover plate 126, of main bolster 30, or, equivalently in car 20, below the level $h_{158}$ of top cover plate 158 of center sill 36. That is to say, side walls 46, 48 have a profile. That profile may be planar in some hopper cars, or it may be arcuate as shown in the illustrations. Side wall sheets 88, 90 follow that profile. Side slope sheets 116, 118 are inclined planes. They do not follow the side wall profile. Rather, there is a slope discontinuity at transition 124, which may be defined as the locus of intersection of the plane of the mid-thickness of side slope sheet 116, 118 and the arcuate profile of the mid-thickness of sheet 88, 90. Inasmuch as this feature may be formed as a pressing, it may be a radiused curve bending inboard of the defined locus. Unlike customary hopper cars, in car 20 side slope sheets 116, 118 are trapezoids that run the full length of the mid-section, or drop-center, portion of car 20 between trucks 24. The upper edge of the trapezoid is at transition 124. The lower edge is formed into the bottom flange of discharge section 110. The oblique, equal and oppositely angled short sides of the trapezoid conform to the slope of end slope sheets 50, 52. The upper and lower edges are parallel, and are longer than the perpendicular true length on the inclined slope seen in FIGS. 2b and 2c. In the case of car 20, the length of the lower margin is more than double the true inclined slope length, such that the trapezoid can be thought of a being a long, thin trapezoid, with the length running along the car. Notably, although there is more than one hopper region, and more than one hopper discharge gate, the bottom edge of the trapezoid of the slope sheet runs in a continuous straight line from end to end. That is, it does not zig-zag up and down.

This feature relates to the lading capacity of the car. The slope angle of the side slope sheet is often determined by the natural angle of repose, or talus angle, of the types lading car 20 is built to transport, or by the AAR underframe envelope on the various Plate diagrams, e.g., Plate C, Plate F, and so on. To the extent that a wider door (i.e., larger in the y-direction) is used, transition 124 may be lower. That is, the vertical distance of the rise of the sloped surface, delta z, or dz, is smaller than if the door is narrower. This means that the arc length, or slope length, of side slope sheet 116, 118 may tend to be shorter than otherwise. Since the minimum clearance above TOR is fixed, and the vertical thickness of the outlet gate is taken as a constant, then if the side sheet slope length is shorter, because the door is wider, then the vertical rise can be shorter, such that the height of transition 124 can be lower. If transition 124 is lower, then the cross-sectional area at that longitudinal station along center sill 36 in the lower portion of the car is correspondingly larger. The coupler centerline height can be taken as a datum, as can the height of the surface of top cover plate 158 of center sill 36 or the bottom surface of bottom flange 160 of center sill 36 in the middle of any of gate assemblies 170, or as can the 98" maximum C of G height. Measuring from any of these reference heights, the cross-sectional area below that datum, is increased relative to a car with a narrower gate. For any length of opening in the x-direction, this would apply. However, lengthening the gate in the x-direction similarly increases the portion of the lading containing volume of the car that is at a lower height relative to any of those reference heights.

This can be expressed in several ways. For example, the "discharge section" of a hopper car can be defined as that portion of the particular hopper in which the lower sheets converge on the angle of repose (or steeper) for the intended lading. In the car shown, the upper end of the "discharge section" terminates at the slope discontinuity between the smooth arc of side sheets 88, 90 and the side slope sheets 116, 118, respectively, at the height of transition 124. The lower end of the discharge section of the hopper ends at gate assemblies 170. As illustrated, gate assemblies 170 are sliding gate assemblies in which opening and closing involves the translational displacement of a door panel along a path or range of travel. That path is typically a linear path, and the door panel usually lies in a plane and travels in a linear path in that plane, although sliding doors of arcuate shape can be made. The plane of travel is generally horizontal, although it is possible to make sliding doors that operate on an incline. The assemblies illustrated are shown as being flat and horizontal.

The transition height in existing cars may be at the level of the side sills. For this purpose the datum side sill height is the height of the lower flange, shown in FIG. 2b as $h_{70}$. However, in car 20, that height is lower than side sills 68, 70, by a distance delta $z = h_{70} - h_{124}$ in FIG. 2b. The effective vertical depth of the main containment shell 38 of body 22 of car 20 above the discharge section has been increased by this distance, and, to the extent that side sheet 88, 90 are predominantly vertical, the height of the centroid of area of the car at any cross-section is reduced by about half that delta z distance, i.e., by vertical depression of the height of transition 124 below the level of side sill 70. In car 20, transition 124 is located below the top cover plate height $h_{158}$, and more than half the depth $y_{70}$ of side sill 70 below side sill 70. In the embodiment shown it lies more than the full depth $y_{70}$ below, at roughly the coupler centerline height, i.e., within 2 inches of the middle height of center sill 36. The height of the centroid of cross-sectional area is a proxy for center of gravity when the car is laded. At any given height, the width of the cross-section of the discharge section will be wider than it would otherwise be, again, indicating a greater portion of lading being carried at a lower height. Carrying a larger volume at a lower height tends generally to permit a larger volume of lading to be carried per unit length of the car, and tends to permit a lower center of gravity.

The lowermost portion, or edge, or bottom margin of each discharge section 110 may terminate in a peripheral flange or structure, or framework, or bezel, generally indicated as frame 130. Although, as seen from above (i.e., looking upward or downward along the z-axis at the projected footprint of frame 130), this structure could be round, or oval or elliptical, or such other shape as may be suitable, it may be convenient for that foot-print to be four sided, and for the four sides to form a rectangle. The inside clearance dimensions of the rectangle may be more than 50" wide, and more than 120" long. The clearance rectangle may be 60"-70" wide, and 150-330" long, for example. As shown it is 70"×330". That is, frame 130 may be a unitary hopper discharge outlet frame as shown. As shown, it is the only hopper discharge outlet frame of car 20. Frame 130 may be a rectangular frame having a pair of lengthwise-running frame members, or beams 132, 134, and a pair or cross-wise running members or beams 136, 138 that co-operate to form the rectangle. In car 20, the length of frame 130 (i.e., of members 132, 134) in the x-direction is much longer than the width (i.e., the length of members 136, 138) in the y-direction. In some embodiments, it may be more than double the width. In some embodiments, it may be more than triple the width. As shown it is more than four times the width. Beams 132, 134, may be formed by bending the bottom margins of side slope sheets 116, 118 upwardly and outwardly to lie in a horizontal plane, thereby forming a flange. That flange and the adjacent structurally influenced margin of slope sheet 116, 118 function as an angle iron, i.e., as a formed structural member, or as a reinforcement formed on the lower margin of the respective sheet. Similarly, transverse members or beams 136, 138 are formed by bending the lower margins of end slope sheets 50, 52 upwardly and longitudinally outwardly into a horizontal plane as a flange, whose structural interaction with the adjoining, neighboring portion of slope sheet 50, 52 results in a structure that functions as an angle iron or formed structural member, or structural reinforcement, however it may be termed. The flanges of side slope sheets 116, 118 and of beams 136, 138 co-operate to form the rectangular form of the engagement interface 135 of frame 130, and lie in datum plane $P_{135}$, lying at a datum height relative to TOR. I.e., they are co-planar. The downwardly facing planar rectangular land of frame 130 defines engagement interface 135 at which the various gate assemblies 170 mate with the car body. Frame 130 (and the edge of the rectangular opening it defines), extends from less than one wheel diameter from the centerline of the axle of the nearest wheelset of truck 24, to the corresponding location at the opposite end of car 20. In car 20, this length extends over the majority of (that is, more than half of) the distance between the truck centers. In another example frame 130 may be more than 3/5 of that length. In still another example it may be more than 2/3 of the truck center length. In the embodiment shown, the length over the frame is more than 70% of the truck center length.

Expressed differently, car 20 has a single discharge catchment, or discharge section that terminates downwardly in a unitary hopper discharge outlet frame 130. Frame 130 is located below the level of the bottom flange 160 of center sill 36. Frame 130 has a length that is greater than 2/5 of the overall length of car 20 measured over striker plates 34. In one embodiment, it may be more than half that length. In the embodiment shown, it is about 58% of the overall length, i.e., greater than 9/16. Looked at in the other direction, frame 130 has an overall width, measured as the inside clearance dimension between beams 132, 134, that is greater than 2/5 of the overall width of car body 22. In one example it may be more than half of the width of car body 22. In the embodiment shown it is about 55% of the overall width of car body 22. Expressed in terms of area, a nominal calculated arithmetic area, $A_n$, is obtained by multiplying the car body width (typically 128 inches) by the truck center distance. The overall projected footprint area $A_{130}$ of frame 130, measured over the outsides of beams 132, 134 and 136, 138 may be expressed as a ratio of $A_n$. In some embodiments, that ratio, $A_{130}/A_n$, is greater than 1/5. In another example it is greater than 3/10. In the embodiment shown, it is greater than 35%. In the embodiment shown, it is about 3/8. Another way of expressing this feature is to relate it to the AAR underframe plate diagram. In the AAR Plate diagrams, be it for AAR Plate B, AAR Plate C, AAR Plate E, or AAR Plate F, the lowermost plate boundary has a width of 7 ft-4 in., i.e., 88 inches. For whatever Plate size or standard may govern, car 20 may have a bottom discharge opening envelope area $A_{130}$, as noted above, that has a width that is more than 3/4 of the lowermost Plate boundary width, and, as in the embodiment illustrated, is more than 4/5 of the lower Plate boundary width. Similarly, a lower nominal projected area $A_L$ may be defined as the product of the truck center distance multiplied by the Plate lower boundary width. A ratio of the projected opening are $A_{130}/A_L$ may then be greater than 2/5, and in the embodiment illustrated is greater than 1/2, being about 6/11 or 11/20, i.e., 55%.

Figure 2E:
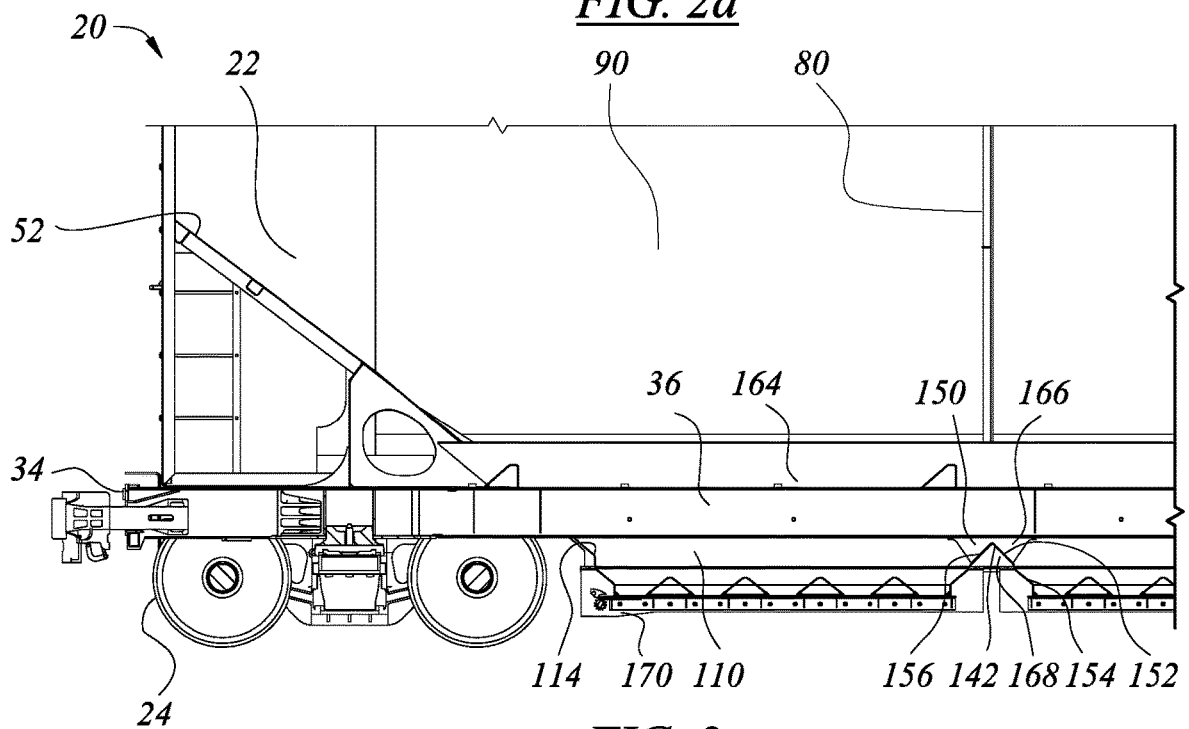
Figure 2F:
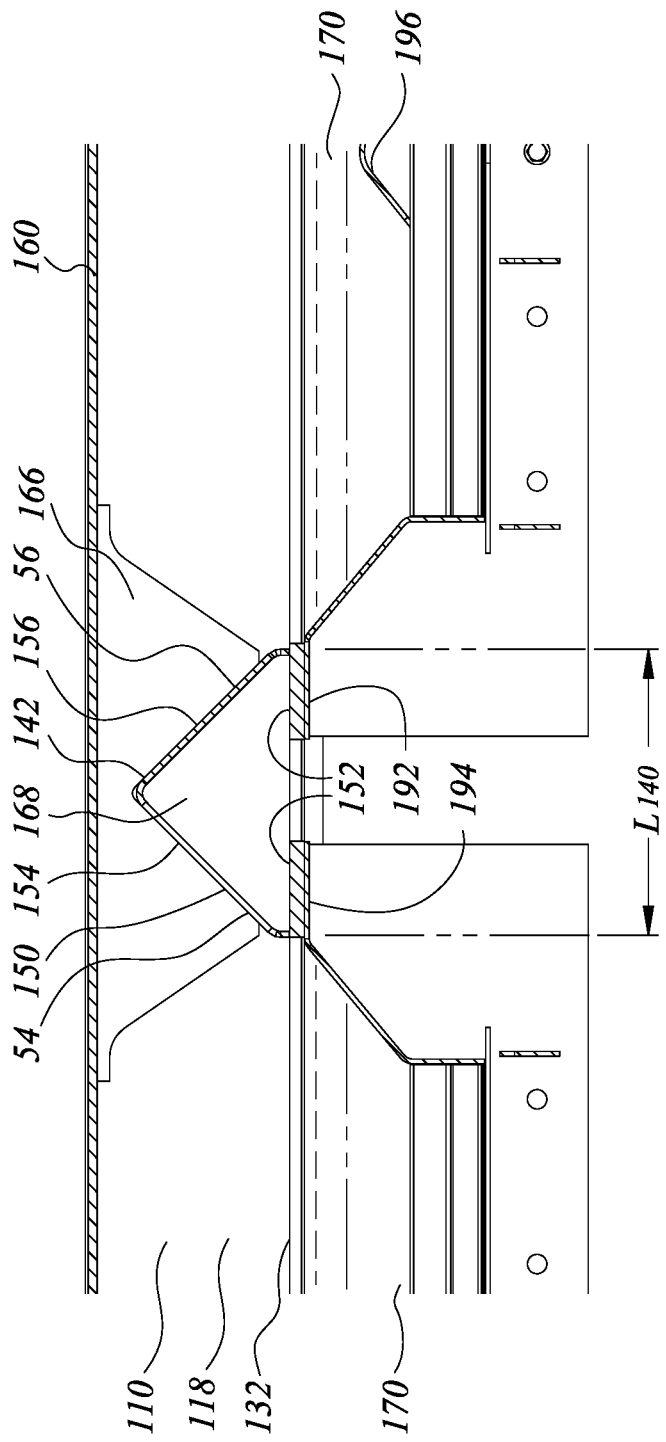
FIG. 2f shows a further enlarged detail of the cross-section of FIG. 2e.
Figure 3A:
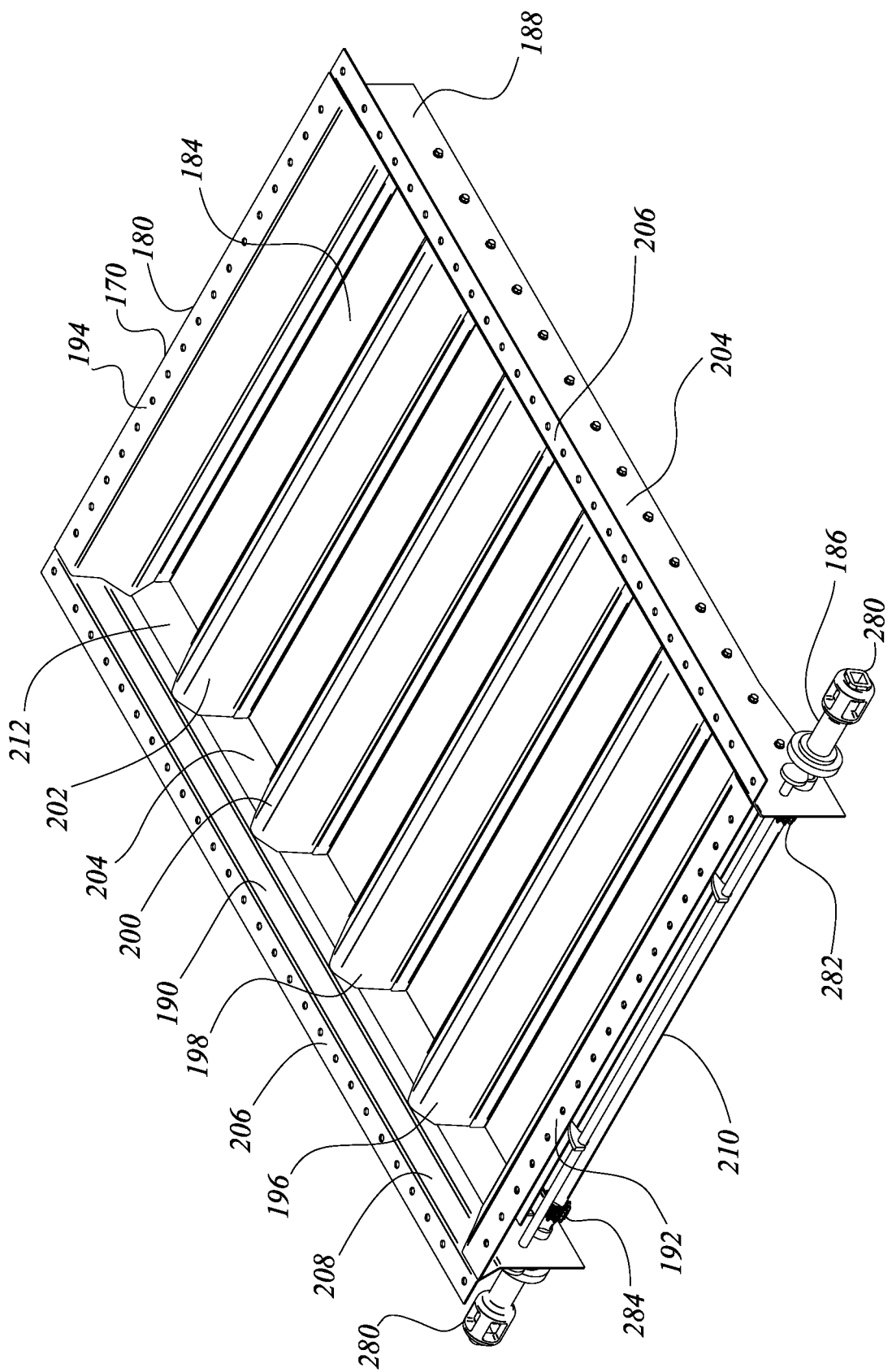
Figure 3B:
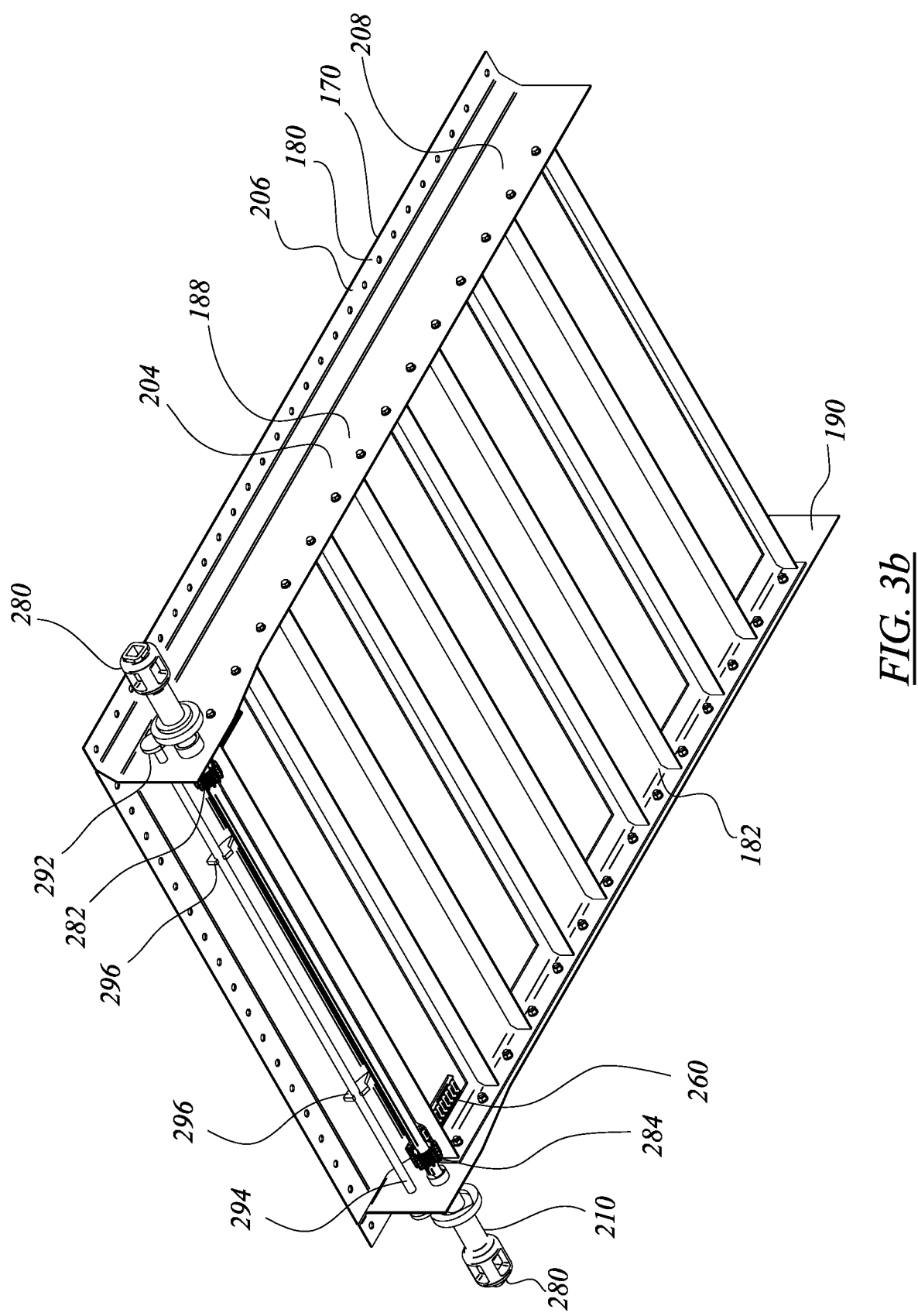
FIG. 3b is a perspective view of the gate assembly of FIG. 3a from below.
Figure 3C:
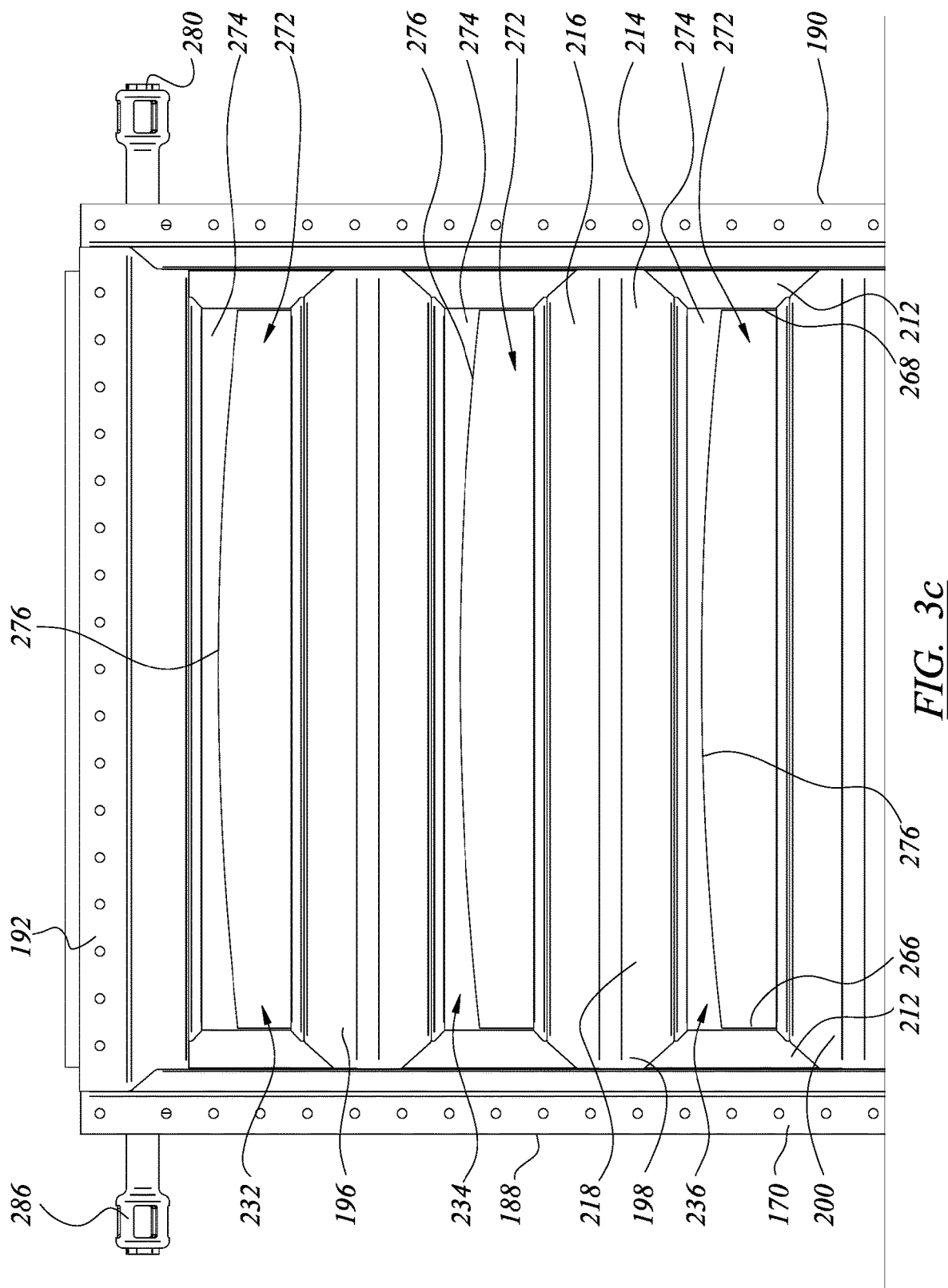
Figure 3D:
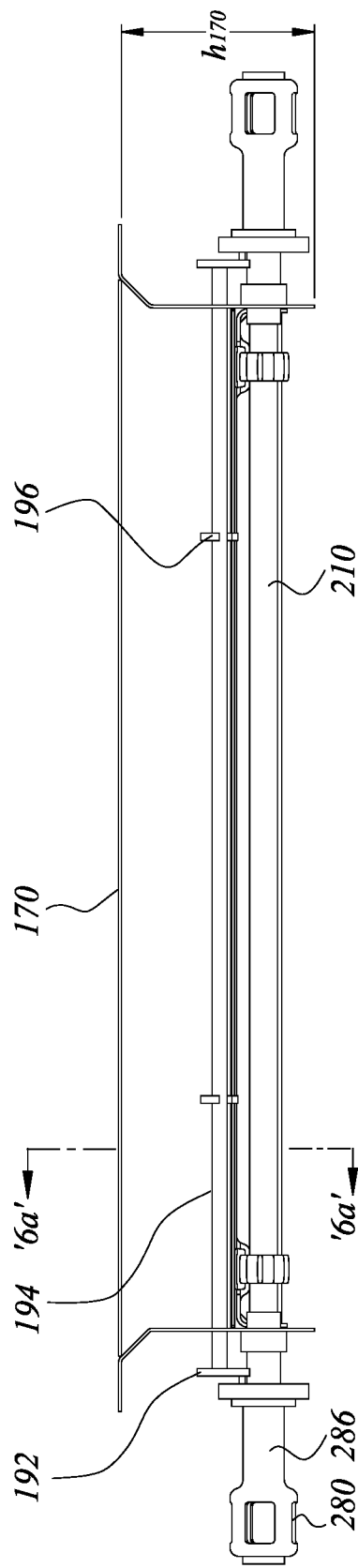
Figure 3E:
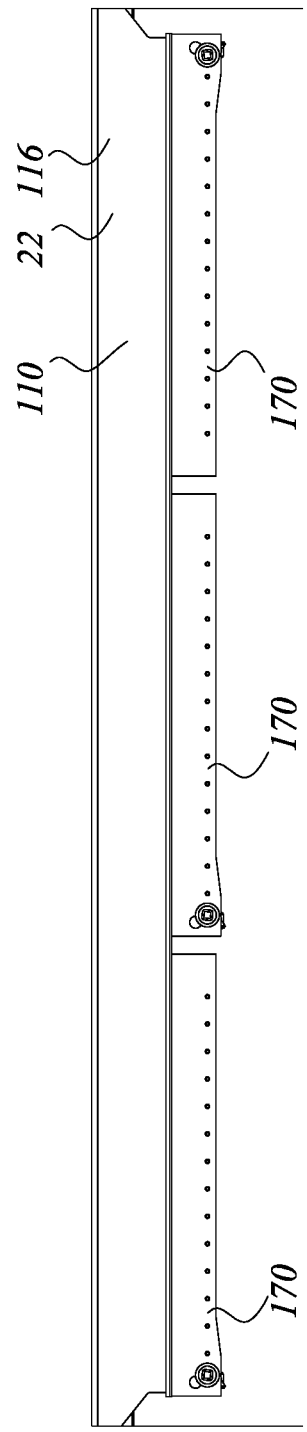
Figure 3F:
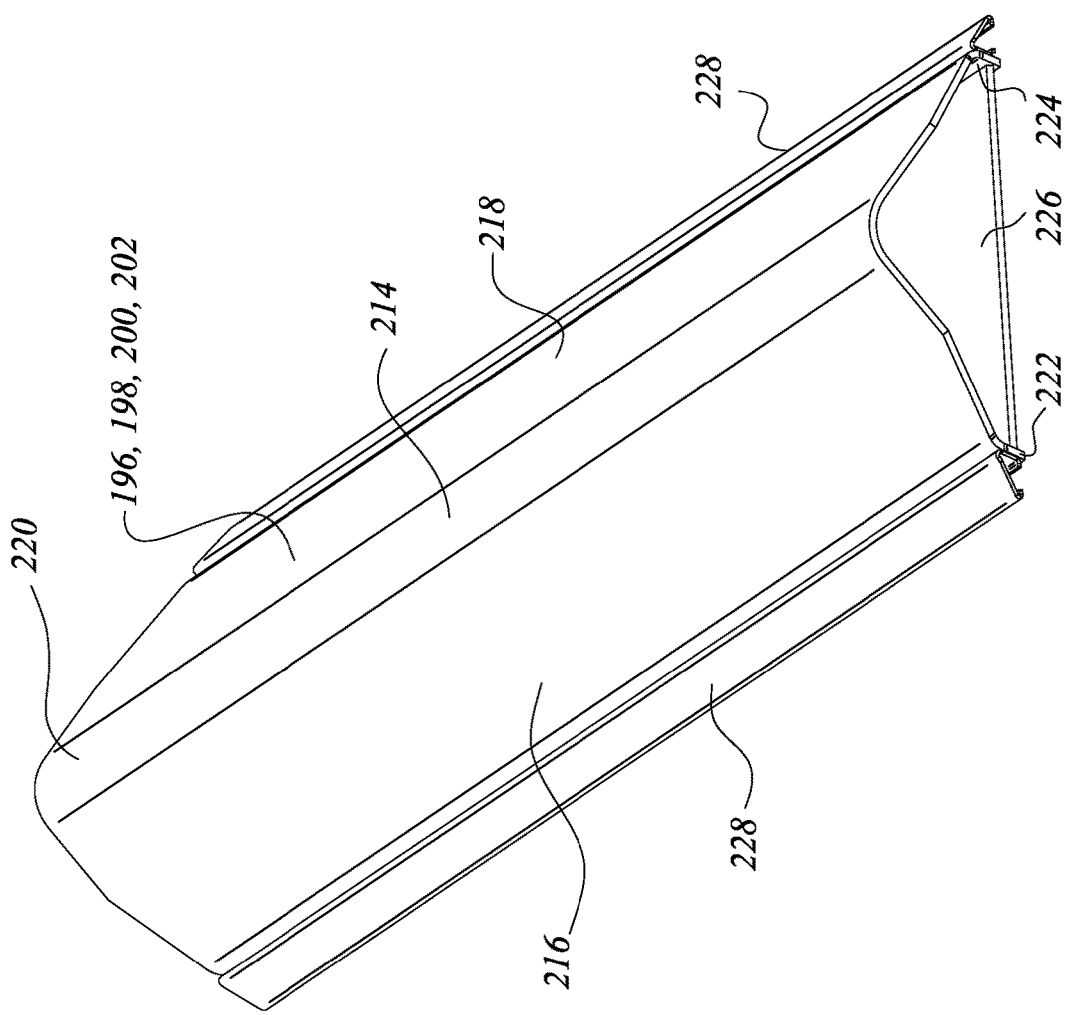
Figure 3G:
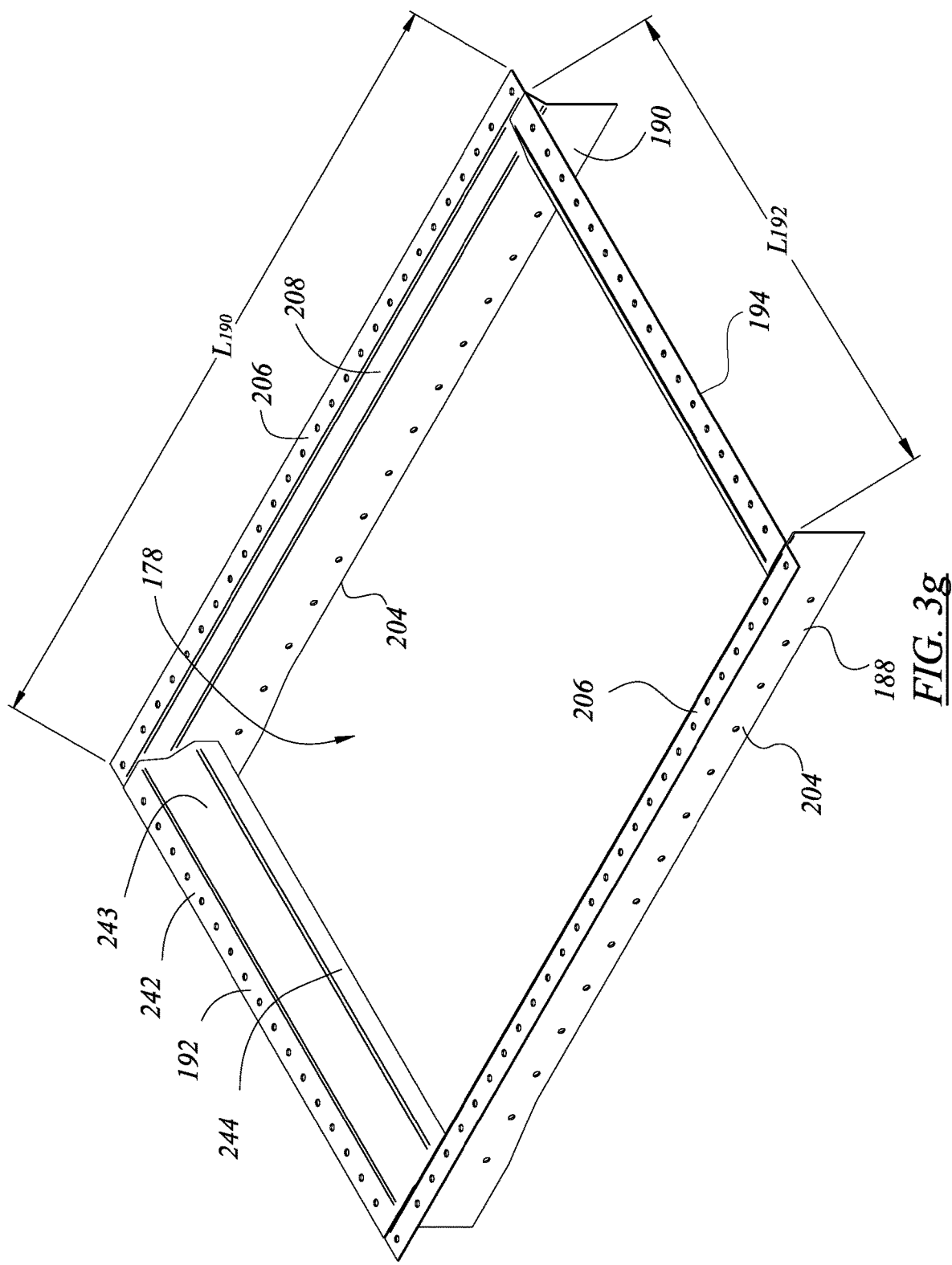
Figure 4A:
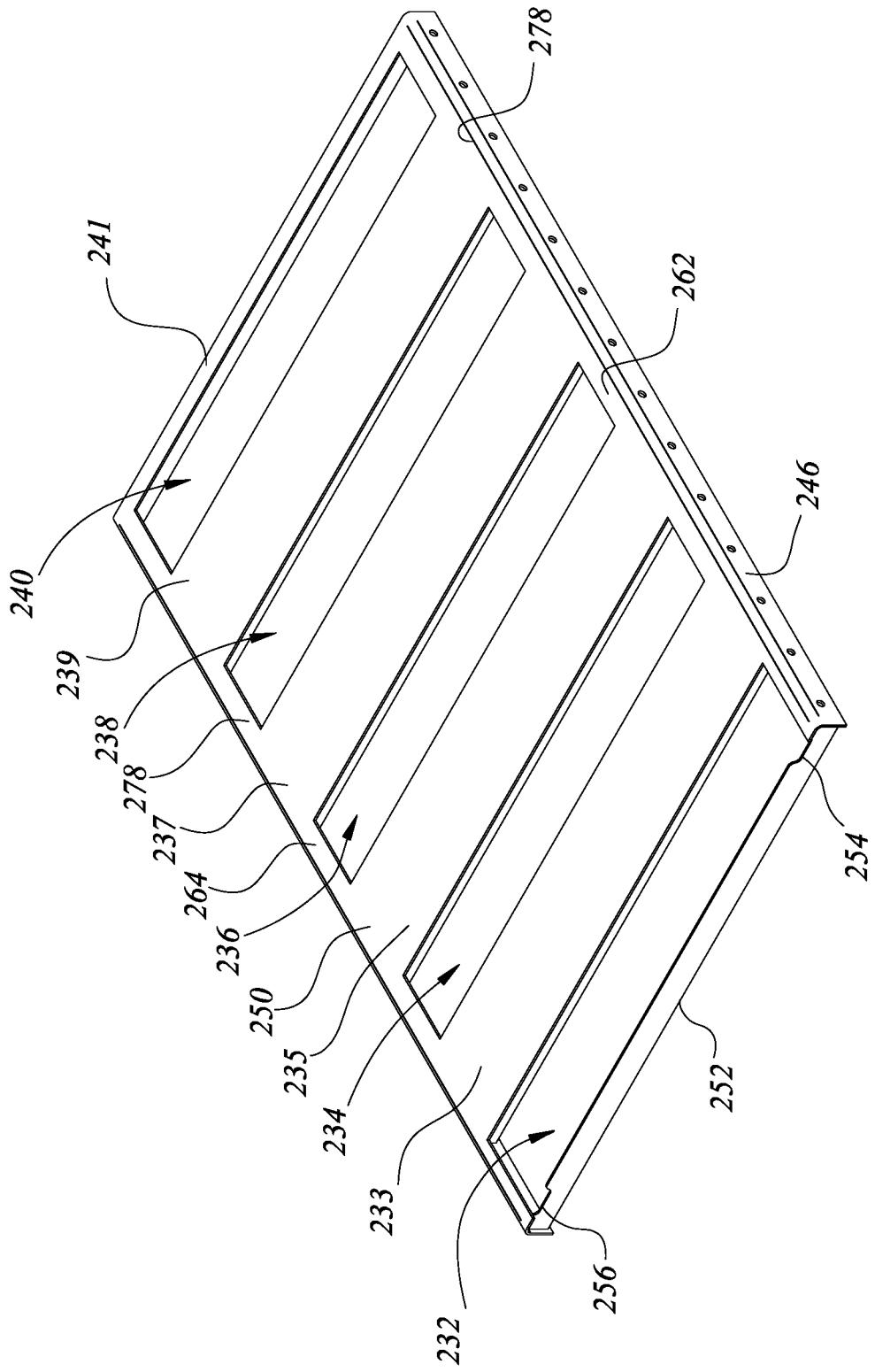
Figure 4B:
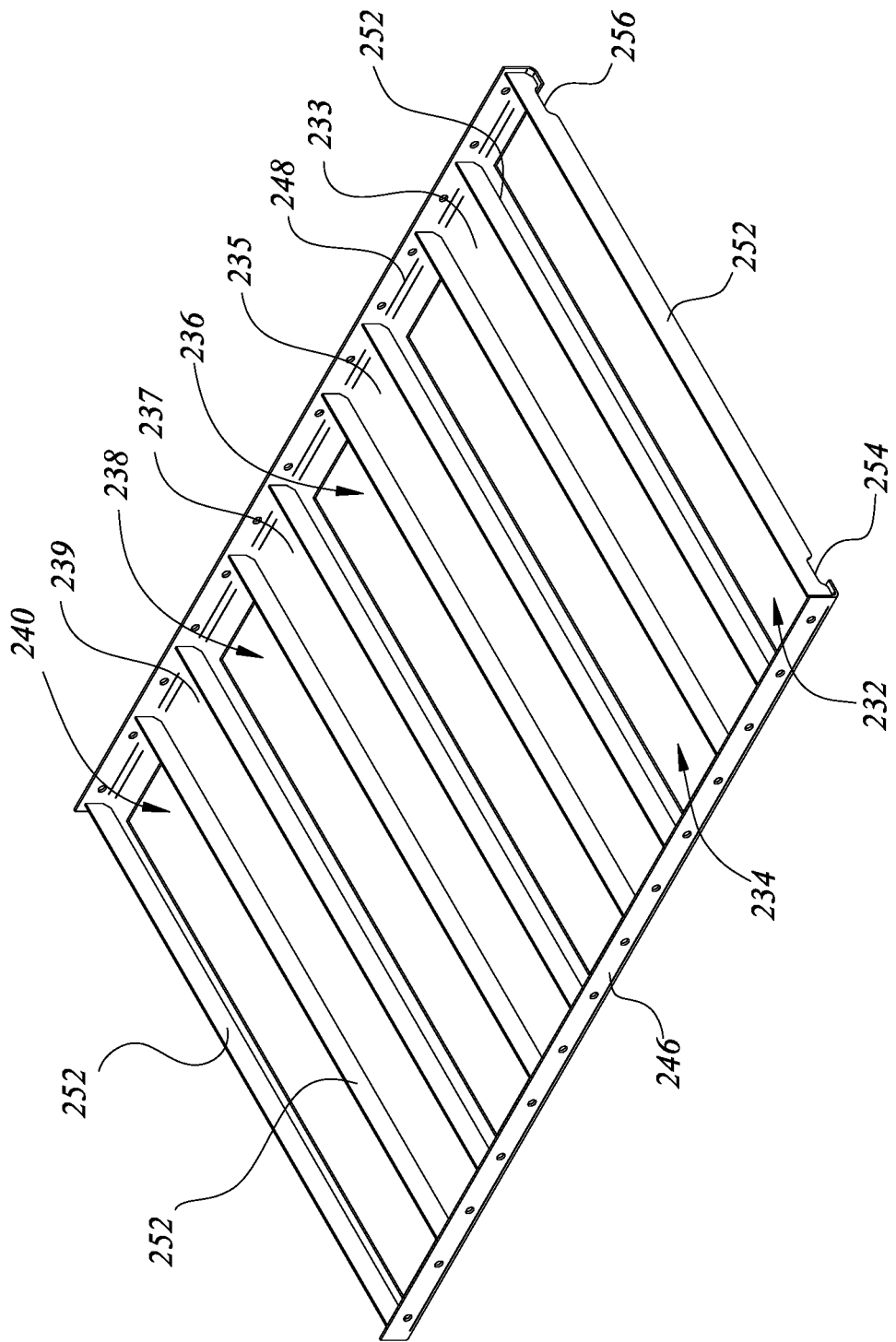
Figure 4F:
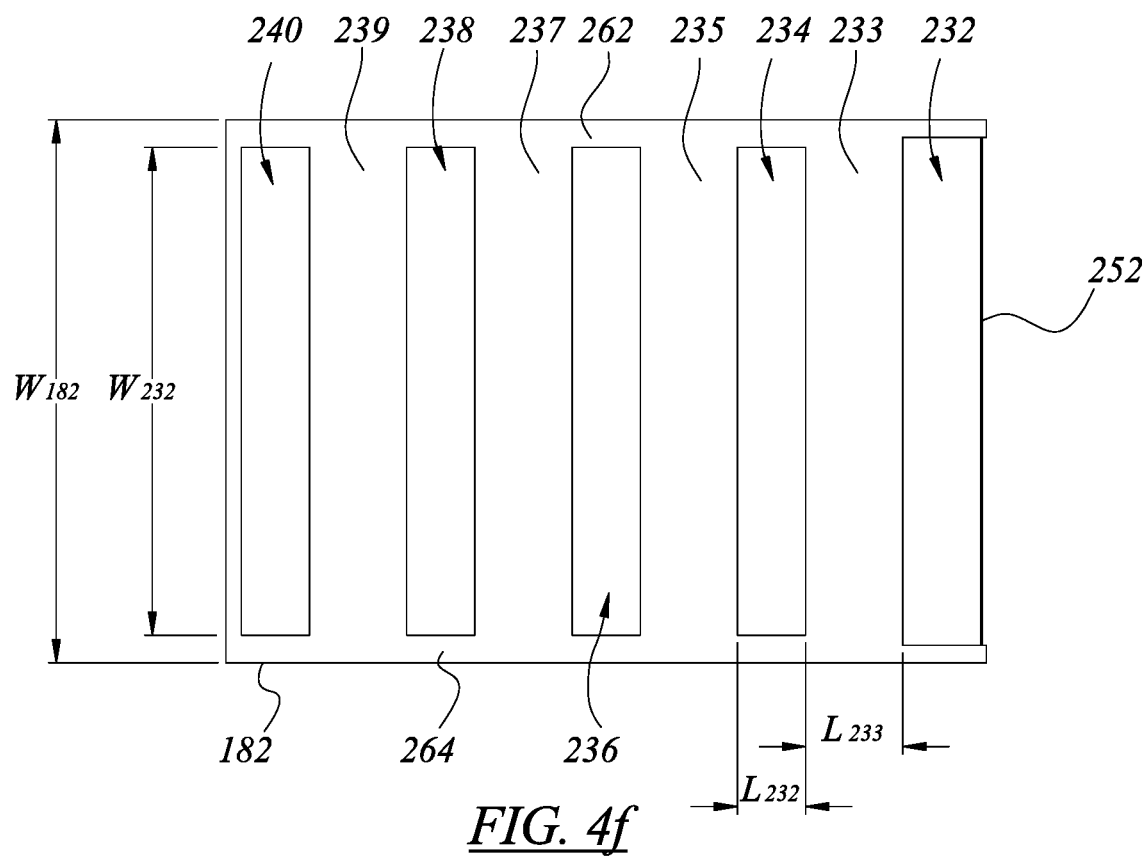
Figure 4G:
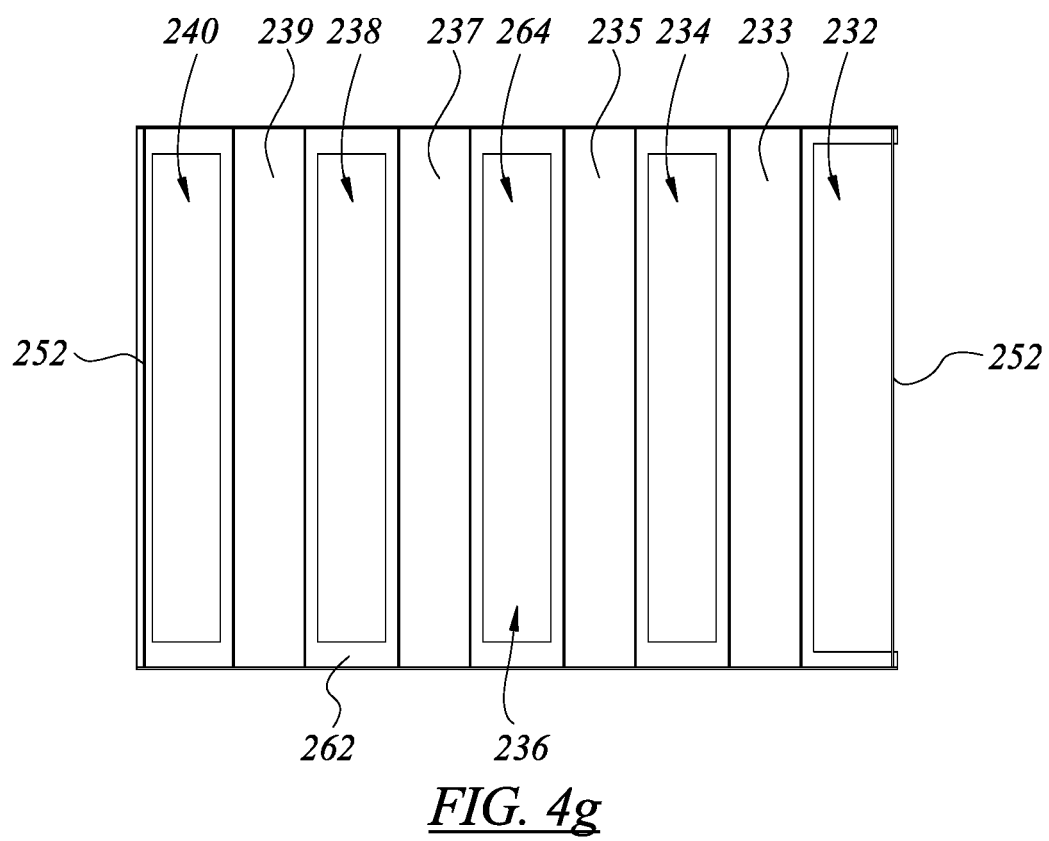
Figure 5A:
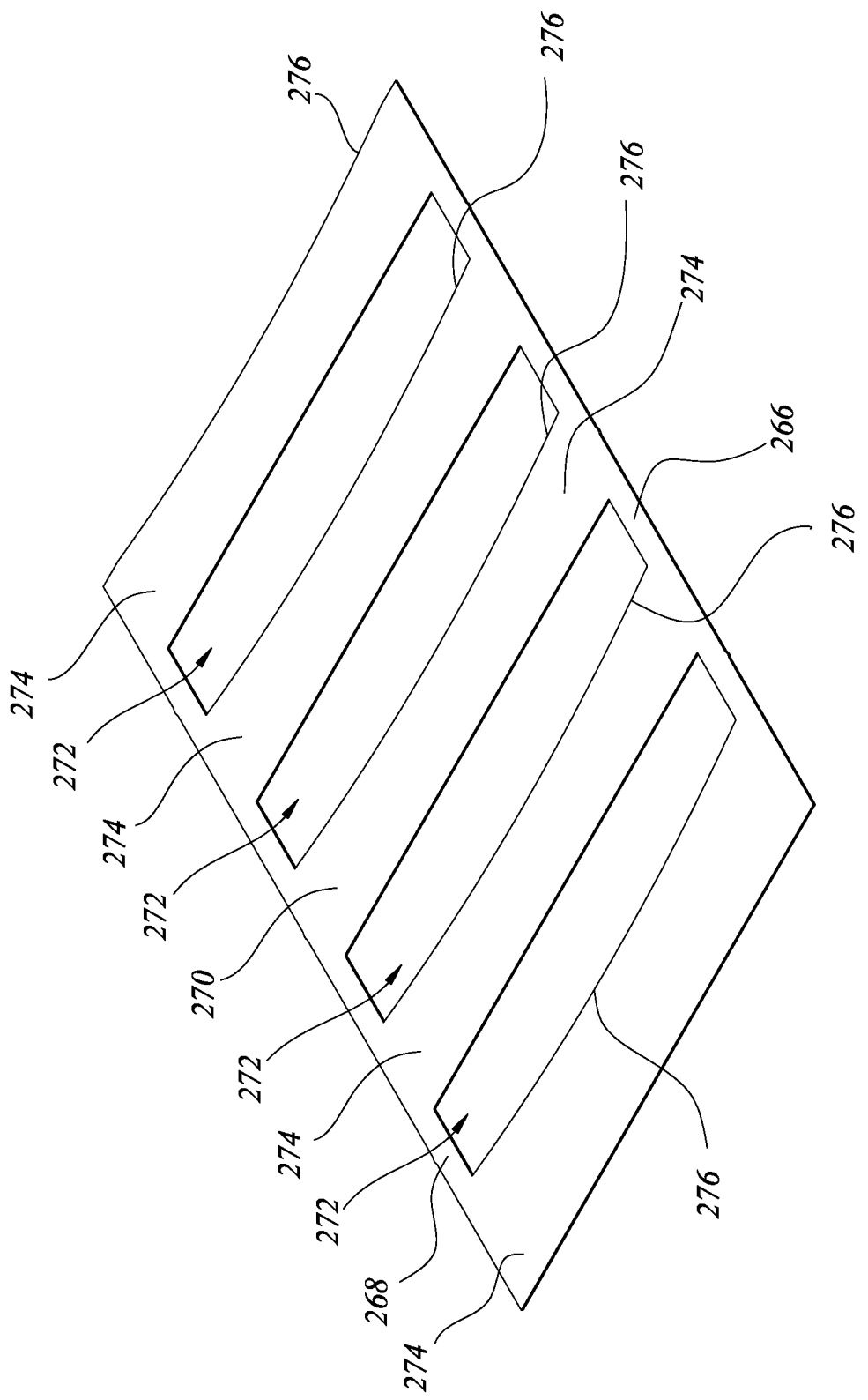
Figure 5B:
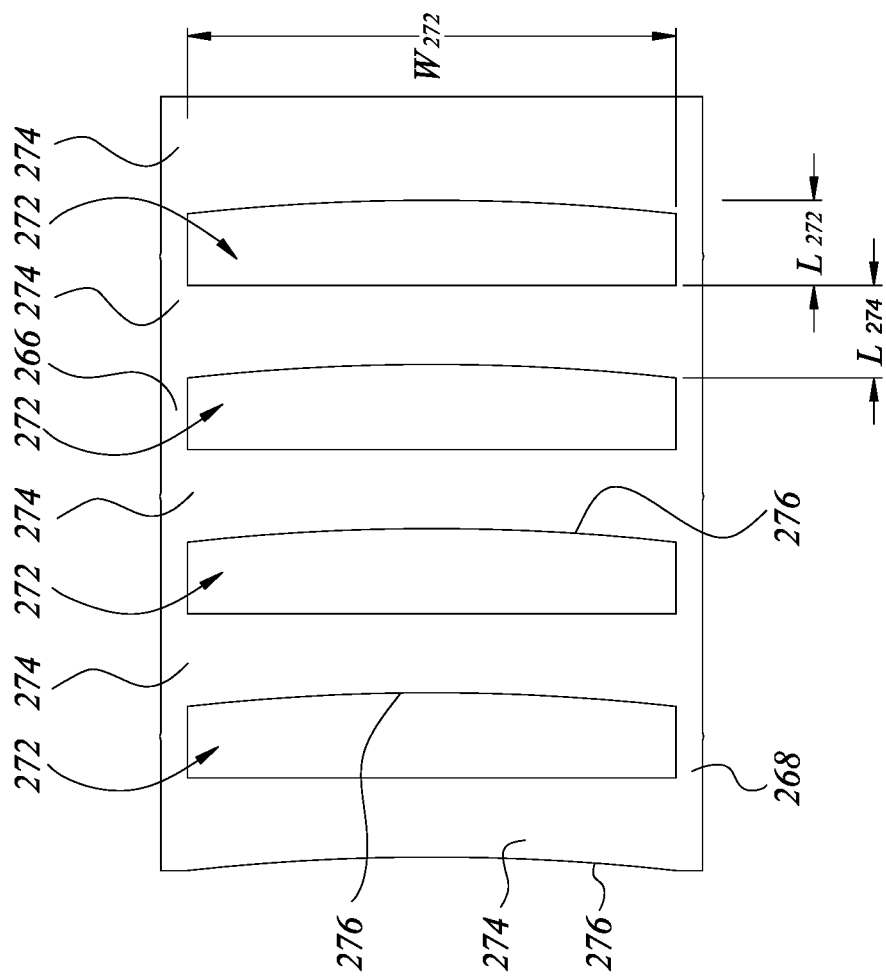

In car 20, as shown, the interior space of frame 130 also has, or is interrupted by, or is divided into a plurality of smaller regions or openings by, intermediate cross-members 140, 142 that link lengthwise running beams 132, 134 to divide the overall frame opening into sub-regions, or sub-portions, identified as openings 144, 146 and 148. Cross-members 140, 142 may be attached to, or may define a part or all of respective lower portions 82 of frames 78, 80. That is, to the extent that portions 82, 84, 86 and 88 of frames 78, 80 are, or include, webs, and are co-planar webs, transverse to the longitudinal centerline of car 20, web portion 82 forms a stem relative to cross-member 140, 142 as may be, which then acts as the flange of the combined assembly. That flange portion defined by cross-member 140, 142 may have the form of an elongate member such as a hollow structural section beam 150. As shown, beam 150 is a closed or hollow structural section or hollow member of triangular cross-section as seen in FIG. 2e. The triangular section includes a base or bottom portion, or plate, or flange 152, and two sloped sides or webs 154, 156 that run upwardly toward each other to meet at a radiused vertex. The bottom portion may be a solid plate extending between the toes of webs 154, 156 or it may be a pair of opposed flanges bent from the toes of each of webs 154, 156, as shown in FIG. 1b. The bottom face of flange 152 co-operates with the flanges of frame 130 and lies in plane $P_{130}$ of engagement interface 135. It may be taken as being part of engagement interface 135 in respect of whichever discharge gate assembly is mounted thereto. The respective laterally outboard ends of beams 150 are chamfered to match the slope of side slope sheets 116, 118. As seen in FIG. 2e, the width of cross-members 140, 142 (i.e., in the x-direction) is much less than their respective lengths (i.e., across the car in the y-direction). That is, the width measured over the combined width of sloped sides 154, 156 is of the order of 8-12 inches, and in the embodiment shown is 10 inches. The vertical rise of cross-member 140, 142 from the lower lip to the central crest is of the order of half that width, roughly 4"-6", and in one embodiment about 5". The length, by contrast is the same, or about the same, as the inside dimension width of frame 130, which may be 50 inches or more, up to the inside width between frame members 132, 134 which may be up to 70 inches in car 20 as illustrated. The width of cross-member 140, 142 is thus small as compared to the length of the opening to which the frame of gate assembly 170 mates, whether between cross-members 140, 142, or between either of them and end frame members 136, 138 of frame 130, as may be. That inlet opening distance in the x-direction corresponds to the length of the inlet opening of gate assembly 170 indicated in FIG. 3g as $L_{190}$. The corresponding inlet opening width in the y-direction is indicated as $L_{192}$. The gate opening length $L_{190}$ may be more than 50 inches, and in some embodiments may be more than 80 inches. For example, it may be more than 8 ft., as in the embodiment shown in which it is 100 inches. That is, the width of the cross-member, $L_{140}$, is less than ¼ of the length of the opening $L_{190}$. That is, the ratio of $L_{140}:L_{190}$ may be in the range of ¼ to ⅒, and in the embodiment shown is about, ⅛. Similarly, the structure is shallow relative to the size of the opening and relative to other structure of the car. For example, the height of cross-members 140, 142 is less than the vertical depth of center sill 36 as measured over top cover plate 158 and bottom flange 160. In the embodiment shown, it is less than ⅔ of that depth and is less than half of the depth of the clearance between bottom flange 160 and TOR. As shown, the crest or uppermost part of cross-member 140, 142 passes clear of, and below, bottom flange 160, and therefore clear of center sill 36. In some embodiments the vertical thickness is less than 1/12 of the length of the opening, $L_{190}$, and may lie in the range of ⅒ to 1/15 of that value. In the embodiment shown it is in the range of 1/12 to 1/20 of $L_{190}$.

Center sill 36 has a top flange or top cover plate 158, a bottom flange or bottom cover plate 160, and a pair of spaced apart first and second side webs 162, which form a hollow rectangular section. Center sill 36 also has a triangular, or slope-sided, cover, or hat, or shroud 164 that encourages lading to flow to either side of center sill 36 on discharge. Center sill 36 runs inside the hopper from end slope sheet to end slope sheet. Center sill 36 also has hangers, or gussets, or gusset plates 166 that depend from bottom cover plate or bottom flange 160, and that are aligned in web continuity with, and in the respective planes of, webs 162. The bottom margins of gusset plates 166 are cut to a V-shape to match the shape of the upward faces of sloped sides 154, 156. Internal V-shaped gussets 168 are located inside beam 150 in planar alignment with gusset plates 166, again providing web continuity. In this way, triangular beams 150 are connected to center sill 36. This is so notwithstanding that the apex of webs 154, 156 of beam 150 may pass (an as illustrated, does pass), below bottom flange 160.

In the example illustrated, the hopper defined by containment shell 38 is effectively a single large hopper, or single containment vessel, or unitary containment vessel, with a single or unitary outlet discharge frame 130, which is also large. That single large containment vessel can be subdivided by transverse partitions. Nonetheless, the structure remains in essence a single or unitary large container. The opening 125 in frame 130 is divided into sub-portions, there being three such sub-portions, or openings 144, 146 and 148, in car 20 as illustrated. In the example, rather than large conventional internal slope sheets that would divide the discharge of internal volume 40 into three distinct hoppers, the function of slope sheets as flow dividers is performed by the sloped upper members or walls or surfaces or sides 154, 156 of beam 150 of cross-members 140, 142. To the extent that these sloped walls can be thought of conceptually as intermediate slope sheets 54, 56, even if small ones, it can be seen that their vertical depth is, e.g., smaller than the depth of center sill 36 (it is approximately ½ of that depth in the embodiment illustrated) as discussed above. These flow dividers are located at a height (at the crest or apex between sides 154, 156) that is lower than the center sill; lower than the coupler centerline; lower than side wall transition 124; and lower than side sills 68, 70. Sloped surfaces or sides 154, 156 are much smaller than conventional slope sheets, and have a much higher ratio of lateral width in the y-direction (i.e., the length of beam 150) to the longitudinal slope length (i.e., the hypotenuse along the angled side in the longitudinal-vertical plane of the x-direction and z-direction axes). For example, in a conventional hopper car the length of the intermediate slope sheet may be greater than the 128" car width. By contrast, in the example, the width of the car is more than 3 times the slope length (i.e., an aspect ratio of 3:1, or, expressed differently, the length to half-width slope aspect ratio of the beam is 3:1 or more). The width of beam 150 (in the x-direction of car 20) is also modest. As seen in FIG. 2e, it is less than the wheel radius of the wheels of truck 24. That distance may be less than 18". The lip width (i.e., in the y-direction) may be of the order of 60"-70", or roughly a 3:1 to 4:1 aspect ratio of width (in the y-direction across the slope) to length (in the x-direction, along the slope). It is less than either the width or the height of center sill 36. In the embodiment shown, the running-direction length is less than 16 inches on the slope. The vertically projected horizontal component is the cosine component of that length. As such, it occupies a small portion of the length (i.e., in the x-direction) of frame 130 (less than 1/20), and also a small portion of the available height. The bottom surfaces of frame members 132, 134, 136 and 138 are bent outwardly longitudinally or laterally, as may be, to lie in a common horizontal plane. Bottom flange, or flanges 152 is, or are, in the same plane, such that there are four attachment flanges around each of openings 144, 146, 148, that co-operate to define four-sides, co-planar lands to mate as attachment interface members with mating attachment interface members of discharge gate assemblies 170.

There are three discharge gate assemblies 170. Gate assembly 170 is a multi-aperture, or multi-opening gate assembly, as described below. One gate assembly 170 is mounted to each of the four-sided engagement interfaces defined by frame 130 and cross-members 140, 142, as may be, identified as discharge interface mounting lands 172, 174, 176 of discharge section 110 described above and shown in FIG. 1b. Although the mating interface could be of any geometry, provided that the upper face, or upwardly engaging members of assemblies 170 are configured to mate with discharge section 110, e.g., with the negative image of the fittings of discharge section 110, it is not necessary for discharge section 110 and gate assembly 170 to mate in a horizontal plane. It may, nonetheless facilitate both manufacture and assembly for the receiving flanges that co-operate to form the rectangular frame of discharge section 110 to be co-planar and therefore to define planar land 135; and that the corresponding flanges of gate assembly 170 should also be co-planar and co-operate to form a rectangular frame that defines a mating planar land or engagement interface of gate assembly 170, as in the embodiment shown. Since gate assemblies 170 are the same, only one such assembly will be described. Gate assemblies 170 are sliding gate assemblies, as opposed to hinged gate assemblies. In this description, gate assembly 170 may be referred to generally as a shutter gate, or as a set of shutters or louvers. Depending on the hopper car, there could be one, two, three or more gate assemblies 170. Gate assembly 170 can be thought of as having a stationary assembly, or frame, 180 that is rigidly mountable to, and therefore stationary relative to, car body 22 at whichever of lands 172, 174, 176; a stationary aperture plate, or gate pan, or stator assembly 182 rigidly mounted to frame 180; a moving assembly, movable member, shutter assembly or shutter 184 movable relative to stator assembly 182; and a drive, or drive assembly, or transmission 186, mounted to frame 180 and operable to move the shutter relative to frame 180. Frame 180 includes first and second, or left and right hand, side frames 188, 190, and first and second, or head and tail, end frames 192, 194. Each frame has an infeed, or opening, 178, as which lading enters the gate assembly 170. Infeed opening 178 has the size or area bounded by the length-wise and cross-wise members of frame 180. There are also intermediate dividers or cross-members 196, 198, 200 and 202.

Side frames 188, 190 have a web 204 that extends downwardly and a top flange 206 bent outwardly horizontally to form the side frame into an angle. Flange 206 has mounting holes for threaded fasteners, by which to attach gate assembly 170 to the corresponding land of frame 130 of car body 22. Web 204 has a set of fastening holes or fittings to which stator assembly 182 is attached. The head frame end of each of side frames 188, 190 is deeper, i.e., web 204 extends further downwardly, to provide suitable depth for receiving drive shaft member 210 of transmission 186. Each side frame 188, 190 has an angled chamfer or lead-in 208 between horizontal flange 206 and vertical web 204. It may also have a skirt or shroud 212 set at a downwardly, inwardly convergent angle along its lowermost margin. Shroud 212 may have a downwardly extending seal, or brush 230, as described below.

Each of cross-members 196, 198, 200, 202 has its ends cut to conform to the shape of side frames 188, 190 and to shrouds 212. Each has a hat 214 having first and second sloped sides 216, 218 that merge at a rounded apex 220. Each side frame 188, 190 has a downwardly depending margin or skirt or cuff, or leg 222, 224. Apex 220 meets side frames 188, 190 at a height just at, or slightly shy of, the transition bend from chamfer 208 to web 204. A bottom closure plate, or flange 226 is mounted between the toes of legs 222, 224 such that a generally triangular closed section is formed, i.e., such that cross-members 196, etc., form closed-section beams. Seal housing strips 228 are mounted to the outside of legs 222, 224 and brushes or seals 230 are installed in strips 228. Seals 230 extend downwardly proud of legs 222, 224 and, in use, are engaged in a friction relationship with sliding shutter 184. When assembled, frame assembly 180 in the embodiment illustrated has five outlet openings or apertures 232, 234, 236, 238 and 240. Discharge gate assembly 170 may have as few as two shutter apertures, and as many as suitable. There may be three to six such apertures. The apertures are narrow slots. That is to say, the width of the aperture in the cross-wise direction (i.e., y-direction) of the frame is much larger than the travel length spacing in the opening direction (i.e., x-direction) of the aperture. This ratio may be in the range of 5:1 to 12:1, and is about 8:1, as shown. Head frame 192 and tail frame 194 each have a horizontal flange 242 at the top; a vertical leg 244 extending downwardly; a sloped or chamfered lead-in portion 243 between flange 242 and leg 244; and a seal housing strip 228 and seal 230. The ends of head frame 192 and tail frame 194 are cut to fit between and to mate with the contours of side frames 188, 190 and skirts or shrouds 212.

Stator assembly 182 provides support for moving shutter 184. Stator assembly 182 may have the appearance of a grille with alternating solid slats, or planks, or panels 233, 235, 237, 239 and a closing margin 241; and apertures or openings 232, 234, 236, 238, 240, that match (and are given the same annotation as) the apertures or openings of assembly 170 more generally. That is, the openings defined between the head frame 192 and tail frame 194 and the various cross-members 196, 198, 200, 202 in frame assembly 180, and the solid panels and apertures or openings in stator assembly 182 are stationary. When movable member, or moving assembly, 184 is not present, it can be seen that the openings in frame 180 and the openings in stator assembly 182 align, and co-operate to form the passageways through assembly 170 that are indicated as apertures 232, 234, 236, 238 and 240. In terms of flow, the cross-wise extending members of frame assembly 180 are upstream; stator assembly 182 is downstream; and movable member 184 defines a weir, or weirs, that move slidably in the slot created between, and bounded by, the upstream and downstream assemblies. Stator assembly has a main sheet 250 that has downwardly bent side margins or flanges, or legs 246, 248. These margins have apertures formed in them for fastening hardware such that legs 246, 248 may be mated with the downwardly extending legs of side frames 188, 190. The various apertures are punched or cut in main sheet 250. On the underside of main sheet 250 are stems, or webs, or ribs 252 that run parallel to the long edges of the various apertures, offset sideways away from the edge. Ribs 252 and main sheet 250 form T-sections along the edges of the various apertures, and provide a stiff supporting edge for the corresponding panels or slats of sliding movable shutter 184. Rib 252 at the end nearest to head frame 192 has notches 254, 256 that provide a space, an allowance, rabbet, clearance opening, passageway, or accommodation for rack member 260 of drive transmission 186. Apertures 232, etc., are less wide than the main body of sheet 250 between flanges 246, 248, such that a continuous horizontal strip 262, 264 remains on each side of sheet 250. Strips 262 and 264 co-operate with flanges 246, 248 to form an angled reinforcement along the edge of the plate. Expressed differently, stringers 278 run longitudinally from the leading rib 252 nearest head frame 192 to the most distant rib nearest tail frame 194. The uppermost edges or surfaces of stringers 278 provide intermediate sliding surfaces upon which the various louver or shutter panels ride when sliding open and closed. In effect, in the embodiment illustrated, each stringer 278 can be thought of as an angle iron in which the vertical web is the flange defined by leg 246 or 248, and the horizontal flange is defined by portion or strip 262, 264 remaining between apertures 234, 236, 238, and 240 and legs 246, 248 respectively. On assembly, apertures 272 are the same width as, or marginally wider than, apertures 232, 234, 236, 238 and 240, as may discourage accumulation on sheet 250.

hutter 184 is formed of a flat sheet or flat plate 270. It has four apertures 272 punched or cut therein. Apertures 272 have a width $W_{272}$ that is not as wide as plate 270, but leaves side strips 266, 268, that correspond to, and may be the same width as, strips 262, 264 of sheet 250, and to the location and width concealed by shroud 212. Apertures 272 also have a length $L_{272}$ in the direction of sliding motion. Length $L_{272}$ is shorter than the dimension $L_{226}$ of plate 226 and the dimension $L_{233}$ of stator assembly 182 in the direction of travel, such that, when gate assembly 170 is closed, all of the openings in the shutter plate 270 are concealed so that lading does not flow. Plate 270 also has louvers or slats or shutters, or blanks, such as moving, or movable, panels 274. In the example shown, there are five such panels or louvers or slats or shutters 274 corresponding to the number of stationary apertures frame assembly 180 and in stator 182. Louvers or shutters 274 accordingly have a length in the direction of travel, $L_{274}$ that is greater than the length in the direction of travel, $L_{232}$, of corresponding apertures 232, etc., such that when gate assembly 170 is closed, lading does not flow. The edges of shutters 274, when closed, overlap, and are supported by the corresponding aperture margins of stator assembly 182. When the various shutter panels are moved, in sliding translation in the opening direction, toward the open position, they progressively expose the apertures in the gate, thus permitting the egress of lading under the influence of gravity. By contrast, when they are driven in sliding translation toward the closed position they occlude the apertures, advancing until the opening is fully eclipsed, i.e., closed. The forward edge of apertures 272 may be a straight edge. Alternatively, as shown, it may be arcuate according to the curved edge 276 shown. The trailing edge of plate 270 may also have curved edge 276. The thickness of plate 270 corresponds to, and fits in sliding relationship in, the vertical clearance space between shroud 212 and plate 250. When shutter 184 (being, collectively, all of shutters 274), moves from closing apertures 232, etc., to opening them, the center of the arc of curved edge 276 will clear the corresponding edge of the stationary cross-members, allowing lading to flow first at the center, and then wider along the arc as the gate opens further. Similarly, when the gate is closing, it will start to close at the outer corners first, and at the center last. This could also be achieved by having a straight edge on the moving plate, and a curved edge on the stationary elements. It is convenient that the non-straight profile be on the moving element.

The transmission or drive 186 includes input drive shaft 210, which has an input interface, or input interface member, or simply a rotational motion input, such as may be in the nature of a male or female engagement fitting 280 formed to receive torque from an external source, such as a pneumatic or electric drill operated by personnel at trackside. To that end, fitting 280 extends laterally proud of side frames 188, 190 on either side of car 20. In the illustration, fitting 280 is a female socket. Shaft 210 has first and second drive output interfaces, or outputs, in the nature of gears or pinions, 282, 284. Racks 260 are mounted on the underside of the leading slat 274 in line with strips 266, 268. In operation, as the teeth of drive pinions 282, 284 turn, they engage the mating teeth of respective first and second racks 260 adjacent the left and right hand side frames 188, 190, driving strips 266, 268 forward and backward between the open and closed positions of the sliding gate. Strips 266, 268 thus function as parts of the drive transmission, being drag links in the opening condition, and push rods in the closing condition. They slide in the passageways, or guideways, or slots, or tracks, define between shrouds 212 and strips 262, 264. Strips 266, 268 also function as reference datum members that establish and maintain the spacing between the movable shutter panels and the respective openings with which they engage or inter-act.

It would be possible to make moving assembly 184 as an assembly—with separate push rods to which shutter plates are attached, e.g., with fasteners such as rivets or bolts. However, as in the example, a simpler structure arises by making them from a single sheet of stamped or punched or cut metal.

In summary, each gate assembly 170 is a sliding gate assembly. It has a stationary structure and a moving structure. The stationary structure includes at least two openings. The moving structure includes at least two shutter members that correspond to the two openings. The shutter members are mechanically joined or linked such that they are yoked or slaved together, and therefore travel through the same motion. The shutter members are movable between a first position and a second position. In the second position the openings are less obstructed by the shutter members than in the first position.

In that assembly, the first and second positions are closed and open positions. In the first position the openings are closed to prevent the egress of lading from the hopper. In the second position the openings are open to permit egress of lading. The shutters may open progressively. The shutter members may have a non-linear leading edge. That leading edge may be arcuate. Alternatively, the stationary member may have an arcuate trailing edge that is progressively exposed as the respective shutter opens. There is a path-length distance of travel of the shutters, or each of them, between the closed position and the open position. The openings have a width across the gate, and a length in the direction of shutter movement. The width is greater than the length. There is a ratio of aperture width to aperture length. That ratio is in the range of 5:1 to 12:1. In one embodiment it is about 8:1. The gate has a frame. The frame extends peripherally. The frame has two long cross-wise running sides and two length-wise running sides. The sides co-operate to form a rectangle. There is at least a first cross-member that divides the inside of the rectangle into at least the two openings. That is, there is a divider between the first and second openings. In the open position, one of the shutter members is at least partially concealed under the divider. In general, where the number of openings is n, there are n−1 dividers.

In the embodiment shown, in the open position the shutter plates are sheltered by the triangular cross-section cross-members 196, 198, 200, 202. The triangular cross-members 196, 198, 200, 202 have a width $L_{226}$ over legs 222, 224 that is greater than the length $L_{272}$ of the slot in the opening and closing direction. The sliding gate has a through thickness height. The sliding gate has an overall width and an overall length. The through thickness height is less than ⅓ of the cross-wise width measured over the vertical walls of the side frames, in some embodiments is less than ¼ of the width, and in the embodiment illustrated is about ⅕ of the width. The through thickness is less than ⅓ of the length measure over the flanges, in some embodiments is less than ⅕ of the length, and in the embodiment shown is about ⅛ of the length of the frame. In operation, the displacement of the shutters in the direction of travel is less than ⅓ of the overall gate length. That is, the sliding gate valve, including its triangular members and side frames, is shallow in vertical dimension as compared to either its length or its width. The foregoing relative dimensions and ratios relate to the overall gate structure being relatively flat, and substantially planar.

In other embodiments, with suitable adjustments of length and width, discharge gate assembly 170 could be mounted with the direction of motion across railroad car 20, rather than lengthwise. This would place both ends of torque input shaft 210 on one side of car 20. It is convenient for the direction of opening to be parallel to the centerline of car 20.

In the embodiment of discharge gate assembly 170, pinions 282, 284 and rack members 260 are used to convert rotational motion into linear translation or the movable shutter members in the x-direction. In this example, pinions 282, 284 have a lobate bore 288 that receives the generally rectangular torque shaft section 290. The lobate bore is larger than the torque shaft to leave an angular tolerance, or lost motion, between the angle at which the driving shaft stops driving the pinion counter-clockwise, and when, as driven in the opposite direction, it begins to drive the pinion clockwise. Assembly 170 also includes a lock 292, which may have a pawl that engages a toothed wheel. The pawl is lifted to disengage from the toothed wheel when gate assembly 170 is to be opened or closed. The pawl and wheel arrangement is found on both sides of gate assembly 170, with the pawls being connected by a transverse shaft or rod 294, such that release and engagement can be set by personnel at trackside on either side of car 20. Corresponding pawls or fingers 296 mounted along rod 294 fall into place to engage the leading edge of the movable louver or shutter plate when it is closed. To that end, pawls or fingers 296 may have a notched finger-tip, or catch, or dog, that engages the leading edge.

Figure 7A:
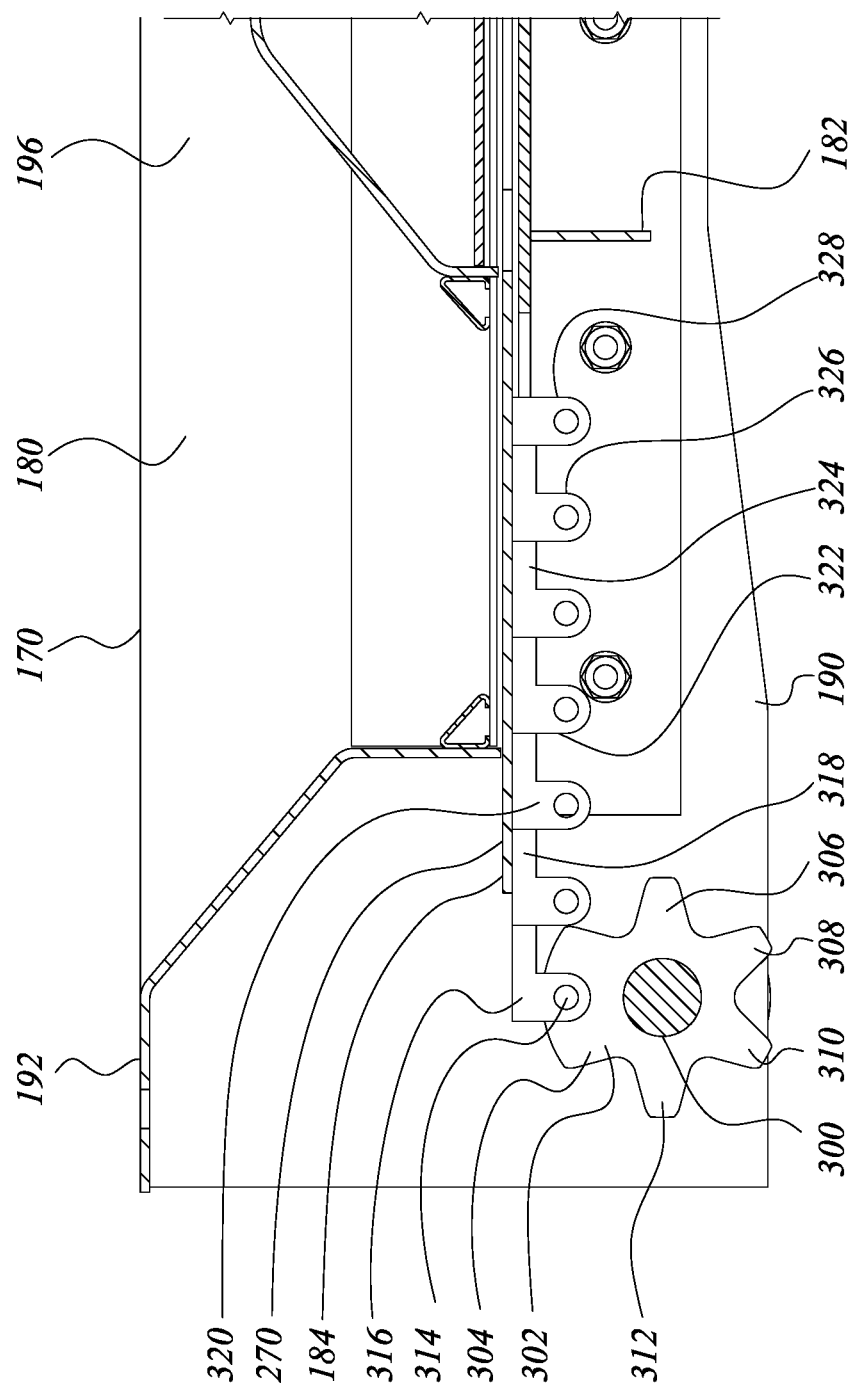
Figure 7B:
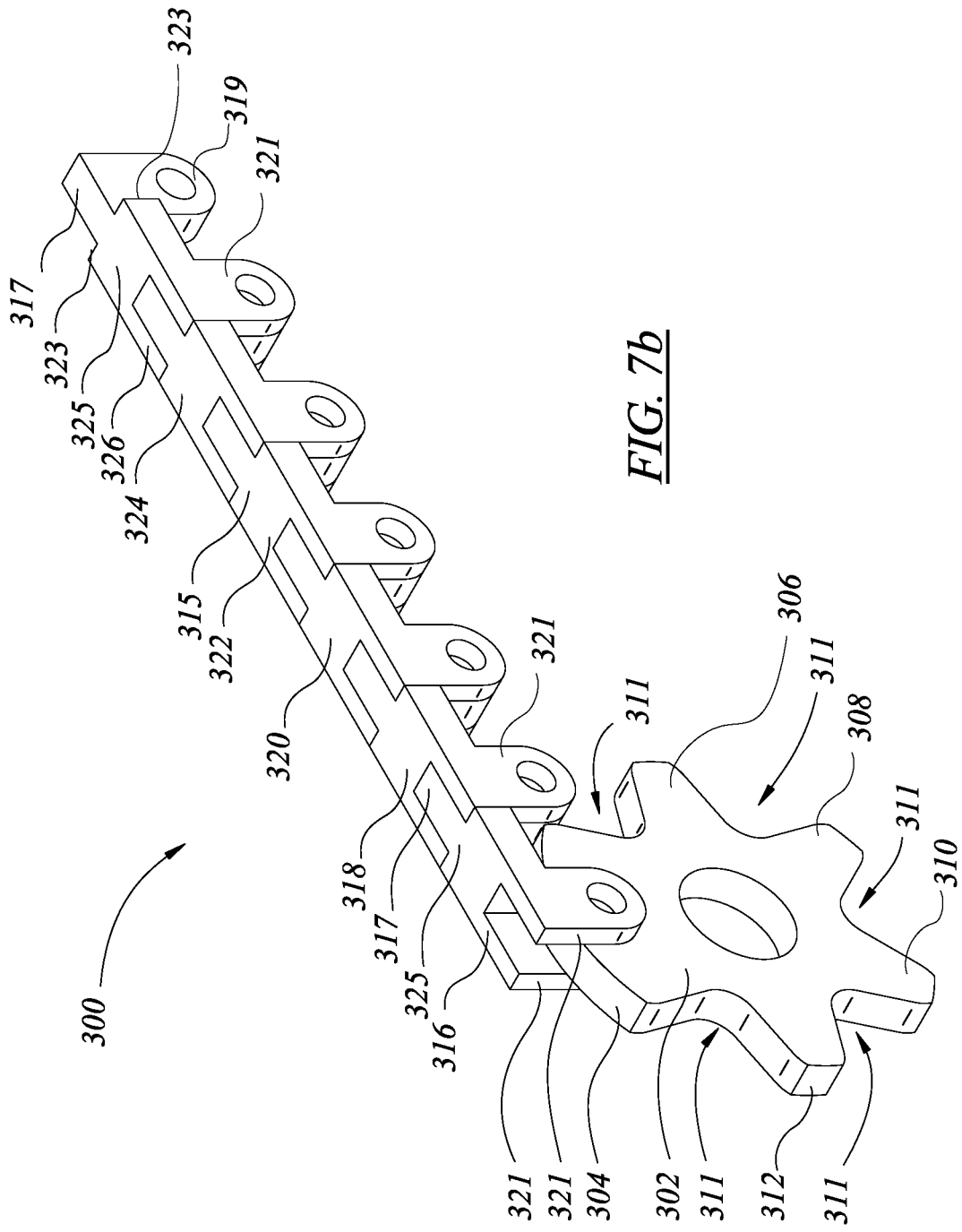
Figures 7C, 7D:
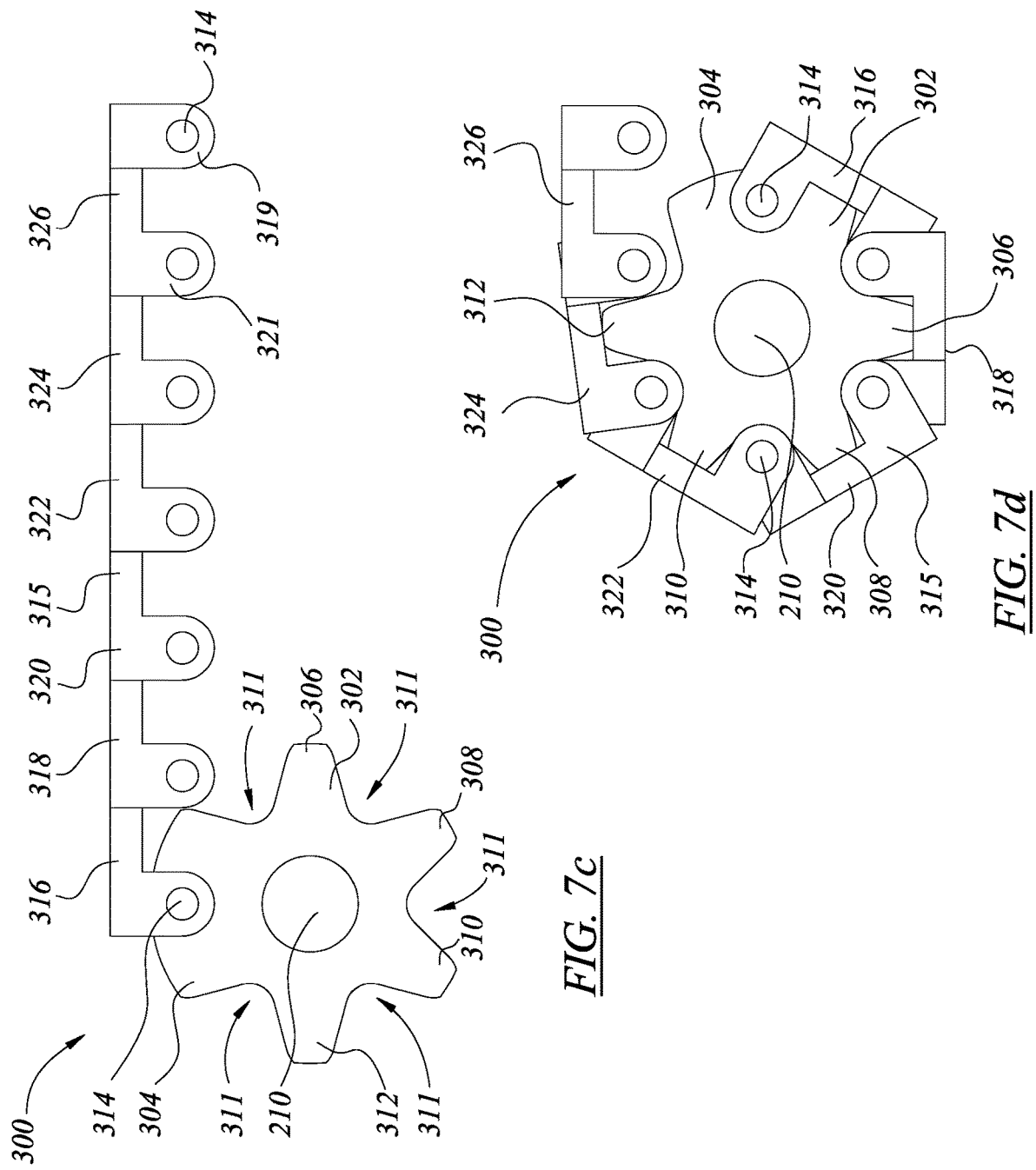
FIG. 7c is a side view of the mechanism of FIG. 7b as extended.
FIG. 7d is a side view of the mechanism of FIG. 7b as retracted.

An alternate embodiment of motion transmission apparatus or assembly or linkage is shown in FIGS. 7a to 7c. In this embodiment, drive or transmission 286 includes shaft 210 as before, but rather than having the squared or rectangular torque transmission sections described above, it carries a wheel or toothed wheel or gear identified as fixed pinion 302. Fixed pinion 302 has a series of lobes 304, 306, 308, 310, 312. Lobe 304 is pierced and the pin 314 of a first link 316 of a set of linkages 315 is mounted through lobe 304. That is, a pivot pin or hinge connection is made such that link 316 cannot separate from lobe 304. The pin connection to lobe 304 then makes lobe 304 function as an arm or crank drive by shaft 210. As shaft 210 turns to open the gate, the pins of the successive articulations between the following links 318, 320, 322, 324 and 326 locate in the tooth gaps between the corresponding successive lobes. The last link, 328, is fixedly attached to main sheet, or plate, 270. In this embodiment, the pairs of articulated linkages in set 315 are joined to their respective neighbours, or neighbour, at articulation pins 314. Notably, the leading part or leg 319 of the nose or leading portion 317 of each link lies on the centerline of the lobed wheel or gear of pinion 302, and pivots in space 311 between the respective corresponding pair of adjacent lobes. The rearward portion of each linkage is bifurcated, or channel-shaped, such that its arms, or legs 321, embrace the following lobe of the lobed wheel, i.e., pinion 302, and provide a clevis into which the leading portion 317 of the following linkage is received in its double-shear, pin-jointed connection. In effect, the linkages are joined together in the repeated male-female relationship of tank tracks. When the set of linkages 315 is unwound to lie against the face of the sliding plate, as in the orientation of FIG. 7c, the various linkages are laid down against the plate in series (i.e., sequentially or progressively) to lie against the sliding gate and form a continuous track that is straight and flat. As seen in FIG. 7b, the nose of the leading central part of each linkage lies between the legs of the clevis. The shoulders 323 of the shank of the linkage bottom against the trailing end of the shank of the leading linkage to which it is mounted. The shank has a channel cross-section. The back of the channel 325 lies against the sliding gate, and the leading face of back 325 abuts the rearward face of back 325 of the preceding section. Legs 319 and 321 of each segment extend comparatively radially inwardly relative to the centerline of shaft 210, even when they lie on a secant against the sliding gate. When backs 325 line up, they transmit force in compression between their respective backs along a line of action parallel to the sliding gate, to urge the sliding gate to move. In the example, that motion in compression is in a direction to close the gate. In this example, the various linkages 316 to 326 can be considered conceptually as the vertebrae of a spine. Since the back is radially outward, the compressive force is applied eccentrically relative to pins 314, in a manner tending to force the back more tightly into the orientation of FIG. 7c. That is, the application of compressive force is essentially an over-center force tending to close the linkages together, i.e., forcing the vertebrae of the spine to align in a straight line in compression. The eccentricity of backs 325 relative to pins 314 keeps the chain from flexing or buckling away from the sliding gate, and the sliding gate prevents the chain, or track, from flexing in the opposite direction in bucking. The fixed mounting to lobe 304 means that the range of motion of the transmission is limited to less than one full revolution of shaft 210. That is, once the segments of the set of linkages 315 fills the spaces between all the lobes, the assembly cannot turn further.

Figure 8A:
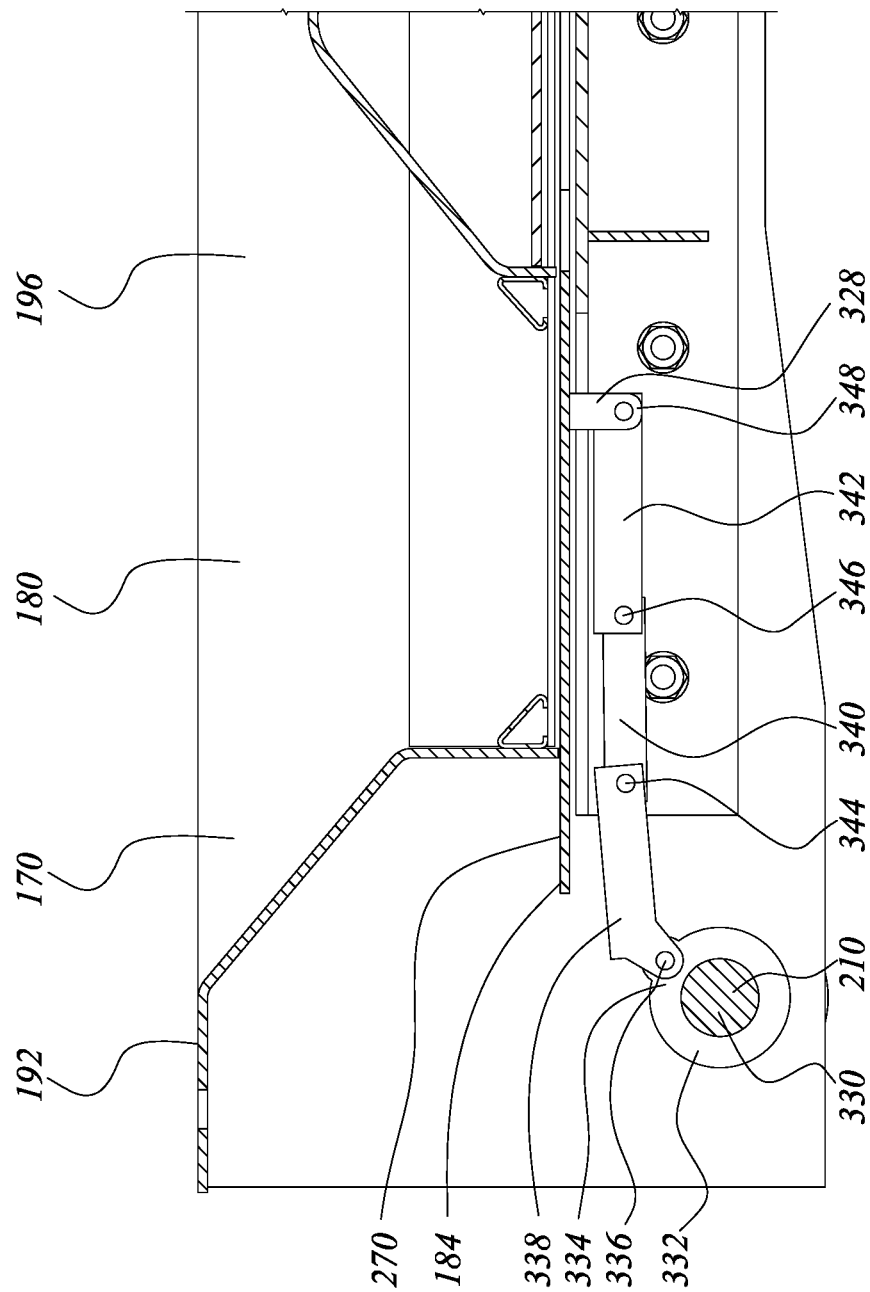
Figure 9A:
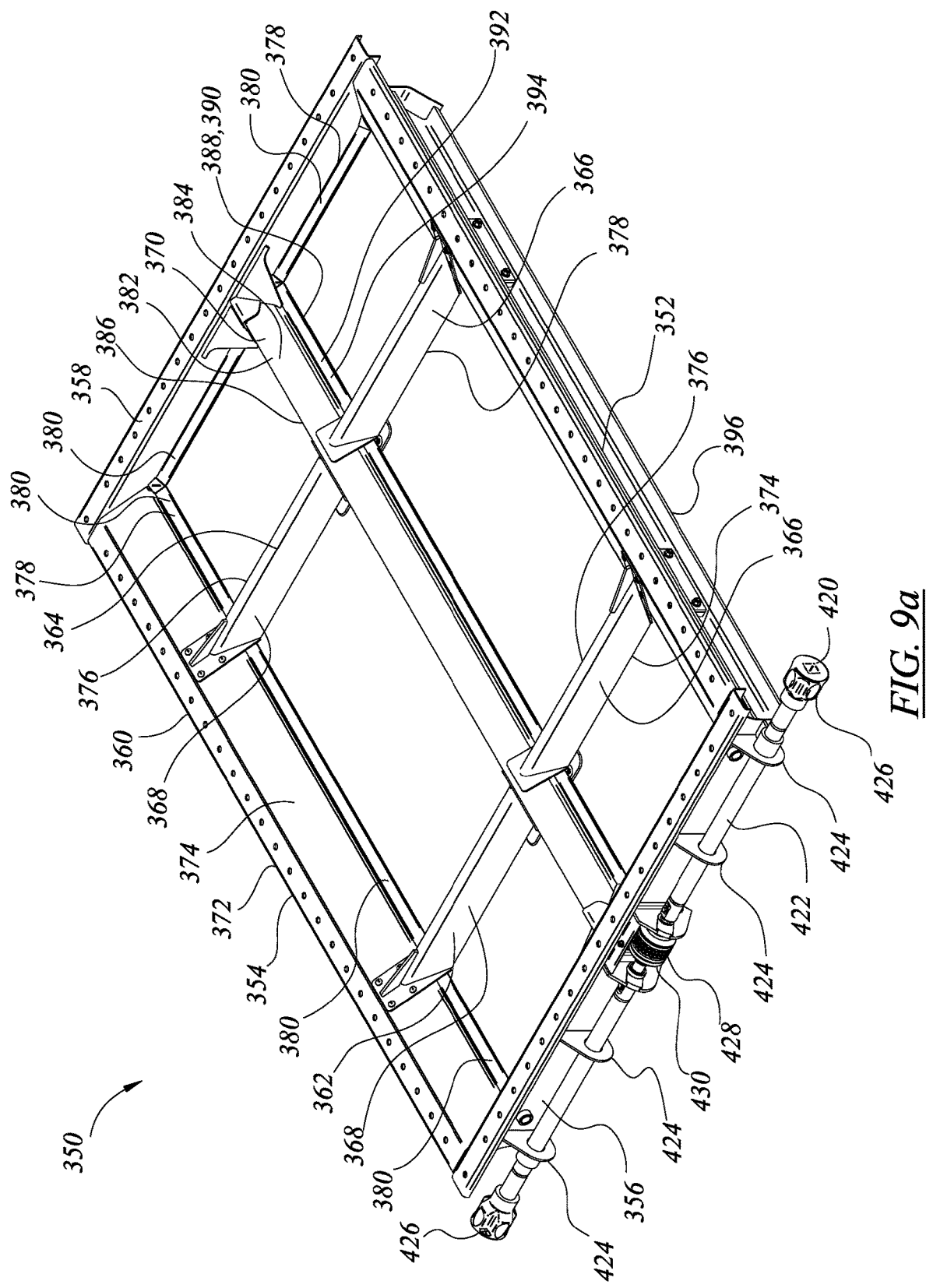
FIG. 9a is a perspective view of an alternate gate assembly to the gate assembly of FIG. 3a, taken from above.
Figure 9B:
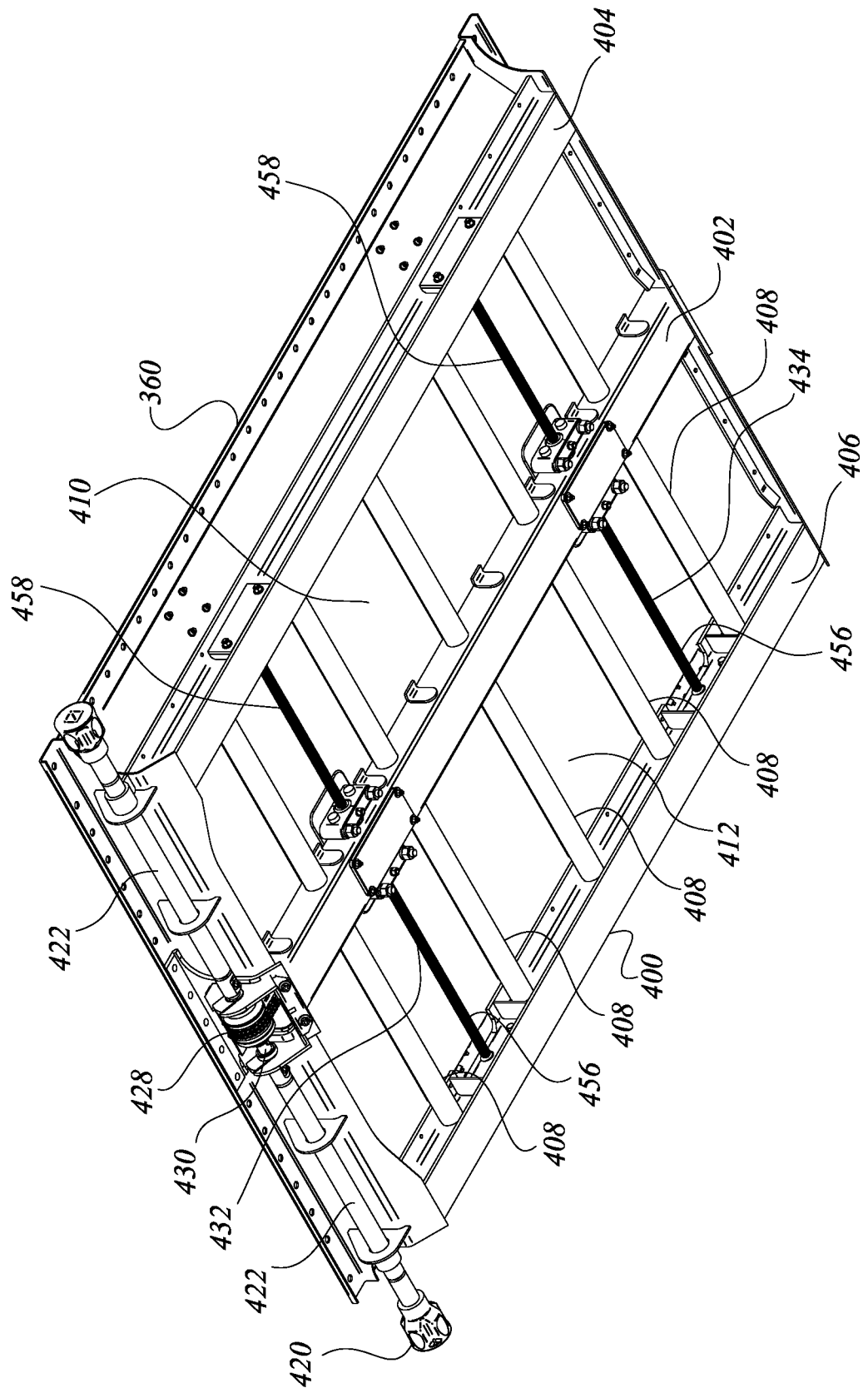
FIG. 9b is a perspective view of the gate assembly of FIG. 9a seen from below.
Figure 9C:
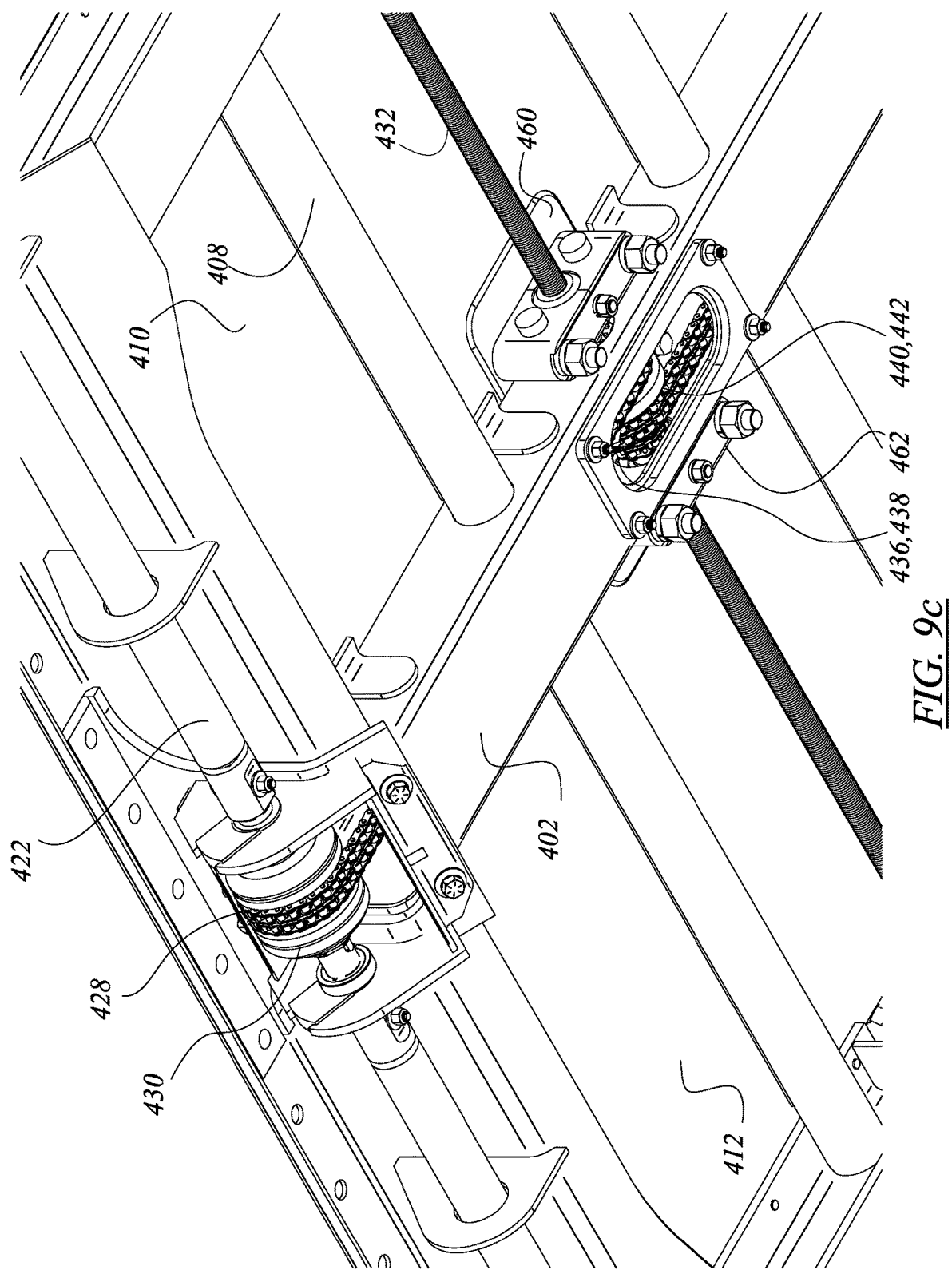
Figure 9D:
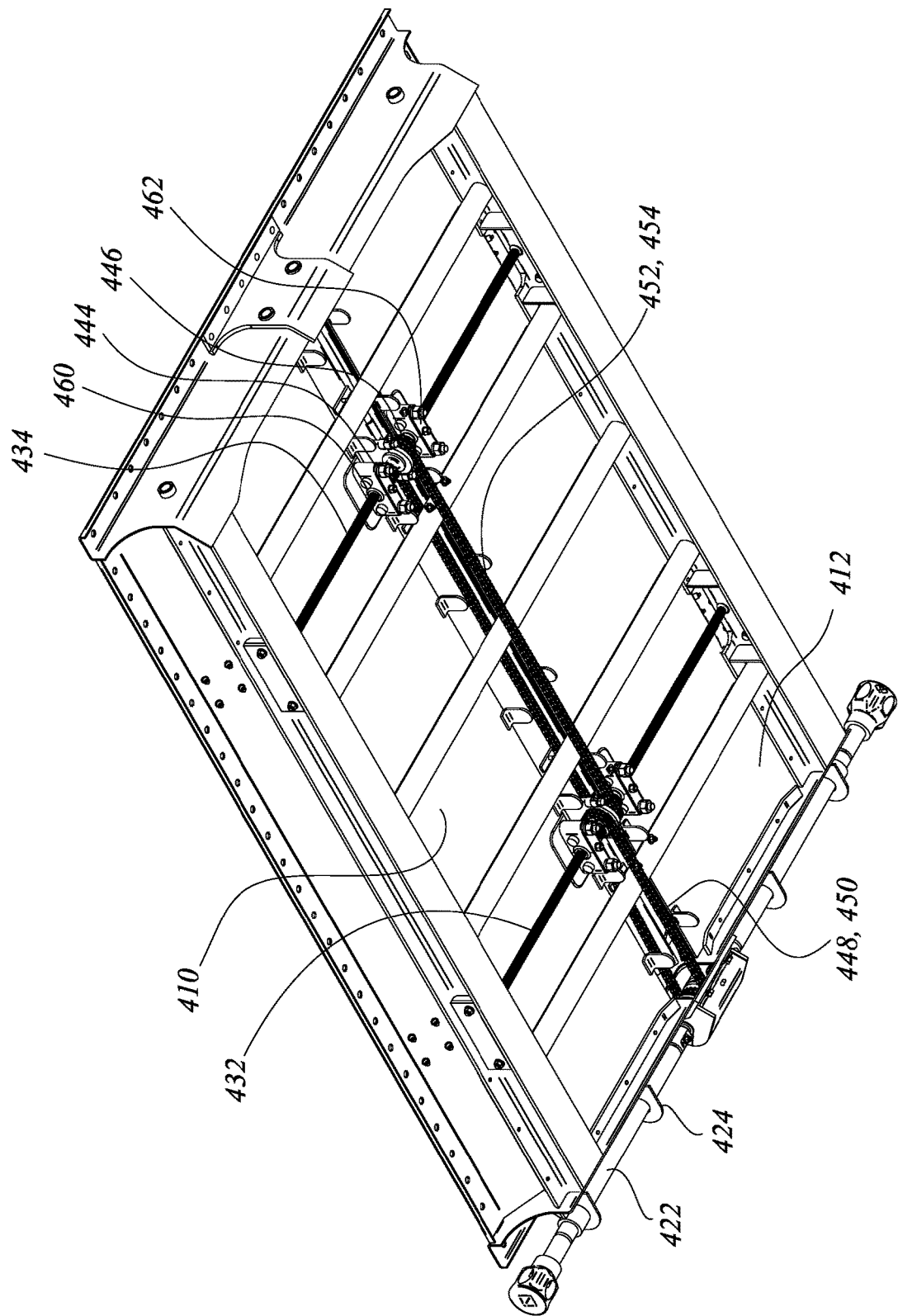
FIG. 9d shows the drive mechanism of FIG. 9c with shroud removed.
Figure 9E:
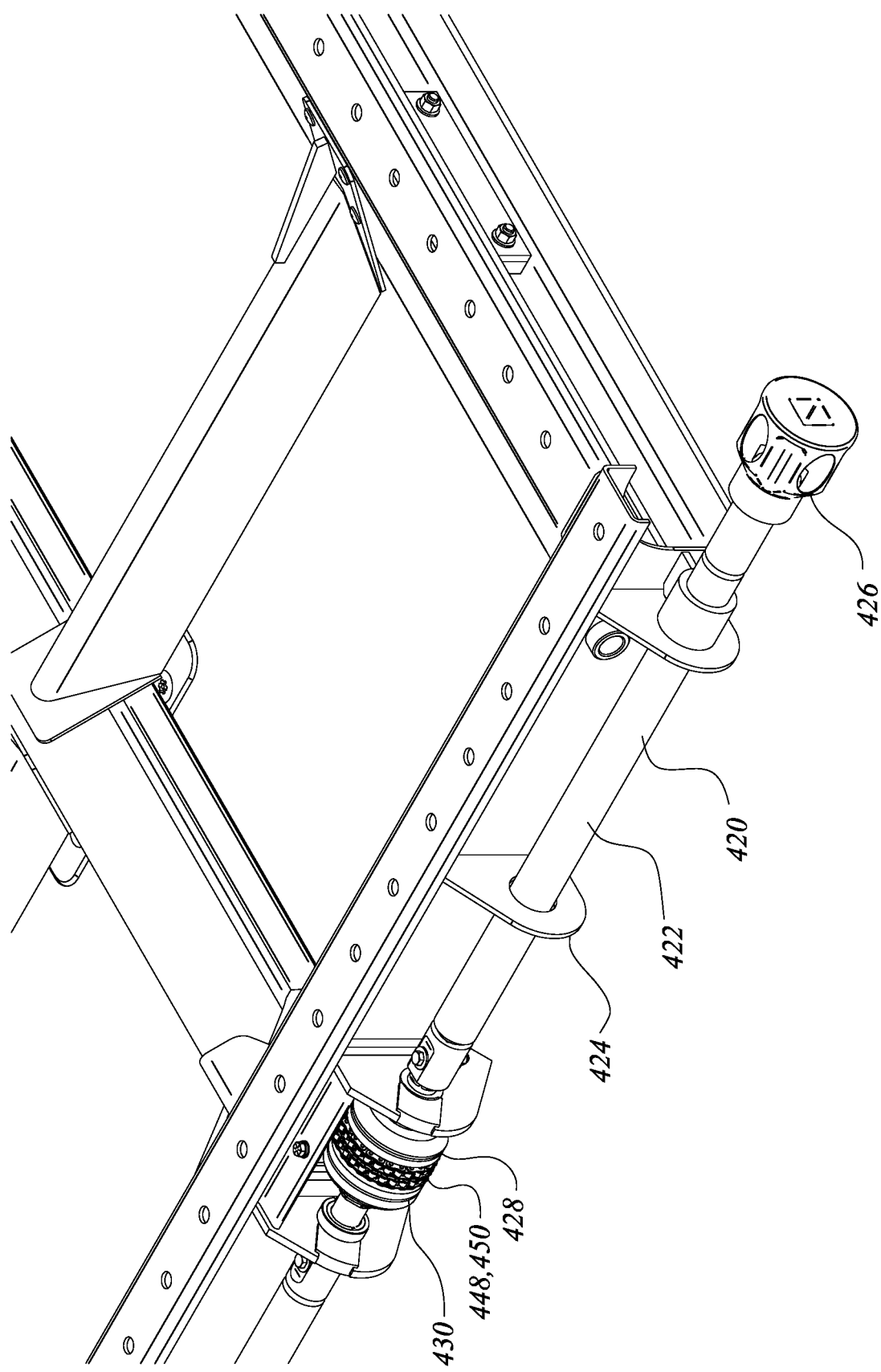
Figure 10A:
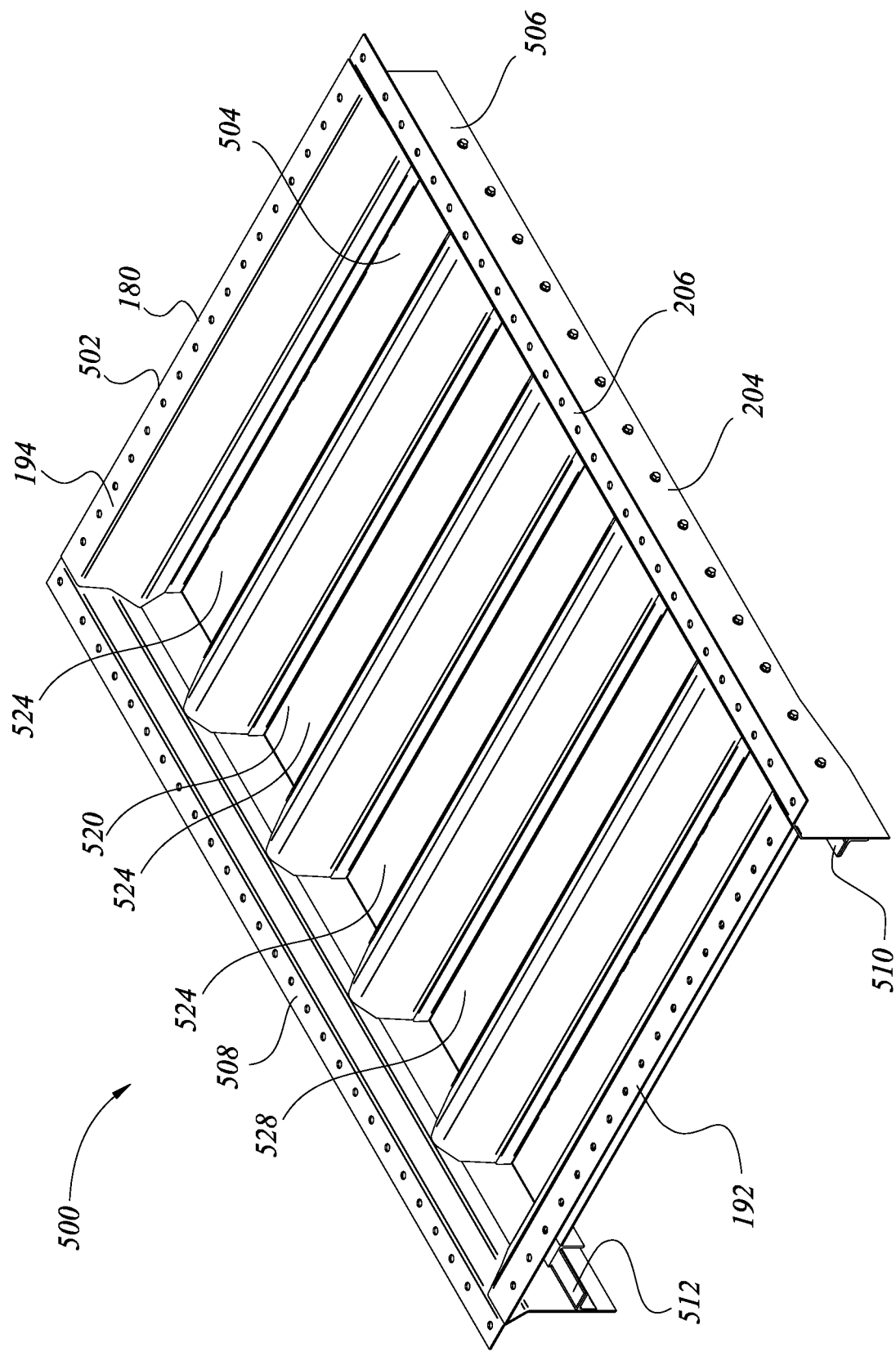
Figure 10B:
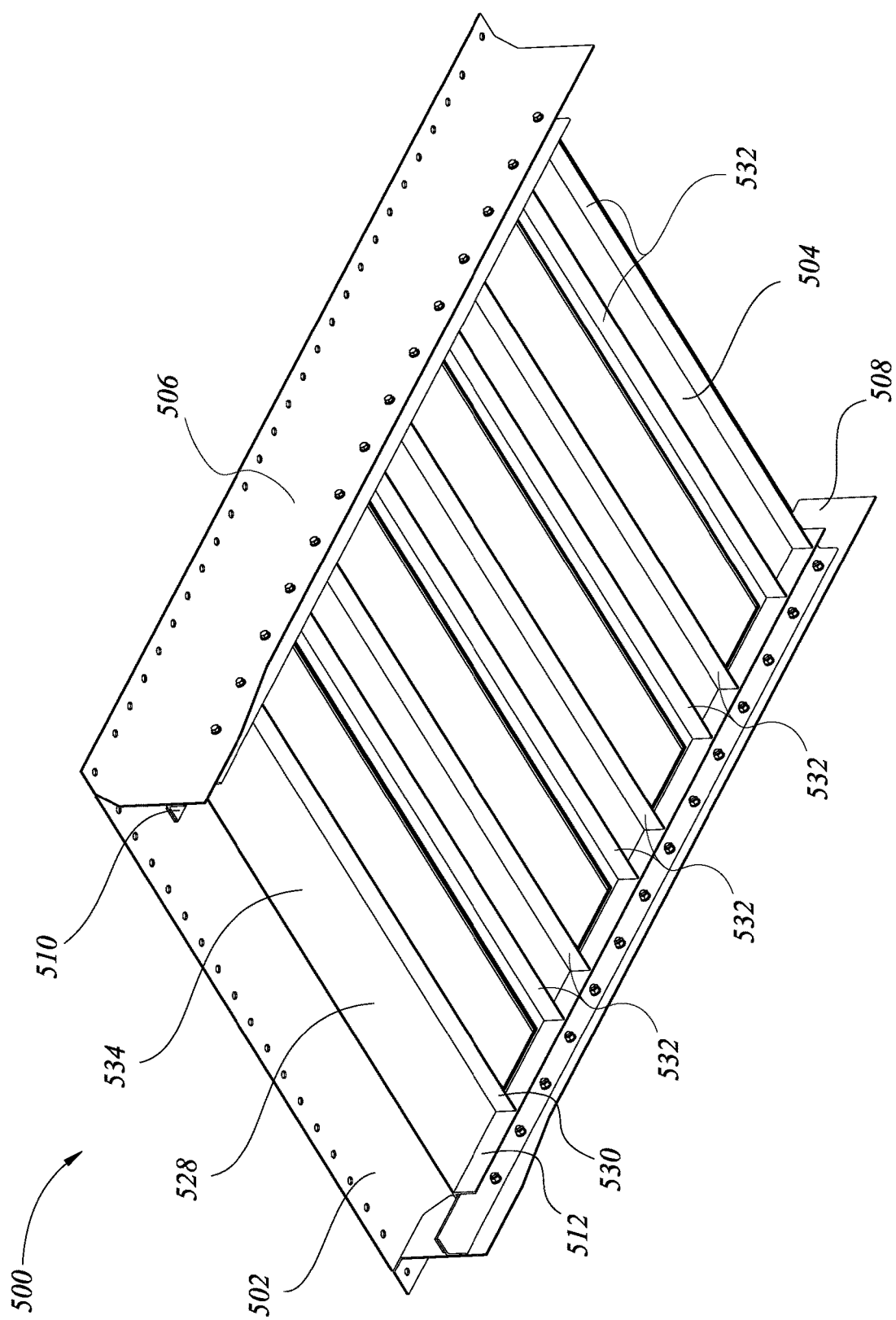
FIG. 10b shows a perspective view of the gate assembly of FIG. 10a from below.
Figure 10C:
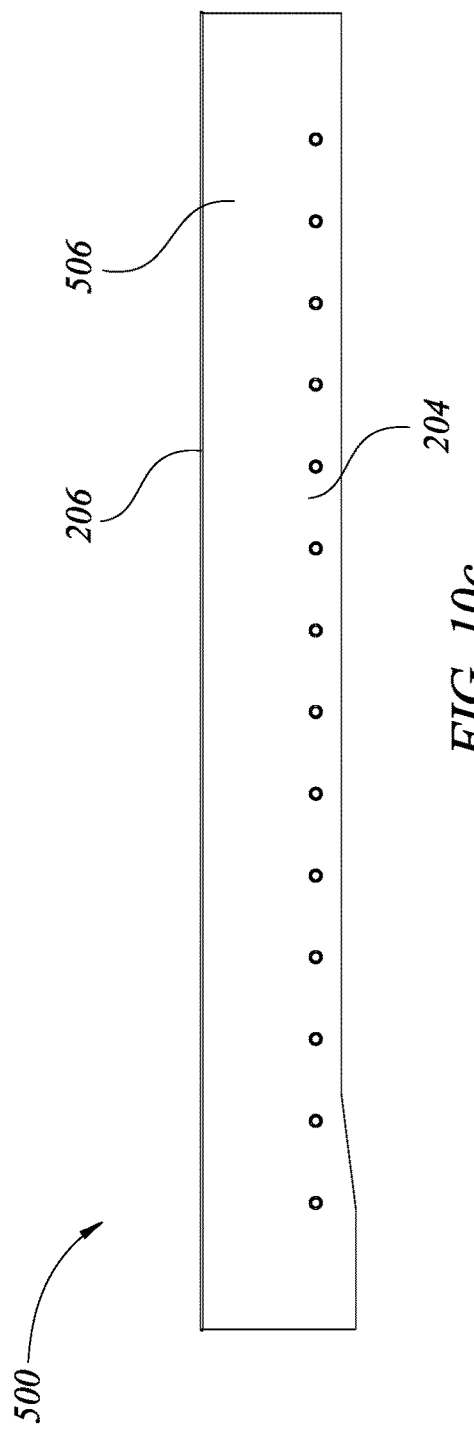
Figure 10D:
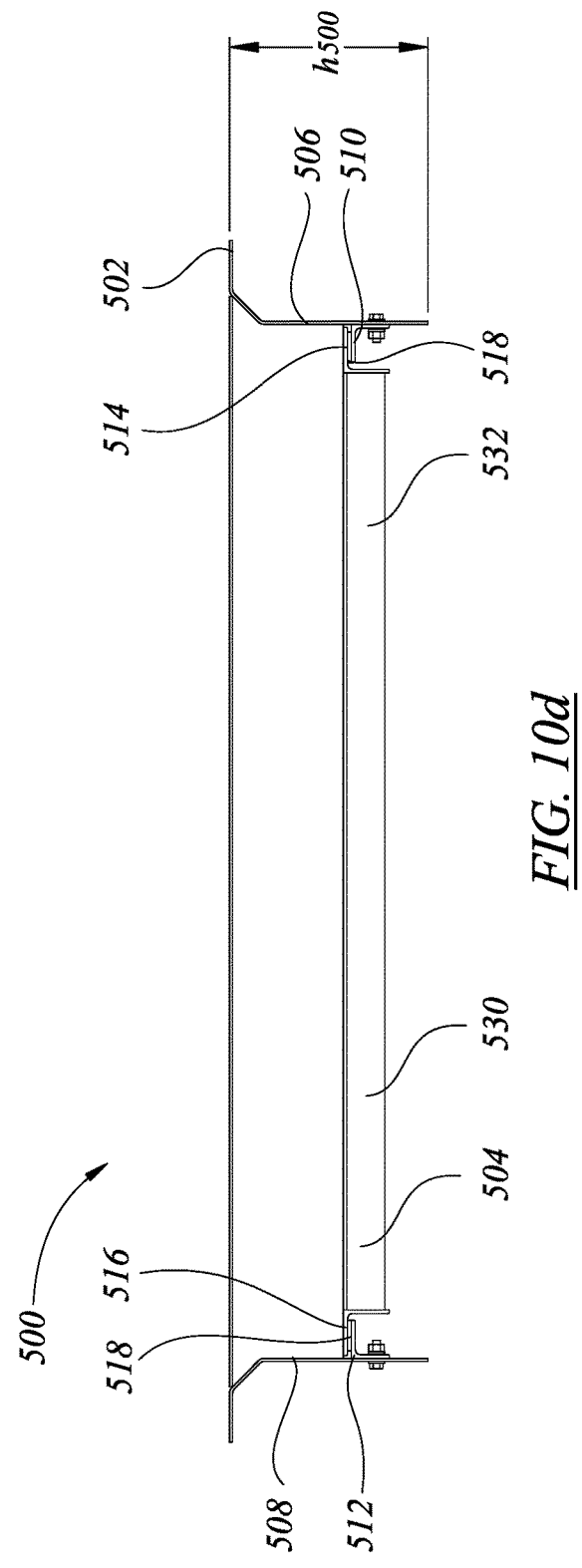
Figure 10E:
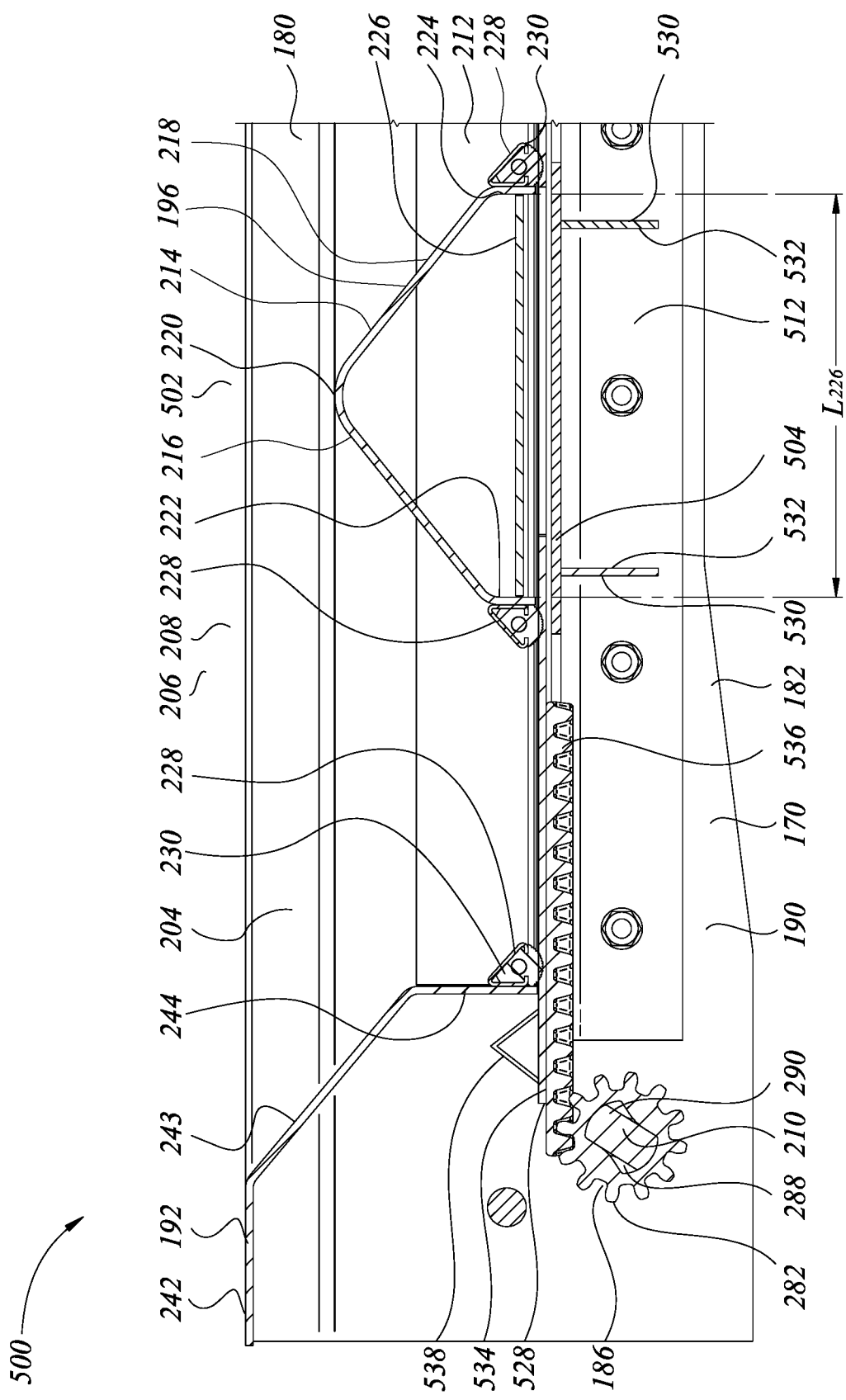
Figure 11A:
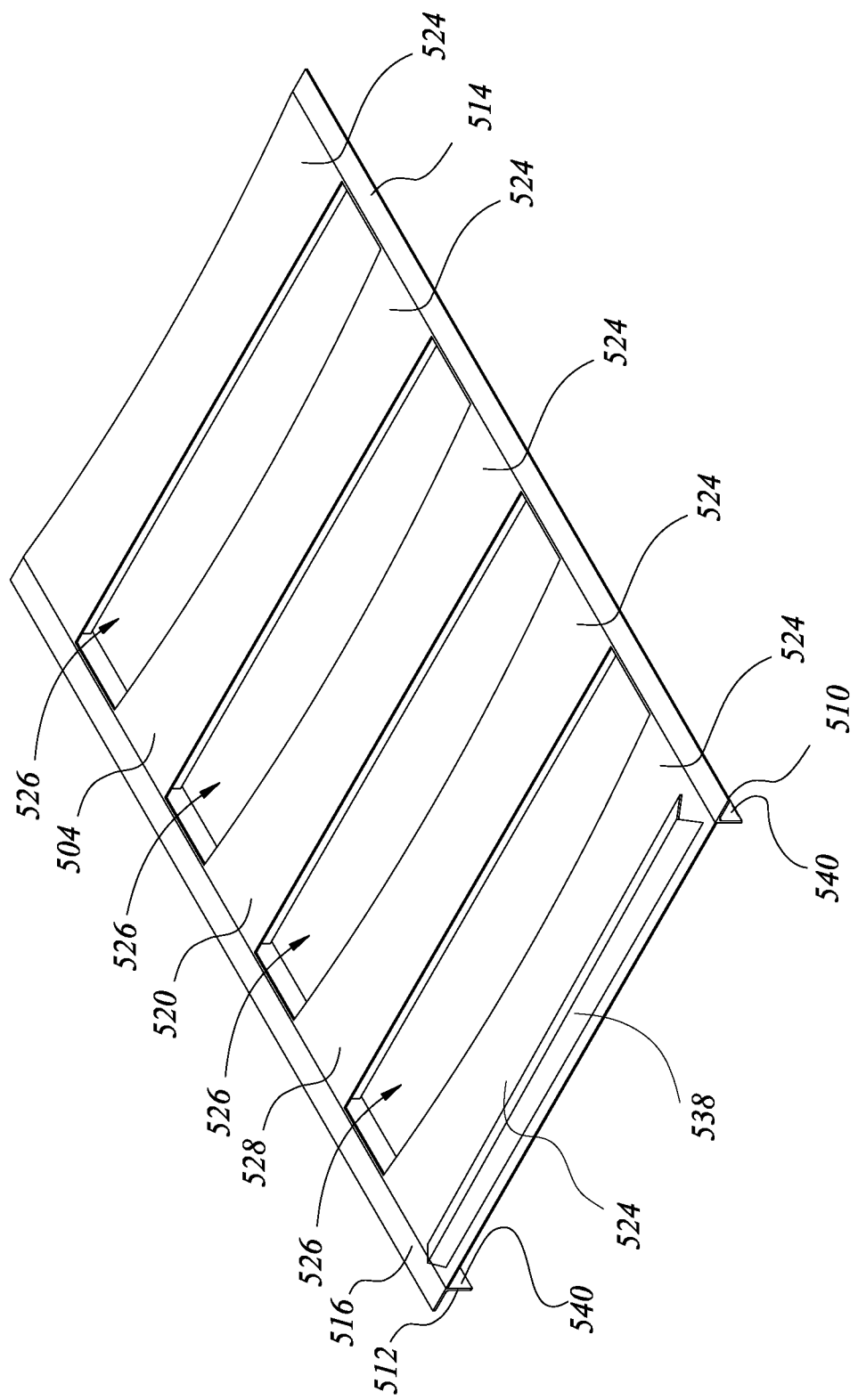
Figure 11B:
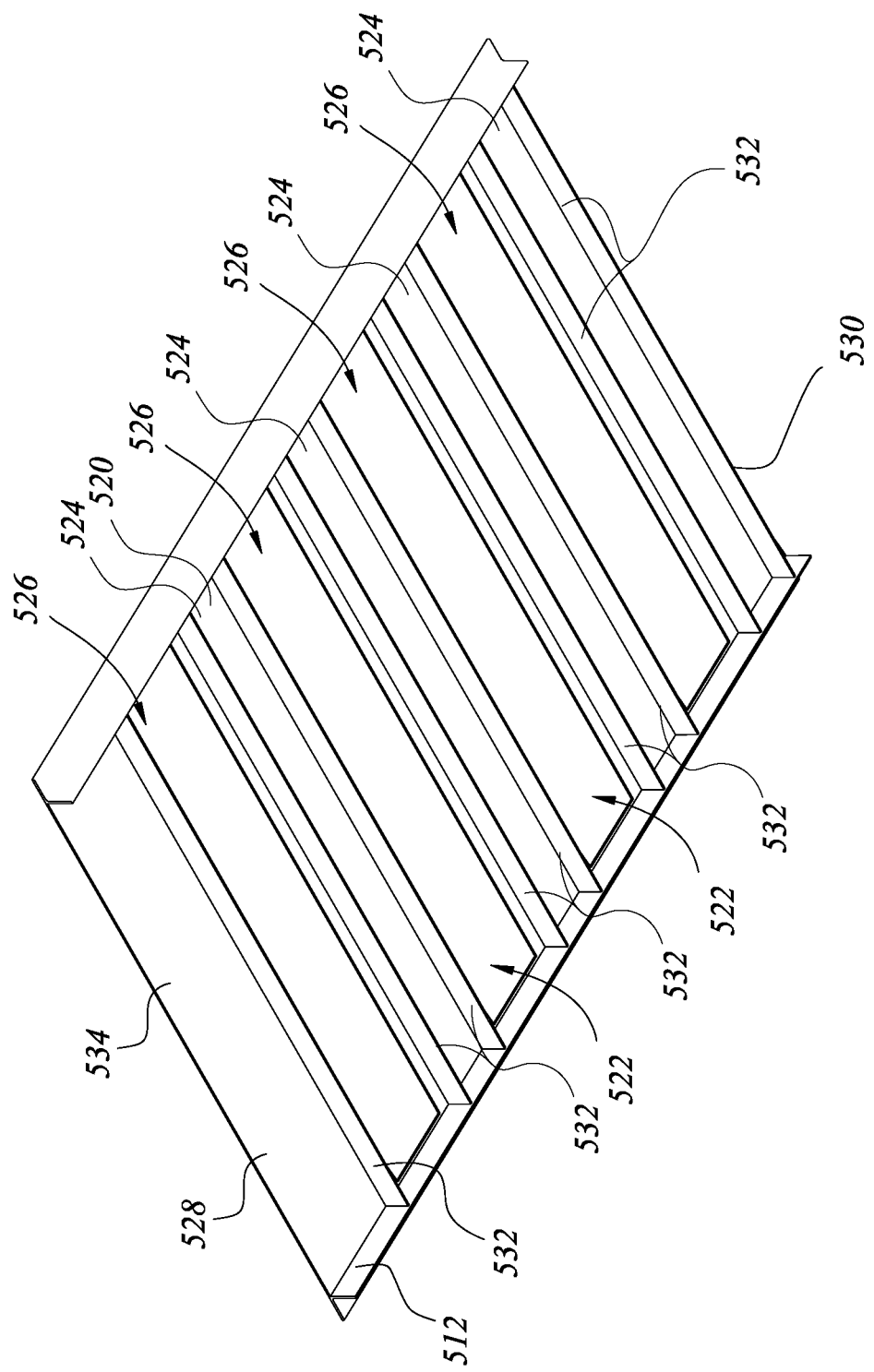
Figure 11C:
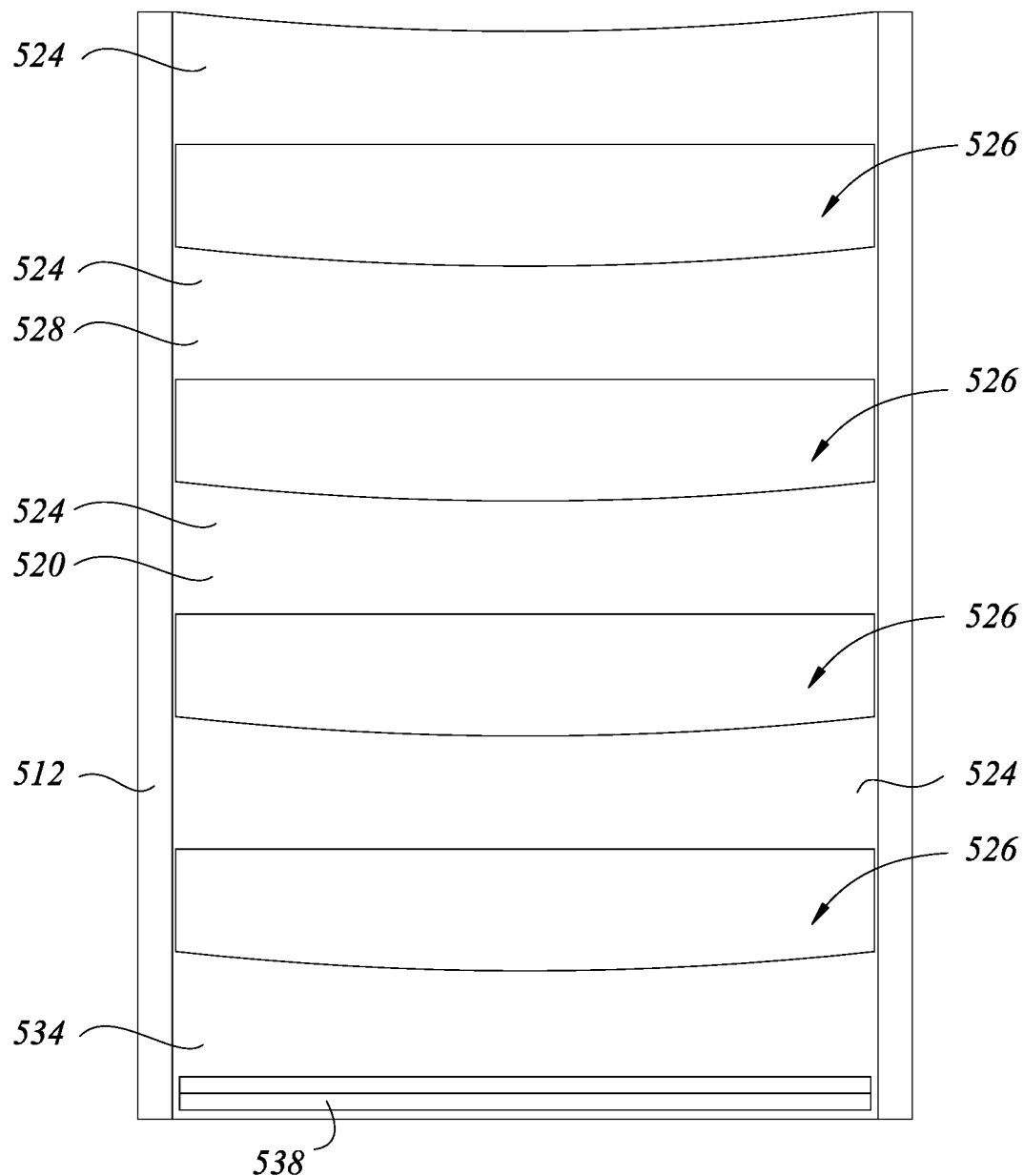
Figure 11D:
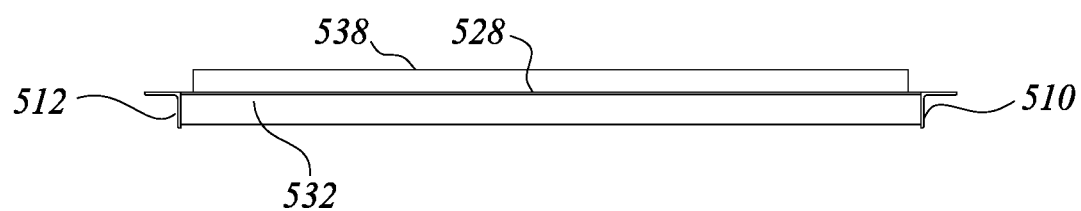

Alternatively, in FIGS. 8a to 8c, drive or transmission 330 has an annular disc 332 rigidly mounted to shaft 210. Disc 332 has a radially outwardly protruding ear or wing such as may be termed a boss or lug, 334 pierced to accept pivot pin 336. Transmission 330 has a set of links, or linkages, 338, 340, 342 that are linked together at pin joints 344, 346. The far end of link 342 is connected at a pin 348 to a footing 328 mounted to main sheet or plate 250. As can be seen in FIG. 8c, as shaft 210 turns counter-clockwise (i.e., to open the shutter gate) links 338, 340 and 342 are progressively wound around shaft 210. Note that linkages 338 and 342 are U-shaped or channel-shaped in cross-section such that they define devises. Thus when wound, the sides of the U-shape seat about disc 332. Linkage 340 is a plain bar that lies in the same plane as disc 332, and so it meets on a tangent. When the set of linkages 338, 340, 342 winds around wheel or disc 332, in less than one full revolution of shaft 210 it cannot turn further as shown in FIG. 8c, and stops.

In the alternate embodiment of FIGS. 9a-9e, there is an alternate hopper discharge gate, or discharge gate assembly, 350 that is sized to mate with the respective lands 172, 174, 176 of car 20, such that it can be mounted to the same foot-print as could discharge gate assembly 170. Hopper discharge gate 350 include a frame 360 that has a pair of opposed, longitudinally-running side frame members 352, 354; and a pair of opposed, cross-wise running first and second, or head and tail, end frame members 356, 358. Members 352, 354, 356 and 358 are co-operatively assembled to form a rectangle, as before. Gate 350 also includes a longitudinal member, divider, or partition, or beam, 370 that runs lengthwise from member 356 to member 358 at a location intermediate members 352 and 354. In the embodiment illustrated, member 370 runs along the longitudinal centerline of gate 350, and the gate assembly is symmetrical to either side of the centerline. Gate 350 also has first and second intermediate laterally extending beams or members 362, 364 that run across gate 350. Each of members 362, 364 has a first, or left hand, portion 366, and a second, or right hand, portion 368. Portion 366 runs from member 370 laterally outboard to the left to member 352; portion 368 runs from member 370 laterally outboard to the right to member 354.

Each side frame 352, 354, has an upper, horizontal flange 372, with mounting fittings, a sloped portion 374 extending inwardly and downwardly, and a lowermost vertical leg 376. A seal strip 378, generally similar to seal housing strip 228, and including a brush or seal 380 corresponding to seal 230, is mounted to the inward face of leg 376. Side frames 352, 354 function as longitudinally extending beams.

Central longitudinal member 370 is also a beam. It may be generally 5-sided in section. That is, it has a hat or cap 382 that includes to sloped sides 384, 386 that meet at a radiused apex. It also has downwardly extending legs 388, 390 and seal housing skirts 392 mounted thereto, in the manner described above. Seals or brushes 394 are mounted therein. There is also a bottom plate or bottom flange 396 that closes the section.

A stationary grille or grid, or sub-frame 400 is carried underneath frame 360. It includes a central member 402 that extends longitudinally underneath member 370; a left hand frame member 404 that extends under member 352, and a right hand frame member 406 that extends longitudinally under member 354. Stationary cross-members 408 run laterally across sub-frame 360 from left-hand member 404 to right-hand member 406, through central member 402. Central member 402 may be a structural steel tube, or may be a channel with a back facing downward and toes extending upward to mate with central longitudinal member 370 laterally inboard of seals or brushes 394. Left and right hand frame members 404 and 406 may be hollow structural tubes of square or rectangular section.

The first and second, or front and rear, ends of central member 402 are mounted to, and capped by, head and tail end frames 356, 358. The first and second, or front and rear, ends of left hand and right hand frame members 404 and 406 are also mounted to, and capped by, the vertical webs of head and tail frame members 356, 358. The top surface of members 404, 406 is spaced downwardly from the bottom surface of frame members 352, 354 to leave a gap, or slot, or allowance, or accommodation. Stationary cross-members 408 are mounted flush with the respective top surfaces of members 404, 406.

Gate 350 also includes moving a pair of first and second or left-hand and right-hand members, or gates, or slats, or doors, 410, 412. These gates move laterally in sliding motion upon cross-members 408, and over the top surfaces of members 404, 406 through the clearance slots or accommodations defined between members 404, 406 and members 352, 354, respectively. Doors 410 and 412 may be matching and symmetrically mounted relative to frame 360 and sub-frame 400. When doors 410 and 412 are open, an outboard portion thereof extends laterally outboard of side frame 352 or 354, as may be, and the inboard edge is sheltered by the side frame seal shroud. Conversely, when doors 410, 412 are closed, their inboard edges seat on top of the upper surface of central member 402, sheltered by the seal strip housings, laterally inboard of seal or brushes 394.

Discharge gate assembly 350 may also include a drive transmission 420. It includes a shaft 422 that is carried in hangers 424 on head frame member 356. It has input fitting 426 at either end at which it receives torque and rotation from a mechanical source of torque and rotation at trackside, such as a pneumatic or electric drill. As can be seen, input fitting 426 is located at a low height, well below the sides sill, and, given the wideness of frame 360, is located in a position that is trackside accessible from either side of car 20. Input fitting 426 may be a female (or male) socket that mates with a male (or female) drive of the trackside power source. At the center of shaft 422 are a pair of output sheaves, or pulleys, or gears 428, 430.

Two sets of rods or shafts 432, 434 extend laterally through central member 402 and laterally outboard to members 404 and 406. Bushings are provided in members 402, 404, and 406 for receiving shafts 432, 434. Between the legs or webs of central member 402, mounted to rod or shaft 432 there is a pair of input sheaves or pulleys or gears 436, 438, and a pair of output sheaves or pulleys or gears 440, 442. Between the legs or webs of central member 402, mounted to rod or shaft 432 there is a pair of follower sheaves or pulleys or gears 444, 446. Drive chins 448, 450 link gears 428, 430 to gears 436, 438. Further chains 452, 454 link gears 440, 442 to gears 444, 446.

Rods or shafts 432, 434 may have unthreaded central and end portions that are carried in the respective bushings. Rods or shafts 432, 434 have left hand and right hand outboard threaded portions 456, 458. Portion 456 is of opposite hand to portion 458.

Left-hand and right-hand internally threaded cross-heads 460, 462 are mounted to the underside of each of doors 410, 412 near their inboard margins. Cross-heads 460 are of opposite hand to cross-heads 462. Accordingly, rotational motion of shaft 422 in one direction, carried through the various gears and chains will drive doors 410, 412 apart to the open position; and rotational motion in the other direction, carried through the various gears and chains, with drive doors 410, 412 toward each other to the closed position. Thus are the doors operated.

As installed, the loops of the various chains are more or less on, or roughly symmetrical relative to, the longitudinal centerline of the gate, and are sheltered within longitudinal beam 370. The chains pass over beams or rods or shafts 432, 434 in one direction and pass under them in the other, i.e., on the return leg. In operation, beams 362 and 364 are located above the threaded drive shafts, such that when lading passes out of car 20, the threaded rods are sheltered by beams 362 and 364.

As indicated above, assembly 350 is intended to be mountable on the same footprint as assembly 170. In the embodiments illustrated, there are three such discharge gates, two mounted with their head frames facing end 28 of car 20, and one with its head frame facing end 26 of car 20. Multiple opening gates having shutters or louvers that are yoked or chained to move together in the same direction, which may be the longitudinal or axial direction of car 20, or a pair of doors that split and are mounted to be driven in opposite directions, such as transverse to the longitudinal rolling direction of car 20 do not have to be used with flat-bottom hopper cars. They could be mounted to the hopper discharges of hopper cars having two or more distinct hopper discharge section, such as may have substantial intermediate slope sheets between adjacent hoppers.

FIGS. 10a to 10e and FIGS. 11a to 11d pertain to an alternate embodiment of gate to that of FIGS. 3a to 6b. In FIGS. 10a to 10e there is a gate assembly 500 that may be understood to fit the same hopper car discharge opening as either assembly 170 or 350. That is, gate assembly has the same footprint, and same elements for mating with the footprint of the hopper car, and so no further description of the hopper car is made. Similarly, gate assembly 500 has a stationary frame having longitudinal members and horizontal cross-frame members at the end in the manner of gate assembly 170. Gate assembly 500 differs from gate assembly 170 insofar as while gate assembly 170 has a moving shutter plate 184 that is sandwiched between the stationary frame 180 and the stationary support backing frame 182, gate assembly 500 has a stationary frame 502, and a moving shutter member or assembly or array, or simply a shutter 504. Stationary frame 502 and moving shutter assembly 504 are shown together in FIGS. 10a to 10e, and moving shutter assembly 504 is shown by itself in FIGS. 11a to 11d. It does not include a stationary reinforcement below moving shutter frame 504. In this embodiment, side frames 506, 508 include shutter guides 510, 512 that run longitudinally along side frames 506, 508 respectively. In the example given, the depending skirts 204 of 188, 190 have guides 510, 512 mounted to them, guides 510, 512 having the form of rails, or side rails upon which the lateral edges 514, 516 of shutter frame run. The guide rails can have the form of angle irons mounted to the lower margins of skirts 204 with the horizontal flange faced upward. A slider strip or bearing strip 518 may be mounted on the upward facing surface of the flange. When mounted in place the upper flange is spaced downward from cross-members 196 to 202 by a gap suitable for accommodating the margins or lateral edges 514, 516 of movable shutter frame 504 below the cross-members, with the peripheral seals mounted in places as wipers.

In this arrangement the movable member, i.e., shutter member 504 has a sheet or plate 528 having an array of slats 520 and an array of complementary openings 522 in which the slats 524 and openings 526 of arrays 520 and 522 alternate, as above. The size, shape, and aspect ratio of the various slats and openings may be as indicated above in respect of assembly 170. In this instance, however, in place of a stationary reinforcement plate or frame as in assembly 170, an array reinforcements 530 is mounted to the underside of the various slats 524 along the laterally extending margins of openings 526. Individual ones of the reinforcements of array 530 may have the form of stems 532 that extend downward of the plane of slat 524. They could also have the form of an angle iron or channel mounted with its toes against the back or underside of plate 528, or a seamless steel tube mounted in the same location. Reinforcements 530 run laterally, i.e., cross-wise between the side frames. In the embodiment illustrated they are seen as perpendicular T-stems. Margins 514, 516 may include angle irons 540 that run along the lengthwise running edges of plate 528. The back of the angle iron abut the end of the lateral stiffener or stem 532 of reinforcements 530. The horizontal leg of the angle iron provides the sliding land that runs upon the corresponding one of guides 510, 512.

The leading panel 534 has racks 536 mounted to the underside in the manner of assembly 170. Racks 536 engage, or are engaged by, the pinions 282, 284 of the drive system in the manner of assembly 170 as previously described. In some instances, there may be a third rack, and a corresponding third pinion, in the middle of panel 534, or, alternatively doubled racks, i.e., two such racks 536 beside each other in parallel on each side of plate 528. To the extent that the leading margin of leading panel 534 is otherwise unsupported, and since racks 536 are mounted to its underside, an reinforcement 538 is mounted to the top side of the leading edge so that panel 534 can move through its range of motion over drive shaft member 210. Reinforcement 538 runs laterally across movable member 504. Reinforcement 538 may have the form of a vertical stem, such as stems 532. Alternatively, in FIG. 10e, reinforcement 538 is sown as being an angle iron welded in place with toes facing downward. In a further alternative, reinforcement 538 could be made by forming an upward flange on the leading edge of panel 534.

Figure 12A:
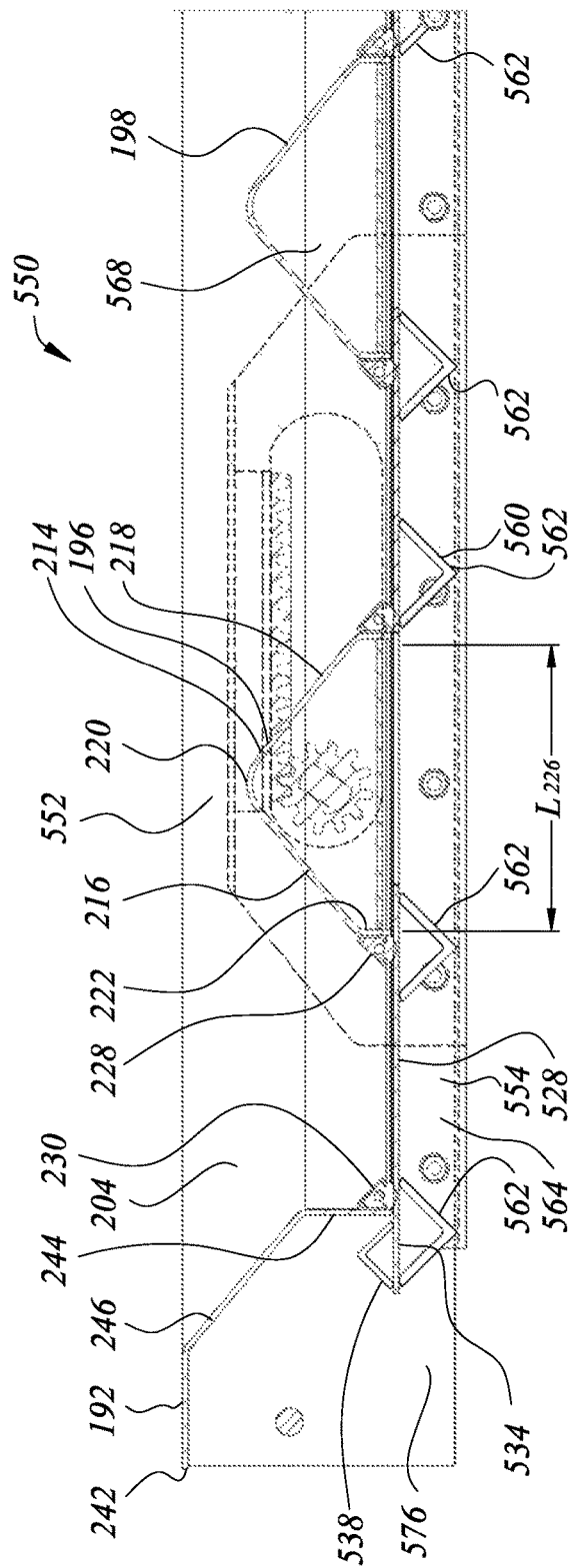
FIG. 12a is a side view, in section of an alternate embodiment of gate in a view analogous to FIGS. 6a and 10e from inside the gate looking outward.
Figure 12B:
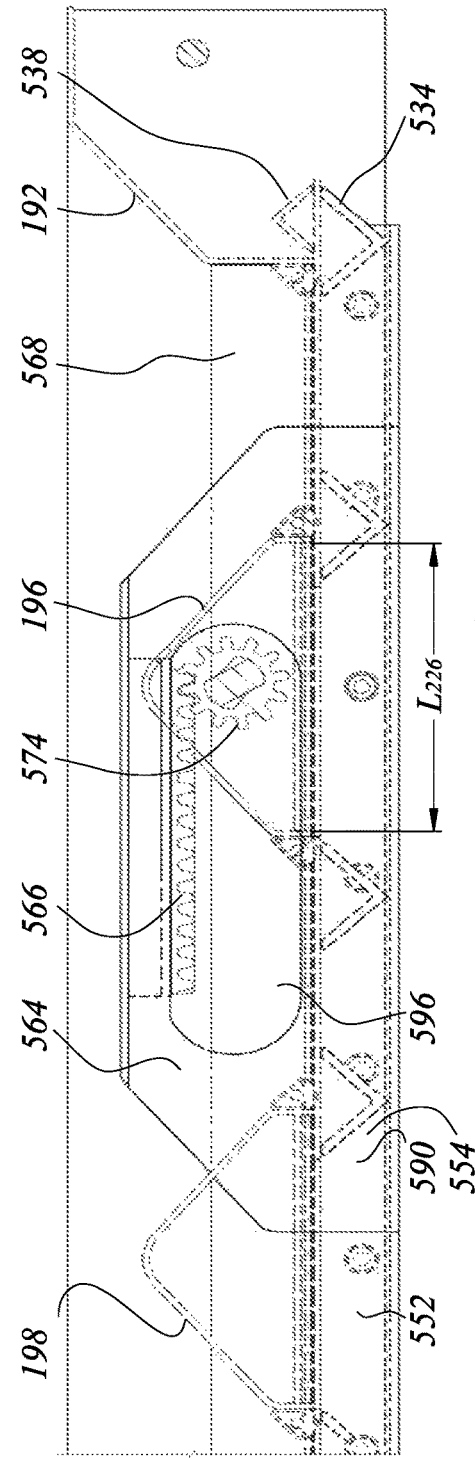
FIG. 12b is an opposite side view to that of FIG. 12a, from outside.
Figure 12C:
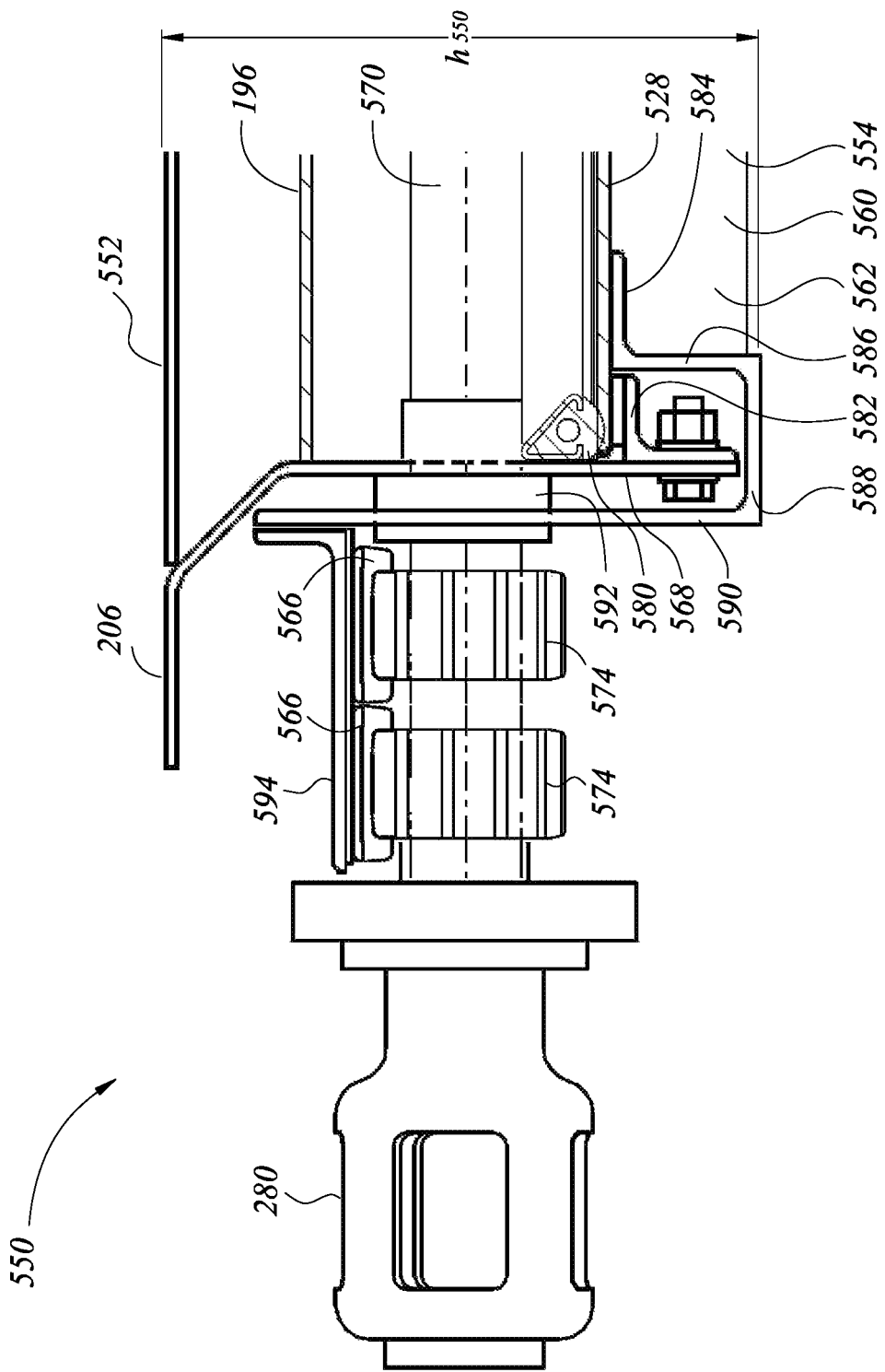
FIG. 12c is an end view detail in partial section showing the drive arrangement.

In FIGS. 12a to 12c an alternate gate assembly 550 is shown to that of gate assembly 500. It has a stationary assembly 552, and a movable assembly, or movable member, or movable shutter, or movable shutter assembly, however it may be called, 554. It is generally the same as gate assembly 500, but differs in the following respects. First, array of lateral reinforcements 530 is replaced by an array 560 in which downward reinforcement stems 532 are replaced by angle irons 562 having their toes facing into the underside of the respective slats or panels. Angle irons 562 have a lesser or shallower vertical depth than stems 532. Furthermore, racks 536 are replaced by racks 566. That is, rather than being mounted to the underside of shutter plate 504, racks 566 are mounted to the underside of left and right hand extensions, or brackets, 564, that locate laterally outboard of, or outside of, side frames 568 of assembly 550. Brackets 564 function as drive input mountings, at which force and motion are transferred from the drive transmission to the movable member or movable assembly 504. They receive motion from pinions 574 mounted at opposite ends of drive shaft 570, which may be taken as being conceptually substantially the same as drive shaft 210 to the extent of having a torque input fitting or head at one or both ends, and a torque shaft that extends between those ends, is mounted in bushings in the respective ide frames and transfers motion to the movable member through a rack-and-pinion relationship. The drive shaft 570 locates upwardly of moving member 504, and passes though the frame in the shelter of the leading cross-member, 572. Racks 566 face downwardly, and are engaged by pinions 574 in the same manner as before. In view of the upward placement of drive shaft 570, the bottom margin of side frame 568 runs on a straight edge, which may be a horizontal edge. As seen by comparing FIG. 12b with FIG. 6a, the leading portion of skirt 576 of side frame 568 is at the same level, rather than having a downwardly depending end. As seen in FIG. 12c, the lateral margins 580 of plate 528 of moving member assembly 504 ride on guides 582, which are vertically smaller than guides 510, 512. As before, guides 582 may have the form of angle irons fit on assembly with mechanical fastening hardware, such as bolts or Huck Bolts or rivets, as may be. Alternatively, guides 582 can be formed as horizontal flanges of side frames 568. In this arrangement, as seen in FIG. 12c, the extensions defined by brackets 564 have a channel cross-section, in which the legs of the channel have unequal length. That is the short leg 588 of the channel has a foot or toe 584 that is mounted to (e.g., by welding) the underside of plate 528. Short leg 586 extends downwardly to clear the lowermost edge of side frame 568. Back 588 of the channel extends laterally outward beyond side frame 568 to the long leg 590 that runs upwardly. The upper region of long leg 590 has an accommodation, or opening, or aperture or cut-out 596 to leave a clearance space for bushing 592 of drive shaft 570. Rack 566 is mounted on a bracket, or angle or flange 594 that is secured, e.g., by welding to, or forms part of bracket 564. Pinions 574 may be single pinions, or they may be double pinions as shown.

In gate assemblies 500 and 550, the moving member or moving assembly, be it 504 or 554, is movable between first and second, or open and closed, positions to govern the egress of lading through gate assembly 500 or 550 generally, as may be. The movement is axial translation, in which the motive force is provided through a mechanical transmission that is accessible from trackside level. That input force or torque may be provided by, or through, an automated or powered drive head that engages the input shaft. Whereas gate assembly 170 is a three piece assembly, in which a moving shutter is mounted between upper and lower stationary frames or stationary assemblies; gate assemblies 500 and 550 are two piece assemblies in which there is a stationary member and a moving member that co-operate to govern egress of lading.

Employment of such outlet gates 170, 300, 500 and 550, or several of such outlet gates or gate assemblies mounted in close proximity as shown and described, may tend to facilitate a reduction in car length for the same volume of lading, or, conversely, to permit a larger volume of lading for the same car length, or some combination thereof. Inasmuch as there is effectively only a single lading containment vessel, and effectively only a single discharge section, there are no large intermediate slope sheets rising above the level of the discharge section, i.e., the discharge section is free of any sloped surface rising above the crest of lateral cross-members 140, 142. Accordingly, gates 170, 300, 500 and 550 are placed close together, to approximate a single flat opening bottom. To the extent that any of gates 170, 300, 500 or 550 has an overall length-wise dimension in the x-direction, "Close together" may be defined as being less than half that length apart, or, alternatively, less than 2 feet (60 cm) apart. In the embodiments illustrated, they are less than one quarter of their length apart, and are less than one foot (30 cm) apart.

The placement of a wider outlet gate at the bottom of the car creates more volume in the lower portion of the car, e.g., below the level of the side sills, or below the level of the center sill, or below the coupler centerline height, whichever may be used as a datum. This may be expressed, alternatively, as having a greater portion of the lading volume of the car located lower than the 98" upper limit on center of gravity for interchange service in North America. The use of open frames, such as frames 78, 80 could be supplanted by frames that have a continuous web. Car 20 could retain such partitions as bulkheads to segregate the lading into two, three, or possibly more, regions. However, where such frames are employed, car 20 may have a reduced empty car weight. A reduction in empty car weight may permit a relatively greater amount of lading to be carried within the "70 ton" (220,000 lbs.), "100 ton" (263,000 lbs.), "110 ton" (286,000 lbs.), or "125 ton" (315,000 lbs.), standards established by the AAR.

In the embodiments shown and described, the discharge section of car 20, has what can be termed a "flat bottom". That is, the vertical depth (i.e., in the z-direction) of each of frame 130 and gate 170 is shallow as compared to the width (in the y-direction) and length (in the x-direction). The use of cross-members 140, 142 in frame 130, and of cross-members 196, 198, 200, and 202 in gate 170, has the effect of breaking a long slope sheet into smaller sections. That is, in a conventional discharge section with a gate opening length in the x-direction equal to five times $L_{230}$, there might typically be corresponding slope sheets leading to the opening of a slope length five times as great as the length of sides 216, 218. But such a discharge section would also mean that the adjacent slope sheet structure of the car body itself would have five times the vertical rise for the same horizontal run. Such an opening would tend to be narrower, and higher, implying longer and taller slope sheets several times as large (and as deep) as the inclined faces of sides 154, 156 of cross-members 140, 142, and the corresponding end slope sheets. By splitting the opening of the discharge gate into a plurality of slots that are short in the direction of travel of the shutter (i.e., the x-direction in FIG. 1*e*) and wide in the transverse direction (i.e., the y-direction in FIG. 1*e*), the structure has the effect of apportioning the slope sheet length among the openings, making the gate long, wide, and shallow. Whereas conventional discharge and gate structures tend to be roughly as high as long, the apparatus shown and described is much smaller in vertical extent than in length or width. The depth of gate 170 can be measured overall, as in $h_{170}$ shown in FIG. 3*d*; or it can be measured from the inlet height to the shutter, as in $h_{192}$ shown in FIG. 6*a*; or it can be shown as the height of the internal dividers 196, 198, etc., with the sloped sides 216, 218 and crest or apex 220, as $h_{220}$. Alternatively, it can be considered as the height of the two-piece assembly 550 or 550 as shown in FIGS. 10*a* to 11*d* and 12*a* to 12*c*, from the inlet flange of the stationary member or assembly, to the bottom of the movable assembly. As shown, him is of the order of 8-12 inches, and is less than half the clearance height between bottom flange 160 of center sill 36 and Top of Rail. In the embodiment shown, it is less than one foot. Alternatively, it is less than the depth of the center sill, and in the embodiment shown, less than half the depth of the center sill. In one embodiment $h_{170}$ is about 10 inches. The overall height of gate assembly 500 is somewhat less than this; the overall height of gate assembly 550 is still less again. Alternatively, $h_{192}$ may be in the range of 5-8 inches, and in the gate assembly 170 is about 6 inches deep. In the further alternative, $h_{220}$ may be in the range of 3-5 inches, and in the embodiment shown is about 3½ inches. Even taking the largest of these $h_{170}$, gate 170 is more than 4 times as long as it is deep. It is also more than three times as wide as deep. In the embodiment shown in FIG. 2*e*, gate 170 is more than 6 times as long as deep, and more than 5 times as wide. Relative to $h_{192}$ those ratios would be double. Relative to $h_{220}$, those ratios would be triple. In the case of gate assemblies 500 and 550, the through thickness would be correspondingly smaller, and the various aspect ratios would be adjusted correspondingly. The net result is that whereas conventional discharge sections are boxy and tall, the discharge sections herein are predominantly flat, i.e., more than triple as larger in length and width as in depth, like a flat-bottomed car, or like a drop-bottom gondola car. The proportion of the bottom between the trucks that is "flat" at the gate flanges of frame 130 is more than 35% of the projected area of the car between the truck centers. It is an even higher percentage of the available footprint at the given height relative to Top of Rail, given the narrowing of the AAR underframe envelope. That is, whereas it is more than 35% of the projected area of the maximum car width between the truck centers, it is more than 50% of the projected area at the lowermost boundary width of AAR Plate C of AAR Plate F. In the embodiments illustrated it may be more than ½ and ⅔ of those areas, respectively.

Another way to express this is to consider the multiple-louver gate assemblies 170, 500 and 550 as slope-sheet fore-shortening gate assemblies. That is, the effective discharge section slope sheet rise is fore-shortened by breaking it into multiple sections by using an array of high-aspect ratio lateral slots, placed side-by-side, with sloped dividers between the slots. In these embodiments the lading discharges through the slots in parallel. In a conventional single-opening gate assembly, the single gate opening corresponds substantially to the entire horizontal area of the vertically projected door opening. In this description, gate assemblies 170, 500 and 550 are multiple-opening sliding gates. They are oriented to lie horizontally, or flat. The net inlet area of the gate is defined by the rectangular inlet of the stationary frame of the gate assembly. For example, the area of opening 178 in FIG. 3*g* can be calculated as $A_{178}=L_{190} \times L_{192}$. The net outlet are is defined by the sum of the outlet areas of the array of slots when fully open. In the examples of gate assemblies shown and described, the ratio of outlet area to inlet area is less than ⅔. Generically, apart from the inlet chamfers to smooth the feed-in of the granular lading, the ratio of outlet area to inlet area approaches, or approximates $(n/(2n-1) \times (w_{slot}/w_{panel}))$, where n is the number of slots; n−1 is the number of lateral cross-members; $w_{slot}$ is the throat width of the slot in the direction of opening (e.g., $L_{232}$), and $w_{panel}$ is the width of the blank panel between two adjacent openings (e.g., $L_{233}$). That is, $w_{panel}$ is the width of the blank necessary to close the slot when the movable member is in the closed position, and is at least as large as $w_{slot}$. In some embodiments, the ratio of outlet area to inlet area lies in the range of $\frac{3}{4} \times (n/(2n-1) \times (w_{slot}/w_{panel}))$ of to$/(n/(2n-1) \times (w_{slot}/w_{panel}))$. In a narrower range, the outlet area is less than ⅔ and greater than ⅓ of the inlet area. In a still narrower range, it is less than ⅗ and greater than ⅖ of the inlet area. In any case, in those examples, the outlet area is, respectively, less than ¾, less than ⅔ and less than ⅗ of the inlet area. In some embodiments, the outlet area may be less than half the inlet area. In each example, the use of a plurality of openings and at least one sloped-top cross-member allows the vertical rise to be fore-shortened, and thus the effective depth of the gate for an equivalent width reduced by splitting the slope into at least two steps. This split, as demonstrated, is made within the vertical thickness of the gate assembly itself.

The use of hopper gate doors in which there is a divider, typically a sloped-hat divider, between two openings (or several such intermediate dividers, 'n', between more than two openings, 'n+1', as may be) may tend to yield a "flat-bottomed" car in which frame 130 of the discharge section of the hopper and the frame of gate assembly 170 are substantially rectangular and flat, i.e., the vertical through-thickness overall of the gate and the aperture dividers defined by cross-members 140, 142 is small relative to both the width and the length of the gate, such that the hopper can be said to be "flat-bottomed". This can also be expressed by indicating that the hopper car is a single hopper car, in which the discharge section is a multi-opening array that extends continuously, or substantially continuously over more than ⅔ the width (in some embodiments, over half the width); and that extends substantially continuously over more than half the length between truck centers. Another way to consider the car conceptually is that it has such a large number of close-spaced discharge openings that the combined effect approximates that of having one large continuous opening, albeit in which each ⅓ of the continuous opening is separately operable, given that there are three gate assemblies 170. In some embodiments, each gate assembly may have three or more openings. In a car with three such gate assemblies, the total number of such openings would be in the range of 9-15, it being 15 in the embodiment illustrated. The overall result is a car that has a flat bottom profile between the trucks defined by frame 130, and as such resembles a drop-bottom gondola car, or depressed center gondola car in side view, yet that remains a bottom-dumping hopper car.

In effect, car 20 is the length and width of a three-hopper or four-hopper railroad car, but rather than have two or three distinct hoppers, and the large internal slope sheets used in such cars, the use of wide, multi-opening arrays as described herein effectively permits such formerly distinct and apart discharge sections to be enlarged and merged or run into each other, such that what might formerly have been a two-hopper or three-hopper car effectively becomes a single-hopper car with a large, "flat-bottomed" gate array. Since the gate arrays can be carried at a low level, the volume of the lower portion of the car may tend to be increased.

Another way to express this general flatness and shallowness of the total discharge opening array of car 20, even if frame 130 were not a single or unitary frame, but rather were portioned into distinct sub-frames, is to sum the total combined length of the gates relative to either the truck center distance or the distance over the strikers. For example, that sum-of-the-lengths of the gates 170, etc., may be more than ⅓ of the truck center distance. It may be more than half that distance. In the car shown it may be more than ⅗ of that distance, namely a sum of more than 300 inches over a truck center distance of about 465 to 470 inches. Even in an alternate embodiment of a car with two distinct hoppers, and internal or intermediate slope sheets of some extent rising to the level of the center sill or above, the use of two large discharge grilles, such as provided by the multiple aperture, multiple-shutter or multiple-louver arrays of assemblies 170, 500 or 550, or large area opposed doors of assembly 300, for each hopper, would increase the volume of the lower portion of the car.

In these gates there is a shutter or louver type system used to create openings to allow the discharge of grain or such other granular lading as may be. These gates have a frame, such as 130, with a series of spaced-apart cross-members of triangular cross-section (at least one; there being four 196, 198, 200, 202, as illustrated) that act as reinforcements or beams that span the gate. They also act as flow dividers and as small scale slope sheet proxies providing sloped surfaces that break what would otherwise be a large rise in a single slope sheet into small segments, permitting the flattening of the discharge. A series of openings is created to either side of the various cross-members. The openings are opened and closed by the sliding movement of the shutters or louvers, which are linked together to a common drive member. When the gates slide open, the commodity carried as lading discharges between the triangular cross-members.

The use of a planar, horizontal flanged interface as the land at the bottom of the discharge section, i.e., at the flanges of frame 130, permits the gates to mount at a flange connection using mechanical fasteners. Alternatively, the gate structure could be welded to car body 22 in a lap weld configuration. The use of mechanical fasteners may be convenient, and may facilitate replacement or repair, such as may occur from time to time.

In assembly 170, the triangular reinforcements, namely cross-members 196, 198, 200, 202 span the gate transversely (i.e., cross-wise relative to the longitudinal rolling direction). The apex of the triangle faces upwardly, and the slope on the triangle allows the commodity for which the car is designed to discharge under the influence of gravity. (For grain this slope angle is 36 degrees). The reinforcement has a bottom flange to yield a closed triangular section beam, such as may tend to be resistant to bending deflection. In some examples, the beam may typically be of the order of 50 to 90 inches long, and 8 to 12 inches deep, and 18 to 20 inches wide. Sealing may be aided by attaching a seal or brush, such as may be in a form to accept installation of a carpet rod.

The relative lowness and flatness of the structure can be expressed in a number of ways. First, with reference to the structure of the car body, the outlet discharge section frame may be a rectangle, i.e., the land of frame 130, that has its downwardly facing surface at a height that is less than half the height of the coupler centerline above TOR. That height may be lower than the height of the bottom flange of the center sill. It may be less than ⅔ of the height of the bottom flange of the center sill. The width of frame 130 in the y-direction may be greater than three times its height above TOR. The length of frame 130 in the x-direction may be more than 10 times its height above TOR. In the embodiment shown the width is more than five times the height above TOR, and the length is more than 20 times the height above Top of Rail. Expressed in terms of the discharge gates, the width of assembly 170 or 350 over the side frames may be more than 10 times the clearance above TOR, and as shown it is more than 20 times that distance. In terms of length of one assembly 170 or 350, the lengthwise ratio is greater than 15 times clearance, and in the embodiment shown it is more than 30 times clearance.

As above, the outlet gate slide may include a flat plate with transverse slots cut in it. The gate slide does not have to be a flat plate. It could be a plate with reinforcements to discourage deflection. The cut-outs may be, and as described generally are, rectangular in shape, although other shapes suitable for the discharge of lading could be chosen. In the embodiment shown and described, one of the sides of the rectangle may be given a curved profile, as indicated, on the leading edge of each cut-out. The arc may tend to prevent the leading edge of the opening from becoming unsupported all at once. The arc allows the support to spread gradually out to the edges as the gate slides open. Other shapes may achieve a similar effect.

In assembly 170, the gate is supported by a gate pan, namely stator assembly 182. The gate pan is bolted to the outlet gate frame, namely frame 180, and serves to support the sliding portion 184 of gate assembly 170. The gate pan has structural depth, being reinforced by a set of ribs, and may tend to limit or to reduce the deflection of the sliding portions or plates 270 of gate assembly 170. This is a three-piece assembly in which the movable member is sandwiched between two stationary members. A two-piece assembly may also be provided, as in assemblies 500 and 550. In these assemblies the upper member is stationary, and provides the lading distributing flow dividers, while the reinforced lower structure is movable. In each case, the stationary members and movable members have apertures and solid panels. In the open position, the movable member is positioned to align the openings of the stationary and movable members; in the closed position, the solid panels of the movable member are aligned with the openings of the stationary member, or members.

There are a number of options in providing drive to the sliding portions between the closed and open positions. One opening method for gate assembly 170 is a drive system that includes a rack and pinion arrangement, as in FIGS. 6a and 6b. This arrangement includes a secondary lock to prevent unintentional opening. The drive shaft may have non-circular shape. The non-circular shape permits a measure of lost-motion, such as permits the release of the secondary lock. Another option is to employ a toggle lock mechanism as in FIGS. 7a and 7b. This mechanism is driven by the drive shaft. As the shaft rotates the links pull the gate slide toward the shaft. The links are wound around the shaft until the gate is fully open. To close the gate, the shaft is rotated in the other direction and the links push the gate closed. The action of the links locking together discourages accidental opening of the gate. In the further alternative of FIGS. 8a and 8b, another option is to drive the gate slide using a chain-and-sprocket system. It is similar to the toggle lock system. As the shaft rotates, the chain is wound around the sprocket pulling the gate slide to the open position. To close the gate, the shaft is rotated in the other direction and, as the chain unwinds, it pushes the gate closed. The chain links are designed to that, when the chain is pushed the links lock together forming a rigid strut that is able to push the gate closed. The locking-together of the links is what creates a locking feature that may tend to discourage inadvertent or accidental opening of the gate. Still another system to open the gate includes a screw jack, or scissors-type mechanism, similar to the double-threaded opposite-hand threaded shafts 432 and 434. As the shaft rotates, respective lead screws on the right-hand and left-hand threaded ends of the shaft advance toward each other, or spread apart from each other, as may be. Linkages mounted to these lead screws are linked at their other end to plate 270 in the manner of the arms of a scissors-jack. As the lead screws approach, the arms straighten to push the door closed; as they separate the arms diverge, pulling the gate open.

Various embodiments have been described in detail. Since changes in and or additions to the above-described examples may be made without departing from the nature, spirit or scope of the invention, the invention is not to be limited to those details. As may be understood without further multiplication and repetition of description, the various features of the several embodiments may be mixed and matched as appropriate.

We claim:

1. A railroad hopper car comprising:
    a body carried on trucks, said body being a lading containment body having first and second side walls and at least a first hopper;
    said body having a center sill, and first and second side sills running along opposite sides of said car body; said center sill having a top cover plate;
    said body including a discharge section, and at least a first multi-opening discharge gate mounted thereto, said first multi-opening discharge gate being operable to govern egress of lading from said body;
    said discharge section including first and second end slope sheets and first and second side slope sheets;
    said first and second side slope sheets meeting said first and second side walls at a respective transition, there being a slope discontinuity at said respective transitions; and
    said respective transitions being lower than said top cover plate of said center sill.

2. The railroad hopper car of claim 1 wherein said respective transitions are located at least half the depth of said side sills below said side sills.

3. The railroad hopper car of claim 1 wherein said hopper car is a flat bottom hopper car.

4. The railroad hopper car of claim 1 wherein said hopper car has at least first and second multi-opening discharge gates mounted to said discharge section adjacent to each other.

5. The railroad hopper car of claim 4 wherein said discharge section has a peripheral frame defining an outlet datum height, and said first and second multi-opening discharge gates are mounted to said peripheral frame.

6. The railroad hopper car of claim 1 wherein said side slope sheets are unitary side slope sheets that run from end to end of said discharge section along at least said first multi-opening discharge gate, said side slope sheet having a continuous lower margin.

7. The railroad hopper car of claim 1 wherein said center sill has a lowermost portion and an uppermost portion, said center sill being one of (a) a straight-through center sill; and (b) a stub sill; said hopper car has at least a first cross-member mounted to said discharge section; and said first cross-member has an uppermost portion, said uppermost portion of said first cross-member being located lower than said lowermost portion of said center sill.

8. The railroad hopper car of claim 1 wherein said hopper car has a roof section and an inlet coaming formed therein; and said hopper car has a lateral roof reinforcement extending across said car, and is connected to said roof section on either side of said coaming.

9. The railroad hopper car of claim 1 wherein said hopper car has at least one internal ring frame.

10. The railroad hopper car of claim 9 wherein said railroad hopper car has a straight-through center sill; said ring frame has first and second portions mounted to first and second side walls of said hopper car; an overhead roof support portion joining upper ends of said first and second portions, and lowermost transverse portion mounted to said discharge section and joining lower ends of said first and second portions; and said lowermost transverse portion passes underneath, and clear of, said straight-through center sill.

11. A railroad hopper car comprising:
a lading containment body carried on railroad car trucks for rolling motion in a longitudinal direction along railroad tracks;
said lading containment body including at least a first hopper; said first hopper having a discharge section and at least a first multi-opening discharge gate mounted thereto, said first multi-opening discharge gate being movable between open and closed positions to govern egress of lading from said hopper car;
said hopper car having a center sill, said center sill being one of (a) a straight-through center sill; and (b) a stub center sill;
said discharge section having a first cross-member; and
said first cross-member having an uppermost portion; said center sill having a lowermost portion; and
said uppermost portion of said first cross-member being lower than said lowermost portion of said center sill.

12. The railroad hopper car of claim 11 wherein said center sill is a straight-through center sill and said first cross-member passes beneath said center sill.

13. The railroad hopper car of claim 11 wherein said hopper car is a flat bottom hopper car.

14. The railroad hopper car of claim 11 wherein said hopper car has side sills and respective side sheets that extend downwardly below said side sills; said side sills have a depth, said hopper car has side slope sheets; said side slope sheets meet said side sheets at a respective transition; and said transition is located downwardly of said respective side sills by at least said depth of said side sills.

15. The railroad hopper car of claim 11 wherein said hopper car has at least a second multi-opening discharge gate, and said hopper car has side slope sheet that extend the full length of said discharge section, said side slope sheets having a continuous lower margin.

16. The railroad hopper car of claim 11 wherein said discharge section has a rectangular frame defining an engagement interface thereof, and at least said first and second multi-opening discharge gates are mounted to said engagement interface.

17. The railroad hopper car of claim 11 wherein said lading containment body has a unitary volume served by a plurality of said multi-opening discharge gates.

18. The railroad hopper car of claim 11 wherein said lading containment body has at least one ring frame, and said first cross-member defines a portion of said ring frame.

19. The railroad hopper car of claim 11 wherein said lading containment body has a first side wall, a second side wall, and a roof section; said lading containment body includes at least a first ring frame, said first ring frame having a first side portion to which said first side wall conforms; a second side portion to which said second side wall conforms; and an over-spanning portion to which said roof section conforms; and said first cross-member being a cross-member of said first ring frame joining said first and second side portions thereof.

20. The railroad hopper car of claim 11 wherein said hopper car has at least said first multi-opening discharge gate and a second multi-opening discharge gate mounted to said discharge section thereof; said discharge section has a rectangular frame defining an engagement interface; said center sill has an overall depth; and said first and second multi-opening discharge gates have an overall through thickness, said through thickness of said multi-opening discharge gates being less than said depth of said center sill.

21. The railroad hopper car of claim 11 wherein:
said railroad hopper car has side sheets;
said side sheets meet said discharge section at a slope discontinuity defining a transition between said side sheets and said discharge section; and
said transition is located at a height that is lower than said center sill top cover plate.

22. The railroad hopper car of claim 11 wherein said railroad hopper car is free of any intermediate slope sheet extending upwardly of the center sill.

23. The railroad hopper car of claim 11 wherein said hopper car is free of any intermediate slope sheet extending upwardly of the bottom cover plate of the center sill.

24. The railroad hopper car of claim 11 wherein
said discharge section includes a peripheral frame;
said peripheral frame has at least a first lateral cross-member; and
said railroad hopper car is free of any intermediate slope sheet extending upwardly of said first lateral cross-member of said peripheral frame.

25. The railroad hopper car of claim 11 wherein the discharge section has a through-thickness depth that is less than the through thickness depth of the center sill.

26. The railroad hopper car of claim 11 wherein the first multi-opening discharge gate has a through thickness that is less than half the depth of the center sill.

27. The railroad hopper car of claim 11 wherein:
said hopper car has at least said first said multi-opening discharge gate and a second multi-opening discharge gate, said first and second multi-opening discharge gate being sliding hopper gates;
said first multi-opening discharge gate has a first length; said first multi-opening discharge gate is spaced from said second multi-opening discharge gate by a second length; and
said second length is less than half said first length.

28. The railroad hopper car of claim 11 wherein said hopper car has a drop center and at least one sliding discharge gate mounted to said drop center; said hopper car has a center sill having a vertical depth; and said sliding discharge gate has a length, a width, and a through-thickness, and said through-thickness is less than said depth of said center sill.

29. The railroad hopper car of claim 11 wherein said hopper car has a drop center and at least a first discharge gate and a second discharge gate mounted to said drop center; said first and second discharge gates are sliding discharge gates; and each of said first and second discharge gates has an array of sliding shutters, said shutters having a width that is greater than its length in the direction of motion of opening and closing.

30. A railroad hopper car comprising:

a lading containment body carried on railroad car trucks for rolling motion in a longitudinal direction along railroad tracks;

said lading containment body including at least a first hopper; said first hopper having a discharge section and at least a first multi-opening discharge gate mounted thereto, said first multi-opening discharge gate being movable between open and closed positions to govern egress of lading from said hopper car;

said hopper car having a center sill, said center sill being one of (a) a straight-through center sill; and (b) a stub center sill;

said discharge section having a first cross-member;

said first cross-member having an uppermost portion; said center sill having a lowermost portion;

said uppermost portion of said first cross-member being lower than said lowermost portion of said center sill; and at least one of:

(a) said discharge gates have a combined opening length of at least half the hopper car's truck center distance;

(b) said discharge gates have an opening width that is at least 2/3 of the AAR Plate C lowermost underframe clearance width;

(c) said discharge gates have a combined area, $A_{Total}$, that is greater than 3/8 of $A_n$;

(d) said first multi-opening discharge gate has a through thickness that is less than 1/5 of the width thereof and less than 1/8 of the length thereof;

(e) said first multi-opening discharge gate has a through thickness less than half as deep as said center sill;

(f) said first multi-opening discharge gate has between three and eight openings and corresponding slidable slats movable to open and close said openings;

(g) said first multi-opening discharge gate has shutters having a width greater than four times its length in the direction of motion of opening and closing;

(h) the ratio $A_o/A_i$ is less than one half;

(i) said first multi-opening discharge gate and a second multi-discharge opening gate are spaced apart along said hopper car by a distance less than one half as long as said first multi-opening discharge gate;

(j) said hopper car has a total of at least nine discharge openings;

(k) said hopper car has a set of discharge openings separated into at least three arrays, with said first multi-opening discharge gate having one such array; and (l) said hopper car has a truck center length of less than 40 ft., and a lading volume capacity of at least 5400 cu. ft.

\* \* \* \* \*